United States Patent
Orhan et al.

(10) Patent No.: US 12,375,968 B2
(45) Date of Patent: Jul. 29, 2025

(54) GRAPH NEURAL NETWORK AND REINFORCEMENT LEARNING TECHNIQUES FOR CONNECTION MANAGEMENT

(71) Applicant: INTEL CORPORATION, Santa Clara, CA (US)

(72) Inventors: Oner Orhan, San Jose, CA (US); Vasuki Narasimha Swamy, San Francisco, CA (US); Marcel Nassar, San Diego, CA (US); Hosein Nikopour, San Jose, CA (US); Shilpa Talwar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 687 days.

(21) Appl. No.: 17/561,563

(22) Filed: Dec. 23, 2021

(65) Prior Publication Data

US 2022/0124543 A1 Apr. 21, 2022

Related U.S. Application Data

(60) Provisional application No. 63/216,828, filed on Jun. 30, 2021.

(51) Int. Cl.
*H04L 47/10* (2022.01)
*G06N 3/08* (2023.01)
(Continued)

(52) U.S. Cl.
CPC ............ *H04W 28/021* (2013.01); *G06N 3/08* (2013.01); *H04W 24/02* (2013.01); *H04W 28/086* (2023.05); *H04W 28/0925* (2020.05)

(58) Field of Classification Search
None
See application file for complete search history.

(56) References Cited

U.S. PATENT DOCUMENTS

2023/0362082 A1* 11/2023 Svennebring ......... H04L 41/147

OTHER PUBLICATIONS

Muhammad Alrabeiah et al., "Millimeter Wave Base Stations with Cameras: Vision Aided Beam and Blockage Prediction", arXiv:1911.06255v2 [cs.IT], 6 pages (Nov. 15, 2019).
(Continued)

*Primary Examiner* — Willie J Daniel, Jr.
(74) *Attorney, Agent, or Firm* — Hanley, Flight & Zimmerman, LLC

(57) ABSTRACT

The present disclosure provides connection management techniques based on graph neural networks (GNN) and deep reinforcement learning (DRL) to optimize user association and load balancing. A graph structure of a communication network is considered for the GNN architecture and DRL is used to learn parameters of the GNN algorithm/model. Connection management is defined as a combinatorial graph optimization problem, and the DRL mechanism uses the underlying graph to learn weights of the GNN for an optimal user connections or associations. The connection management techniques can consider local network features to make better decisions to balance network traffic load while network throughput is also maximized. Implementations are provided based on edge computing frameworks include the Open RAN (O-RAN) architecture. Other embodiments may be described and/or claimed.

27 Claims, 15 Drawing Sheets

(51) Int. Cl.
*H04W 24/02* (2009.01)
*H04W 28/02* (2009.01)
*H04W 28/08* (2023.01)
*H04W 28/086* (2023.01)

(56) References Cited

OTHER PUBLICATIONS

Sanchez-Lengeling et al., "A Gentle Introduction to Graph Neural Networks", Distill, vol. 6, No. 9, p. e33, 30 pages (Sep. 2, 2021), https://distill.pub/2021/gnn-intro/.
Dave Evans, "The Internet of Things—How the Next Evolution of the Internet Is Changing Everything", CISCO white paper 1, No. 2011 (2011), pp. 1-11 (Apr. 2011).
"Intel® Smart Edge Open Developer Guide", Version 21.09, 6 pages (accessed Dec. 2021), https://smart-edge-open.github.io/docs/product-overview/.
Sara Khosravi et al., "Learning-based Load Balancing Handover in Mobile Millimeter Wave Networks", arXiv:2011.01420v1, 7 pages (Nov. 3, 2020).
Oner Orhan et al., "Connection Management xAPP for O-Ran RIC: A Graph Neural Network and Reinforcement Learning Approach", arXiv:2110.07525v2, 7 pages (Oct. 20, 2021), https://arxiv.org/abs/2110.07525.
Sundeep Rangan et al., "Millimeter-Wave Cellular Wireless Networks: Potentials and Challenges," Proceedings of the IEEE, vol. 102, No. 3, pp. 366-385 (Feb. 5, 2014).
Vasileios P. Rekkas et al., "Machine Learning in Beyond 5G/6G Networks—State-of-the-Art and Future Trends" Electronics, vol. 10, No. 22, 2786, 28 pages (Nov. 14, 2021).
Mohamed Sana et al., "Multi-Agent Reinforcement Learning for Adaptive User Association in Dynamic mmWave Networks", arXiv:2006.09066v1 [eess.SP], 15 pages (Jun. 16, 2020), http://arxiv.org/abs/2006.09066v1.
Scarselli et al., "The graph neural network model", IEEE Transactions on Neural Networks, vol. 20, No. 1, pp. 61-80 (Dec. 9, 2009), https://ro.uow.edu.au/cgi/viewcontent.cgi?article=10501&context=infopapers.
Shi et al., "Fairness in wireless networks: Issues, measures and challenges," IEEE Communications Surveys & Tutorials, vol. 16, No. 1, pp. 5-24 (May 17, 2013).
Sutton et al., "Reinforcement Learning: An Introduction", The MIT Press, Cambridge, Massachusetts, London, England, 2nd Ed., 352 pages (2014).
Tayyab et al., "A Survey on Handover Management: From LTE to NR", IEEE Access, vol. 7, pp. 118907-118930 (Aug. 26, 2019), https://ieeexplore.ieee.org/stamp/stamp.jsp?arnumber=8812724.
Wang et al., "Machine Learning for 5G and Beyond: From Model-Based to Data-Driven Mobile Wireless Networks", China Communications Jan. 2019, vol. 16, No. 1, pp. 165-175 (Feb. 4, 2019), https://cs.nju.edu.cn/zhouzh/zhouzh.files/publication/chinacom19.pdf.
Xu et al., "Robustness of deep learning models on graphs: A survey", AI Open, vol. 2, pp. 69-78 (Jun. 24, 2021), https://www.sciencedirect.com/science/article/pii/S2666651021000139.
Zhou et al., "Graph neural networks: A review of methods and applications", AI Open, vol. 1, pp. 57-81 (Apr. 9, 2021), https://www.sciencedirect.com/science/article/pii/S2666651021000012.
Zhou et al., "Graph Neural Networks: A Review of Methods and Applications", arXiv:1812.08434v1 [cs.LG], 20 pages (Dec. 20, 2018), https://arxiv.org/pdf/1812.08434v1.pdf.
O-RAN Alliance WGI, "O-Ran Operations and Maintenance Interface Specification"v03.00 (Apr. 2020) ("O-RAN. WG1.O1-Interface. O-v03.00").
ETSI GS NFV-INF 004 V2.4.1 (Feb. 2018).
3GPP TS 38.420 v16.0.0 (Jul. 16, 2020).
ETSI GS NFV-INF 005 V3.2.1 (Apr. 2019).
Abbas et al., "Mobile edge computing: A survey," in IEEE Internet of Things Journal, vol. 5, No. 1, pp. 450-465 (Feb. 2018).
3GPP TS 38.460 v16.1.0 (Jul. 17, 2020).
The Internet of Things: How the next evolution ofthe Internet is changing everything, San Jose, CA, USA (Apr. 2011).
"O-RAN Architecture Description" v02.00 (Jul. 2020), O-RAN Alliance WG6, "Cloud Architecture and Deployment Scenarios for O-RAN Virtualized RAN" v02.00 ("O-RAN.WG6.CAD-v02.00").
RAN Alliance WG2, O-Ran AI interface: General Aspects and Principles Specification, version 1.0 (Oct. 2019) ("ORAN-WG2.AI.GA&P-vol. 00").
"O-RAN Operations and Maintenance Architecture Specification" v03.00 (Apr. 2020) ("O-RAN.WG1.OAM-Architecture• v03.00").
Kuklinski et al., "A perspective of O-RAN integration with MEC, SON, and network slicing in the 5G Era", IEEE Network, vol. 34, No. 6, pp. 3-4 (Dec. 2020).
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" IEEE 802.Nov. 2020, (Feb. 26, 2021).
ETSI GS NFV-INF 003 V2.4.1 (Feb. 2018).
O-RAN Alliance WGI, "Near-Real-time RAN Intelligent Controller, E2 Application Protocol (E2AP)" vol.01 (Jul. 2020) ("O-RAN.WG3.E2AP-v01.01").
O-RAN Alliance WG4, O-Ran Fronthaul Management Plane Specification, version 2.0 (Jul. 2019) ("ORAN-WG4.MP.••v02.00.00").
Fielding et al., "Hypertext Transfer Protocol (HTTP/1.1): Semantics and Content", IETF RFC 7231 (Jun. 2014).
3GPP TS 38.470 v16.3.0 (Oct. 2, 2020).
Nottingham, "URI Design and Ownership", IETF RFC 8820 (Jun. 2020).
3GPP TS 23.214 V0.0.0. (Jul. 2016).
ETSI GS MEC 009 V2.1.1 (Jan. 2019).
3GPP TS 29.522 v15.3.0 (Apr. 2019).
3GPP TS 36.401 v16.0.0 (Jul. 16, 2020).
3GPP TS 38.401 v16.3.0 (Oct. 2, 2020).
5G gNB or ng-eNB 3GPP TS 38.300 v16.3.0 (Oct. 2, 2020).
Mao et al., "A survey on mobile edge computing: The communication perspective," IEEE Communications Surveys & Tutorials, vol. 19, No. 4, pp. 2322-2358 (4th Quarter 2017).
Majdm et al., "Artificial intelligence enabled software defined networking: A comprehensive overview," IET Networks, vol. 8, issue 2, pp. 79-99 (Mar. 2019).
ETSI GS NFV-IFA 009 V1.1.1 (Jul. 2016).
ORAN-WG4.MP.O-v02.00.00, O-RAN Alliance WG4, "O-Ran Fronthaul Control, User and Synchronization Plane Specification 4.0" (Jul. 2020) ("ORAN-WG4.CUS.O-v04.00").
"Openstack++ for Cloudlet Deployments", available at http://reports-archive.adm.cs.cmu.edu/anon/2015/CMU-CS-15-123.pdf.
3GPP TS 36.420 v16.0.0 (Jul. 17, 2020).
"RESTful Network API for Zonal Presence," Candidate Version 1.0—Mar. 8, 2016, OMA-TS-REST-NetAPI-Zonal Presence-V10-20160308-C.
O-RAN Alliance WG3, "O-Ran Near-Real-time RAN Intelligent Controller Architecture & E2 General Aspects and Principles" vol. 01 ("O-RAN.WG3.E2GAP-v01.01").
Berners• Lee et al., "Uniform Resource Identifier (URI): Generic Syntax", IETF Network Working Group, RFC 3986 (Jan. 2005).
3GPP TR 32.842 v13.1.0 (Dec. 21, 2015).

* cited by examiner

GRAPH NEURAL NETWORK AND REINFORCEMENT LEARNING TECHNIQUES FOR CONNECTION MANAGEMENT

RELATED APPLICATIONS

The present application claims priority to U.S. Provisional App. No. 63/216,828, filed on Jun. 30, 2021, the contents of which is hereby incorporated by reference in its entirety.

TECHNICAL FIELD

The present disclosure is generally related to edge computing, network communication, resource allocation, compute management, communication system implementations, and artificial intelligence (AI) and machine learning (ML) techniques, and in particular, to AI/ML frameworks for load-aware connection management.

BACKGROUND

Wireless communications systems, both cellular and non-cellular have been evolving over the past several years. With the advent of fifth generation (5G) cellular wireless networks which is considered as the cellular standard to enable emerging vertical applications such as industrial internet of things (IIoT), extended reality (XR), and autonomous systems (see Andrews et al., "What Will 5G Be?", IEEE Journal on Selected Areas in Communications, vol. 32, no. 6, pp. 1065-1082 (3 Jun. 2014)). These systems impose stringent communication and computational requirements on the infrastructure serving them to deliver seamless, real-time experiences to users (see Evans, "The Internet of Things: How the Next Evolution of the Internet is Changing Everything", Cisco Internet Business Solutions Group (IBSG), White Paper, San Jose, CA, USA (April 2011)). Traditionally, macro base stations provide cellular radio connectivity for devices. This approach has issues such as coverage holes, call drops, jitter, high latency, and video buffering delays.

Connection management is a widely used network solution to achieve optimal load distribution based on expected objectives. Traditionally, a user equipment (UE) triggers a handover request based on wireless channel quality measurements. The handover request is then processed by the central unit (CU). This process can be inefficient and slow. Moreover, existing connection management techniques are performed using a UE-centric approach rather than a context-aware, network-level global approach.

One common UE-centric technique is received signal reference power (RSRP) based cell-UE association. When a UE moves away from a serving cell, the RSRP from the serving cell will degrade with time while its RSRP with a target cell will increase as it gets closer to it. Therefore, a simple UE-centric maximum RSRP selection approach involves switching to new cell when RSRP from the target cell is stronger than the current serving cell. While this greedy approach is simple and effective, it does not take into consideration the network status locally or globally. Moreover, the existing solutions do not guarantee load balancing leading to scenarios where a cell is heavily loaded and congested while its neighboring cell is underutilized, which is a very inefficient use of network and compute resources.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
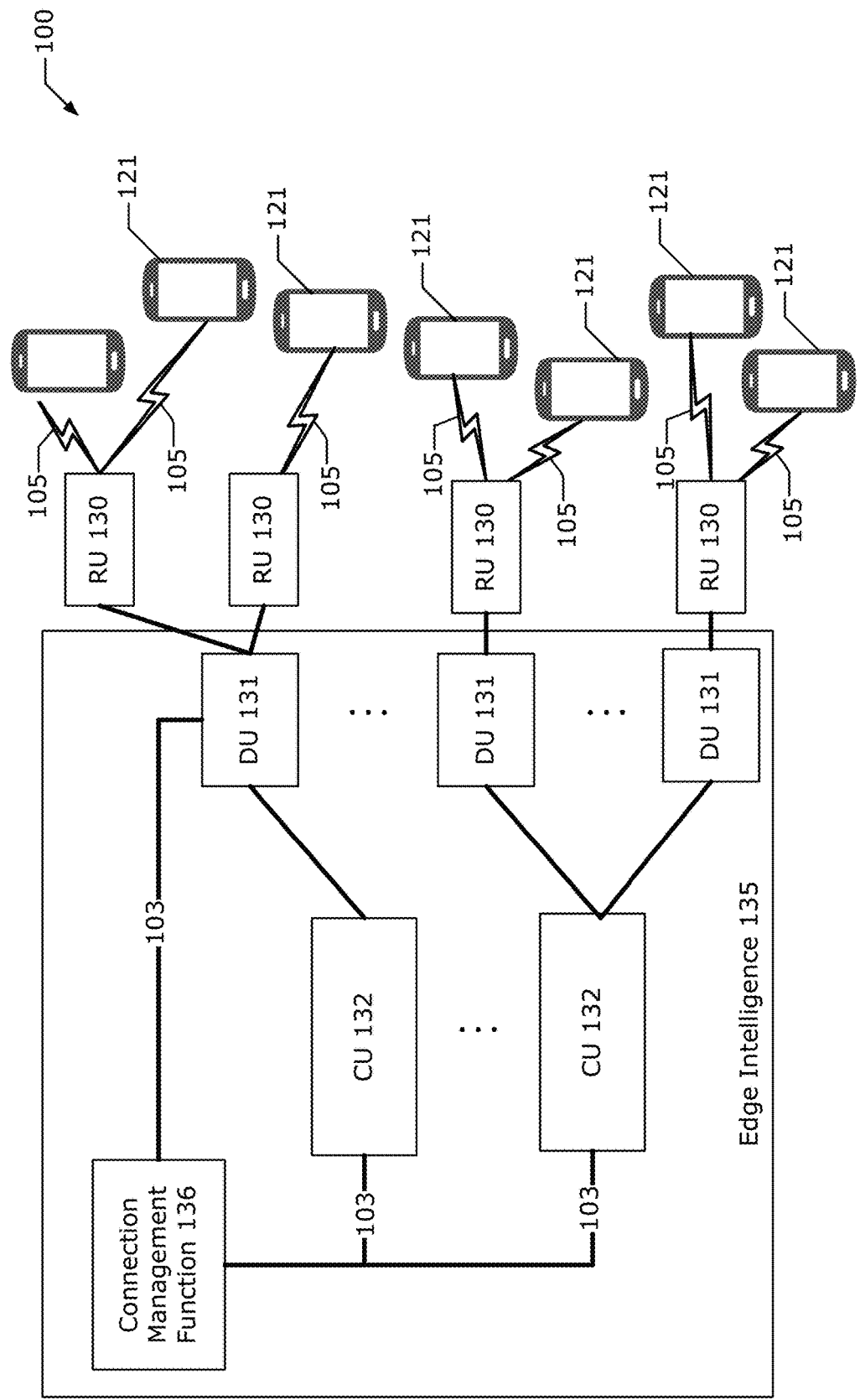
FIG. 1 depicts an example network architecture.

Connection management and network management are used by many wireless networks to ensure smooth and well-balanced traffic load across the network. Traditional methods for connection management (e.g., user association) use sub-optimal and greedy mechanisms such as providing a connection of each user to a base station with a maximum receive power. Network performance can be improved by leveraging machine learning (ML) and artificial intelligence (AI)-based techniques.

Cloud computation (as opposed to local, on-device computation) may be used to support the large computational requirements of the emerging vertical applications mentioned previously. However, the communication latency to the cloud service can potentially be very large, resulting in negative user experiences. Multi-access Edge Computing (MEC) addresses this problem by bringing computation resources closer to end users to avoid the typical large delays mentioned above (see e.g., [MEC], and Abbas et al., "Mobile edge computing: A survey," in IEEE Internet of Things Journal, vol. 5, no. 1, pp. 450-465 (February 2018)). However, to holistically address the issue, the radio access network (RAN) supporting the connection between user devices and an edge server needs to be reliable, have high throughput (data rate), and low latency. The network should be enhanced in parallel or jointly with edge computing frameworks to fulfill the requirements for the emerging applications (see e.g., Mao et al., "A survey on mobile edge computing: The communication perspective," IEEE Communications Surveys & Tutorials, vol. 19, no. 4, pp. 2322-2358 (4th Quarter 2017)).

Network densification can potentially address the connectivity issues mentioned previously. Network densification can be accomplished by, for example, deploying numerous small cells and bringing the radio access network (RAN) closer to the end users. However, network densification in these ways plays the same role for radio connectivity (see e.g., Kuklinski et al., "A perspective of O-RAN integration with MEC, SON, and network slicing in the 5G Era", IEEE Network, vol. 34, no. 6, pp. 3-4 (December 2020)). Accordingly, the present disclosure provides various techniques and technologies for a scalable and intelligence infrastructure to enable an autonomous and self-organized network (SON) of access networks and/or cells, and data-driven radio connection management wireless links (see e.g., Majdm et al., "Artificial intelligence enabled software defined networking: A comprehensive overview," IET Networks, vol. 8, issue 2, pp. 79-99 (March 2019)).

The present disclosure provides an ML/AI-based framework for load-aware connection management and/or handover management to optimize user associations/connections and load balancing to fulfill QoS requirements. In embodiments, a graph neural networks (GNN) is used to model or otherwise represent a network, including heterogeneous RANs with multiple types of network elements/nodes such as UEs, central units (CUs), distributed units (DUs), and/or radio units (RUs) and/or multiple RAT types such as one or more WLAN APs, one or more cellular RAN nodes, and the like. These network elements/nodes can interact with one another using standardized and/or predetermined interfaces. Each network element/node in the network is represented as a node in the graph or GNN, and each interface is represented as an edge in the graph/GNN. Representing such a network as a graph allows relevant features to be extracted from network logical entities using GNN tools such as graph convolutional neural network (CNN), spatial-temporal neural network, and/or the like. These tools can learn hidden spatial and temporal features of the network with different scales and configurations without significant performance losses. In addition, GNNs can model entire (e.g., very large scale) heterogeneous and/or irregular networks and enable scalable local processing. Simulation results show that the embodiments discussed herein can achieve up to 10% gain in throughput, 45-140% gain in cell coverage, 20-45% gain in load balancing depending on network deployment configurations (at least in comparison with existing approaches).

The embodiments discussed herein are also scalable and feasible on various RAN platforms. The intelligent connection management mechanism discussed herein may be implemented using a suitable edge computing framework such as the O-RAN network architecture (see e.g., [AD6784-Z]). Additionally or alternatively, the solutions discussed herein can be specified in suitable standards such as a GNN and/or RL solution at xApp in O-RAN-RIC, 3GPP standards (e.g., [SA6Edge]), ETSI standards (e.g., [MEC]), O-RAN standards (e.g., [O-RAN]), Intel® Smart Edge Open (formerly OpenNESS) standards (e.g., [ISEO]), IETF standards or RFCs (e.g., MAMS [RFC8743]), and/or WiFi standards (e.g., [IEEE80211], [WiMAX], [IEEE16090], etc.). Additionally or alternatively, the embodiments discussed herein may be implemented as software elements that may be provisioned to any of the aforementioned platforms and/or any other suitable platform as discussed herein.

1. Connection Management Embodiments 1.1. System Architecture

FIG. 1 shows an example network architecture 100 where the protocol stack is split between centralized units (CUs) 132 and distributed units (DUs) 131. The network architecture 100 includes edge intelligence 135. The edge intelligence 135 includes a connection management function (CMF) 136 and a number of CUs 132. The network architecture 100 also includes a number of DUs 131, and N number of radio units (RUs) 130 where Nis a number. Each DU 131 is communicatively coupled with one CU 132 and one or more UEs 121. The UEs 121 may be the same or similar as the nodes 1020 and/or 1010 discussed infra with respect to FIG. 10. Additionally or alternatively, a DU 131 can be communicatively coupled with the CMF 136. In general, the edge network 100 includes a CMF 136 co-located with one or more CUs 132, DUs 131, RUs 130, and UEs 121. The CUs 132 and some DUs 131 have wired and/or wireless backhaul links 103 to the CMF 136 and supports wireless access 105 to the UEs 121.

The CUs 132 are central controllers that can serve or otherwise connect to multiple DUs 131 and multiple RUs 130. The CUs 132 are network (logical) nodes hosting higher/upper layers of a network protocol functional split. For example, in the 3GPP NG-RAN and/or O-RAN architectures, a CU 132 hosts the radio resource control (RRC) (see e.g., 3GPP TS 38.331 v 16.6.0 (2021 Sep. 28) ("[TS38331]"), Service Data Adaptation Protocol (SDAP) (see e.g., 3GPP TS 37.324 v 16.3.0 (2021 Jul. 6)), and Packet Data Convergence Protocol (PDCP) (see e.g., 3GPP TS 38.323 v 16.5.0 (2021 Sep. 28)) layers of a next generation NodeB (gNB), or hosts the RRC and PDCP protocols when included in or operating as an E-UTRA-NR gNB (en-gNB). The gNB-CU 132 terminates the F1 interface connected with the gNB-DU 131. Additionally or alternatively, each CU 132 may be connected to one or more DUs 131.

Each DU 131 controls radio resources, such as time and frequency bands, locally in real time, and allocates resources to one or more UEs 121. The DUs 131 are network (logical) nodes hosting middle and/or lower layers of the network protocol functional split. For example, in the 3GPP NG-RAN and/or O-RAN architectures, a DU 131 hosts the radio link control (RLC) (see e.g., 3GPP TS 38.322 v 16.2.0 (2021 Jan. 6)), medium access control (MAC) (see e.g., 3GPP TS 38.321 v 16.6.0 (2021 Sep. 27)), and high-physical (PHY) (see e.g., 3GPP TS 38.201 v 16.0.0 (2020 Jan. 11)) layers of the gNB or en-gNB, and its operation is at least partly controlled by gNB-CU 132. One gNB-DU 131 supports one or multiple cells, and one cell is supported by only one gNB-DU 131. A gNB-DU 131 terminates the F1 interface connected with a gNB-CU 132. Additionally or alternatively, each DU 131 may be connected to one or more RUs 130.

The RUs 130 are transmission/reception points (TRPs) or remote radio heads (RRHs) that handle radiofrequency (RF) processing functions. The RUs 130 are network (logical) nodes hosting lower layers based on a lower layer functional split. For example, in the 3GPP NG-RAN and/or O-RAN architectures, an RU 130 hosts the low-PHY layer (e.g., fast Fourier transform (FFT), inverse FFT (iFFT), physical random access channel (PRACH) extraction, etc.).

Each of the CUs 132, DUs 131, and RUs 130 are connected through respective links, which may be any suitable wireless, wired (e.g., fiber, copper, etc.) links. Additional aspects of CUs 132, DUs 131, and RUs 130 are discussed in [AD6784-Z], [O-RAN], 3GPP TS 38.401 v 16.7.0 (2021 Oct. 1) ("[TS38401]"), 3GPP TS 38.410 v 16.4.0 (2021 Oct. 1) ("[TS38410]"), and 3GPP TS 38.300 v 16.7.0 (2021 Sep. 27) ("[TS38300]"), the contents of each of which are hereby incorporated by reference in their entireties.

In some implementations, the CUs 132, DUs 131, and/or RUs 130 may be Integrated Access and Backhaul (IAB) nodes. IAB enables wireless relaying in an NG-RAN where a relaying node (referred to as an "IAB-node") supports access and backhauling via 3GPP 5G/new radio (NR) links/interfaces. The terminating node of NR backhauling on the network side is referred to as an "IAB-donor", which represents a RAN node (e.g., a gNB) with additional functionality to support IAB. Backhauling can occur via a single or via multiple hops. All IAB-nodes that are connected to an IAB-donor via one or multiple hops form a directed acyclic graph (DAG) topology with the IAB-donor as its root. The IAB-donor performs centralized resource, topology and route management for the IAB topology. The IAB architecture is shown and described in [TS38300]. In some implementations, various CU 132-DU 131-RU 130 combinations may correspond to the NANs 1031-1033 of FIG. 10.

The network architecture 100 (or edge intelligence 135) may be or include an edge computing technology (ECT). In these implementations, the CMF 136 may be implemented as an edge application operated by an edge compute node (e.g., edge compute node 1036 of FIG. 10).

In a first example implementation, the network architecture 100 (or edge intelligence 135) is implemented using the MEC framework (see e.g., [MEC]). In these implementations, the CMF 136 is a MEC host/server, part of a MEC platform, or is a MEC app operated by a MEC host or MEC platform.

In a second example implementation, the CMF 136 can be, or are operated by a Multi-Access Management Services (MAMS) server or a MAMS client (see e.g., Kanugovi et al., "Multi-Access Management Services (MAMS)", Internet Engineering Task Force (IETF), Request for Comments (RFC) 8743 (March 2020) ("[RFC8743]")). In these implementations, an edge compute node 1036 and/or one or more cloud computing nodes/clusters may be the MAMS server, and the CMF 136 is a Network Connection Manager (NCM) for downstream/DL traffic or a Client Connection Manager (CCM) for upstream/UL traffic. An NCM is a functional entity that handles MAMS control messages from clients (e.g., UEs 121), configures the distribution of data packets over available access paths 105 and (core) network paths 103, and manages user-plane treatment (e.g., tunneling, encryption, etc.) of the traffic flows (see e.g., [RFC8743]). The CCM is the peer functional element in a client (e.g., UEs 121) that handles MAMS control-plane procedures, exchanges MAMS signaling messages with the NCM, and configures the network paths 105/103 at the client for the transport of user data (e.g., network packets, etc.) (see e.g., [RFC8743]).

In a third example implementation, the CMF 136 can be part of a 3GPP edge computing architecture (see e.g., [SA6Edge]). In these implementations, the CMF 136 is implemented as an Edge Application Server (EAS), Edge Enabler Server (EES), and/or Edge Configuration Server (ECS) in an Edge Data Network (EDN).

In a fourth example implementation, the CMF 136 can be part of the O-RAN framework (see e.g., [O-RAN]). In these implementations, the CMF 136 can be part of a RAN Intelligent Controller (RIC) such as a Non-Real Time (RT) RIC or a Near-RT RIC. Additionally or alternatively, the CMF 136 can be implemented as an xApp operated by a RIC. As discussed in more detail infra with respect to FIG. 3, the RICs leverage AI/ML techniques to embed intelligence at every layer of the O-RAN architecture. Additionally or alternatively, in O-RAN implementations, the CUs 132 are O-RAN CUs (also referred to as "O-CUs 132"), the DUs 131 are O-RAN DUs (also referred to as "O-DUs 131"), and the RUs 130 are O-RAN RUs (also referred to as "O-RUs 130"). In O-RAN implementations, network management is hierarchical with a mix of central and distributed controllers located at a CU 132, DUs 131, and/or RUs 130, respectively.

In a fifth example implementation, the CMF 136 can be part of a cellular network such as a 3GPP 5th Generation (5G) core network (5GC). In these implementations, the CMF 136 can be part of an existing network function (NF) or application function (AF) residing in, or connected to other NFs in the core network. Alternatively, the CMF 136 can be implemented as a new NF within the core network.

In addition or alternatively to the various examples mentioned previously, the CMF 136 techniques and technologies can be applied to other types of networks of different communicating nodes. In some examples, a network can comprise a set of autonomous or semi-autonomous nodes (e.g., autonomous driving vehicles (AVs), robots, drones, unmanned aerial vehicles (UAVs), Internet of Things (IoT) devices, autonomous sensors, etc.) where the (semi-)autonomous nodes organize the communications amongst themselves. In these examples, one of the autonomous nodes, a gateway device, network appliance, or other like element takes the role of (or operates) the CMF 136. In these examples, the connections or links between the autonomous nodes may be cellular links (e.g., 5G/NR, LTE, WiMAX, and/or any others discussed herein), WLAN links (e.g., WiFi, and/or any others discussed herein), vehicle-to-everything (V2X) links/connections (e.g., cellular V2X, ITS-G5, DSRC, etc.), short-range and/or wireless personal area network (WPAN) technologies (e.g., Bluetooth/BLE, ZigBee, WiFi-direct, and/or any others discussed herein), and/or any other suitable access technology. In another example, a network can comprise a set of servers, hardware accelerators, and switch fabric in one or more data centers or other like facility that may be spread across one or more geographic locations. In these examples, a switch fabric, one or more of the servers (or a virtual machine operated by a server), or other like element takes the role of (or operates) the CMF 136. In these examples, the connections or links can be a suitable switch or interconnect technology. Additionally or alternatively, the connection management techniques and technologies can also be applied to other types of networks and/or RATs such as, for example, where the CU 132, DUs 131, and/or RUs 130 are WiMAX base stations, WiFi access points, gateway devices, network appliances (e.g., switches, routers, hubs, firewalls, etc.), application servers, data aggregators, and/or the like.

1.2. Connection Management

When a UE 121 tries to connect to a network (or network access node (NAN)), a network entity has the functionality to provide initial access by connecting the UE 121 to a cell. Similarly, when a UE 121 moves it needs to keep its connection to the network for smooth operation. These functionalities are called connection management (see e.g., Tayyab et al., "A Survey on Handover Management: From LTE to NR," IEEE Access, vol. 7, pp. 118907-118930 (26 Aug. 2019) ("[Tayyab]")). In addition to managing initial access and mobility, connection management solutions can also be programmed to achieve optimal load distribution. Traditionally, a UE 121 triggers a handover (HO) request based on wireless channel signal/quality measurements. The HO request is then processed by the CU 132. Connection management in existing solutions is performed using a UE-centric approach rather than a context-aware, network-level global approach. A common UE-centric techniques involves using a received signal reference power (RSRP) based cell-UE association. When a UE 121 moves away from a serving cell, the RSRP from the serving cell will degrade with time while its RSRP with a target cell will increase as it gets closer to it. Therefore, a simple UE-centric maximum RSRP selection approach [Tayyab] involves switching to a new cell when the measured RSRP from a target cell is stronger than a threshold or stronger than the measured RSRP of the current serving cell. As mentioned previously, this greedy approach is simple and effective, but does not take into consideration the local and global network status and lacks adequate load balancing.

In an ML-based optimization framework, dynamic particle swarm optimization is used to improve quality of experience of UEs 121 for connection management in Fang et al., "Improve Quality of Experience of Users by Optimizing Handover Parameters in Mobile Networks," Proceedings of the 4th International Conference on Computer Science and Application Engineering (CSAE 2020), Article no. 53, pp. 1-7 (20 Oct. 2020). In Alrabeiah et al., "Millimeter Wave Base Stations with Cameras: Vision Aided Beam and Blockage Prediction," Proc. IEEE 91st Veh. Technol. Conf. (VTC-Spring), pp. 1-5 (25 May 2020), a visual-data-assisted handover optimization is considered by using neural networks (NNs). A more proactive approach by predicting obstacles to associate UEs 121 to new cells before link disconnection is proposed in Wang et al., "Machine Learning for 5G and Beyond: From Model-Based to Data-Driven Mobile Wireless Networks," China Commun., vol. 16, no. 1, pp. 165-175 (4 Feb. 2019). In a more distributed learning framework, Sana et al., "Multi-Agent Deep Reinforcement Learning For Distributed Handover Management In Dense MmWave Networks", Proc. IEEE Int. Conf. Acoust., Speech Signal Process. (ICASSP), pp. 8976-8980 (4 May 2020) investigate UE 121 throughput maximization using multi-agent reinforcement learning (RL), which considers independent handover decisions based on local channel measurements. Similarly, Khosravi et al., "Learning-based load balancing handover in mobile millimeter wave networks," 2020 IEEE Global Communications Conference (GLOBECOM 2020), pp. 1-7 (7 Dec. 2020) studies the same problem using a deep deterministic RL algorithm to solve the resulting non-convex optimization problem. However, these ML algorithms do not utilize structure of wireless networks for the design of NN architecture, and hence, may have performance loss from wireless network dynamics.

The present disclosure uses an ML/AI-based framework for load-aware connection management which incorporates structure of wireless networks into the NN architecture. In particular, GNN and RL are used for handover management. To achieve intelligent and proactive connection management, a given network is abstracted as a graph, in which cells (e.g., RUs 130) and UE 121 are represented by nodes and the quality of the wireless links are given by edge weights. To capture the load-awareness, edge and node labels reflecting features, such as instantaneous load conditions, channel quality, average UE rates, etc. are considered and the proposed joint GNN-RL framework is applied to enable intelligent user handover decisions.

1.3. System Model

Figure 2:
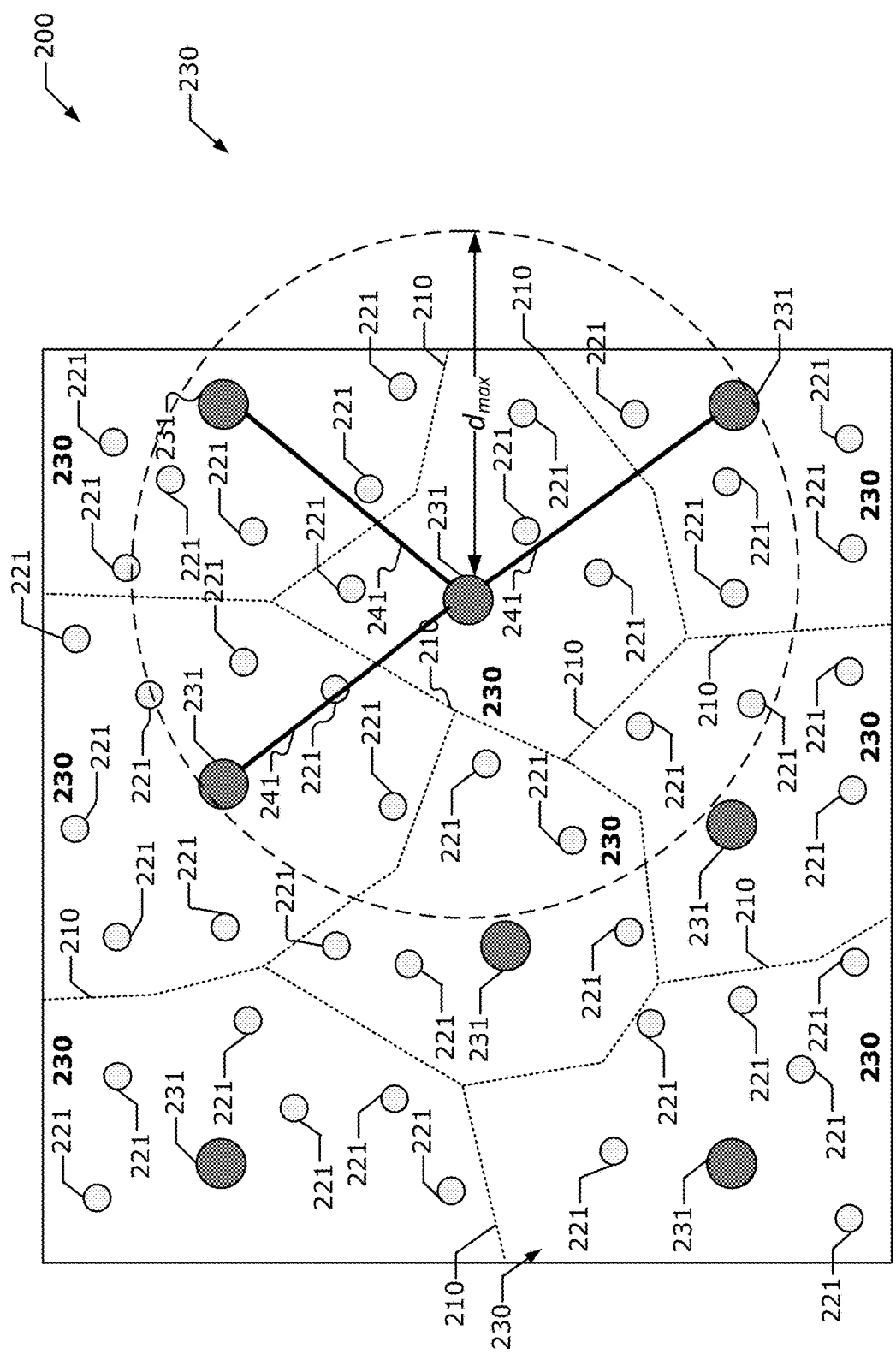
FIG. 2 depicts an example network graph abstraction.

FIG. 2 shows an example graph 200 for a particular network deployment (also referred to as "network 200"). The network 200 includes a plurality of cells 230, where each cell 230 has a cell boundary 210 around a network access node (NAN) 231 that serves or otherwise provides the cell 230. The UEs 221 within a cell boundary 210 are provided network connectivity by the corresponding NAN 231. In other examples, one or more NANs 231 can serve or otherwise provide multiple cells 230 such as, for example, in carrier aggregation (CA) and/or dual connectivity (DC) implementations. Individual NANs 231 correspond to one or more DUs 131 and/or one or more RUs 130 of FIG. 1, and the UEs 221 correspond to the UEs 121 of FIG. 1. In FIG. 2, the NAN-UE connections are depicted as shaded clustering around cells/NANs 231, and the graph of NAN-NAN virtual connections 241 (e.g., the dashed circle in FIG. 2) is decided according to Euclidean distance.

The network 200 includes N NANs 231 or N cells (the terms "NAN", "RU", "DU", and "cell" may be used interchangeably throughout the present disclosure, although these terms refer to different concepts) and M UEs 221 represented as a graph data structure (referred to as "graph $\mathcal{G}$"). Furthermore, for purposes of the present disclosure, the N number of NANs 231/cells and the M number of UEs 221 may be collectively referred to as "network equipment", "network nodes", "communication equipment", "communication nodes", or the like.

The graph data structure mathematically represents the couplings or interconnections various nodes, such as cells/NANs 231 and UEs 221. A graph data structure, or simply "graph", in this context refers to a data structure or data type that comprises a number of (or set of) nodes (also referred to as "vertices," "points," or "objects") that are connected by a number of (or set of) edges, arcs, or lines. The graph 200 is an undirected graph, wherein the edges have no orientation and/or pairs of nodes are unordered. In alternative implementations, the graph 200 may be a directed graph in which edges have an orientation, or where the pairs of vertices are ordered. An edge has two or more vertices to which it is attached, called endpoints. Each circle (or node 221 or 231) in the graph represent 200 a quantity observed at some point in time, some of which consequently change. Any suitable graph algorithm or graph drawing algorithm can be used to generate the graph 200 such as, for example, a tree drawing algorithm, a force-directed graph drawing algorithm, a spectral layout algorithm, and/or any other graph drawing algorithm or technique, such as those discussed in [Tamassia].

The graph 200 is mathematically represented as $\mathcal{G} = (V, \varepsilon)$. The set of cell/NAN nodes 231 in graph g is $V^{cl} = \{v_0^{cl}, \ldots, v_{N-1}^{cl}\}$ and the set of UE nodes 221 in graph $\mathcal{G}$ is $V^{ue} = \{v_0^{ue}, \ldots, v_{M-1}^{ue}\}$ with the set of all nodes in the graph $\mathcal{G}$ given by $V = V^{cl} \cup V^{ue}$.

Graph $\mathcal{G}$ also includes data elements for each existing/current connections 105 between individual UEs 221 and at least one of the NANs 231 (not shown by FIG. 2) and theoretical or potential connections 105 between individual UEs 221 and at least one of the NANs 231. These edges are mathematically represented as $\varepsilon^{ue} = \{e_{v_i^{cl}, v_j^{ue}} | v_i^{cl} \in V^{cl}, v_j^{ue} \in V^{ue}\}$.

Furthermore, graph $\mathcal{G}$ also includes data elements for virtual connections 241 between two or more NANs 231 (also referred to as "virtual edges 241"). Although NANs 231 may be directly connected to a RAN controller/CMF 136 (e.g., an O-RAN RIC) with a tree structure, virtual edges 241 between cells/NANs 231 convey information about their UE connectivity and local graph structure. The use of the virtual edges 241 allows for relationships between different cells/NANs 231 to be accounted for when making connection management decisions for individual UEs 221. Additionally or alternatively, the virtual edges 241 and edges between individual UEs 221 and individual NANs 231 (not shown) can be associated with respective weights or features.

The virtual edges 241 between two or more cells/NANs 231 are mathematically represented as $\varepsilon^{cl} = \{e_{v_i^{cl}, v_j^{cl}} | v_i^{cl}, v_j^{cl} \in V^{cl}\}$. In some implementations, the virtual edges 241 are defined according to Euclidean distance such that there is a link between two NANs 231 if the Euclidean distance between them is smaller than a maximum distance $d_{max}$. The maximum distance $d_{max}$ may be a predefined or configured threshold value. This is one example way in which to define the edges 241, and the edges 241 may be defined in other ways in other implementations. The set of UE nodes 221 connected to a specific cell $v_i^{cl}$ is denoted by equation (1).

$$C(v_i^{cl}) = \left\{ v_j^{ue} \mid e_{v_i^{cl}, v_j^{ue}} \in \varepsilon^{ue}, \forall j \right\} \quad (1)$$

Additionally or alternatively, for every reported measurement for a cell pair ($v_i^{cl}$, $v_j^{cl}$), a score function is calculated as shown by equation (2).

$$(S)_{v_i^{cl}, v_j^{cl}} = (S)_{v_i^{cl}, v_j^{cl}} + f\left(UEmeas_{v_i^{cl}}, UEmeas_{v_j^{cl}}\right) \quad (2)$$

$$(S)_{v_j^{cl}, v_j^{cl}} = (S)_{v_i^{cl}, v_j^{cl}}$$

In equation (2), $UEmeas_{v_i^{cl}}$ is the UE's measurement of cell $v_i^{cl}$ and $UEmeas_{v_j^{cl}}$ is the UE's measurement of cell of $v_j^{cl}$, and f(a, b)=1 or $$f(a, b) = 10^{\frac{-|a-b|}{10}}.$$

Then, an cell-cell adjacency can be identified based on a threshold periodically.

Although the connections between NANs 231 are static for a given deployment, the links 105 between UEs 221 and NANs 231 are dynamic and they depend on the mobility of the UEs 221. In communication theory, the channel capacity quantifies the highest information rate that can be sent reliably (with a relatively small probability of error). The channel capacity between a NAN 231 and a UE 221 with additive white Gaussian noise (AWGN) at the receiver (Rx) is given by equation (3a) and/or equation (3b).

$$c(v_i^{cl}, v_j^{ue}) = \log2\left(1 + \frac{P(v_i^{cl}, v_j^{ue})}{N_0}\right) \text{bits/sec} \quad (3a)$$

$$c(v_i^{cl}, v_j^{ue}) = B\log2\left(1 + \frac{P(v_i^{cl}, v_j^{ue})}{N_0}\right) \text{bits/sec} \quad (3b)$$

In equations (3a) or (3b), $N_0$ is the noise power, and $P(v_i^{cl}, v_j^{ue})$ is RSRP at UE $v_j^{ue}$ from cell/NAN $v_i^{cl}$. In equation (3b), B is the total bandwidth. For purposes of the present disclosure, it is assumed that the interference from neighboring NAN 231 is negligible due to the directionality of links 105. Additionally, the interference from non-assigned nodes is disregard since mmWave frequency narrow beams are known to be power-limited rather than being interference-limited. Each UE 221 measures signal strength/quality (e.g., RSRP, RSRQ, and/or any other like measurement such as those discussed herein) from close-by (proximate) NANs 231 and reports them to the CMF 136. Then, the CMF 136 decides on the connectivity graph between NANs 231 and UEs 221 according to a desired network performance measure. As some examples, the following performance measures (metrics) at the network are considered: throughput, coverage, and load balance. In other words, the CMF 136 may optimize for one or more of throughput, coverage, and/or load balance.

Throughput: given a graph $\mathcal{G}$, the network throughput is defined as a total data rate it can deliver to the UEs 121 in the network. The throughput is computed as shown by equation (4), where $U_{th}$ is a network throughput utility function. Here, equal resource allocation between UEs 221 connected to the same NAN 231 are considered.

$$U_{th}(\mathcal{G}) = \sum_{i=0}^{N-1} \sum_{j=0}^{M-1} \frac{c(v_i^{cl}, v_j^{ue})}{|C(v_i^{cl})|} \text{bits/sec} \quad (4)$$

Coverage: UEs 221 can be classified as cell-centric UEs or cell-edge UEs depending on the data rate they get. The data rate of a UE 221 may be referred to herein as a "user rate" or "UE rate". A user is considered as cell-edge if its user rate is below a predetermined or configured threshold. In one example, this threshold value is chosen to be the 5$^{th}$ percentile point of the all UE rates in the network and is the coverage of the network. A higher cell-edge user rate improves network coverage and minimizes coverage holes. Coverage may be expressed according to equation (5) where $U_{cov}$ is a network coverage utility function, $$y \in \left\{ \frac{c(v_i^{du}, v_j^{ue})}{|c(v_i^{du})|}, \forall i, j \right\}$$

and F(•) is a cumulative distribution function (CDF).

$$U_{cov}(\mathcal{G}) = \inf\{y : F(y) < 0.05\} \quad (5)$$

Load balancing: In communication networks, various fairness metrics are considered to ensure equitable allocation of resources (see e.g., Shi, et. al. "Fairness in wireless networks: Issues, measures and challenges," IEEE Communications Surveys & Tutorials, vol. 16, no. 1, pp. 5-24, (17 May 2013) ("[Shi]"), the contents of which is hereby incorporated by reference in its entirety). In some implementations, Jain's index is used to quantitatively measure fair resource allocation between users, and defined according to equation (6) where $U_{Jain}$ is a network load balancing utility function. Additional or alternative fairness measurements may be used, such as any of those discussed in [Shi].

$$U_{Jain}(\mathcal{G}) = \frac{\left[\sum_{i=0}^{N-1} |C(v_i^{cl})|\right]^2}{M \sum_{i=0}^{N-1} |C(v_i^{cl})|^2} \quad (6)$$

The optimization problem formulation discussed herein finds the optimal graph $\mathcal{G}^*$ leading to the best UE 221-NAN 231 association such that a combination of the aforementioned performance measures is/are maximized. The optimization problem resulting in the optimal network topology/graph $\mathcal{G}^*$ can then be formulated according to equation (7).

$$\mathcal{G}^* = \arg\max_{\mathcal{G}} U(\mathcal{G}) \quad (7)$$

In equation (7), "arg max" refers to the arguments of the maxima, which are the points or elements of the domain of the $U(\mathcal{G})$ function at which the function values are maximized, or a set of points in g for which the $U(\mathcal{G})$ function attains the function's largest value (if it exists). Additionally, $U(\mathcal{G})$ can be any of the previously discussed performance measures (e.g., as discussed with respect to equations (4), (5), and (6)) and/or a weighted combination of performance measures defined previously.

1.4. Graph Neural Network Aspects

Graph Neural Networks (GNNs) are a framework to capture the dependence of nodes in graphs via message passing between the nodes. Unlike deep neural networks (DNNs), GNNs directly operate on a graph to represent information from its neighborhood with arbitrary hops. Additionally, GNNs learn embeddings of various graph attributes (e.g., nodes, edges, and global attributes/parameters). GNNs are an apt tool to use for wireless networks, which have complex features that cannot be captured in a closed form. In this disclosure, the GNN-based approach is considered by incorporating NAN-UE relationships between nodes as well as channel capacities over the edges.

For a given network with a set of N cells/NANs 231 and M UEs 221, two adjacency matrices are defined, including $A_{cl} \in \{0,1\}^{N \times N}$ for the graph between cells/NANs 231 (e.g., including the set of virtual edges 241), and $A_{ue} \in \{0,1\}^{N \times M}$ for the graph including connections between UEs 221 and cells/NANs 231. $A_{cl}$ and $A_{ue}$ are expressed according to equations (8) and (9).

$$A_{cl}(i,j) = \begin{cases} 1 & \text{if } e_{v_i^{cl}, v_j^{cl}} \in \varepsilon^{cl} \\ 0 & \text{o.w.} \end{cases} \quad (8)$$

$$A_{ue}(i,j) = \begin{cases} 1 & \text{if } e_{v_i^{cl}, v_j^{ue}} \in \varepsilon^{ue} \\ 0 & \text{o.w.} \end{cases} \quad (9)$$

An L-layer GNN computes on the graph. The initial nodal features of the cells/NANs 231 and UEs 221 are defined as $(X_{cl,1}^{(0)}, X_{cl,2}^{(0)})$ and $X_{ue}^{(0)}$, respectively. Here, $X_{cl,1}^{(0)}$ is a feature vector of initial nodal features related to the graph between individual cells/NANs 231, $X_{cl,2}^{(0)}$ is a feature vector of initial nodal features related to the graph between UEs 221 and cells/NANs 231, and $X_{ue}^{(0)}$ is a feature vector of initial nodal features related to individual UEs 221.

The initial nodal features are functions of reported channel capacities and data rates at the cells/NANs 231 and UEs 221. Where a channel capacity matrix is defined as $C \in \mathbb{R}^{N \times M}$ with elements $c(v_i^{cl}, v_j^{ue})$ and a user rate matrix is defined as $R \in \mathbb{R}^{N \times M}$ with elements $$\frac{c(v_i^{cl}, v_j^{ue})}{|C(v_i^{cl})|}$$

for a given NAN-UE connectivity graph, the input nodal features $X_{cl,1}^{(0)}, X_{cl,2}^{(0)},$ and $X_{ue}^{(0)}$ are calculated according to equations (10), (11), and (12), respectively.

$$X_{cl,1}^{(0)} = [A_{c1} R 1_M \| R 1_M] \in \mathbb{R}^{N \times 2} \quad (10)$$

$$X_{cl,2}^{(0)} = [A_{ue} R^T 1_N \| C 1_M] \in \mathbb{R}^{N \times 2} \quad (11)$$

$$X_{ue}^{(0)} = [C^T 1_N \| R^T 1_N] \in \mathbb{R}^{M \times 2} \quad (12)$$

In equations (10), (11), and (12), [•∥•] is a vector concatenation operator and $1_M$ and $1_N$ are all-ones vector of size M and N, respectively. All the aforementioned latent features capture either node sum rate or sum rates of neighbors in the case of NANs 231, or channel capacity/data rate in the case of UEs 221. These are selected as the features since they capture the information relevant to making good connectivity decisions.

At every layer of the GNN, the GNN computes a d-dimensional latent feature vector for each node $v_i^{cl}, v_j^{cl} \in V$ in graph $\mathcal{G}$. The latent feature calculation at layer; can be written according to equations (13), (14), (15), (16), and (17):

$$H_{cl}^{(l)} = \sigma(X_{cl,1}^{(l)}, W_1^{(l)}) + \sigma(X_{cl,2}^{(l)}, W_2^{(l)}) \in \mathbb{R}^{N \times d} \quad (13)$$

$$H_{ue}^{(l)} = \sigma(X_{ue}^{(l)}, W_3^{(l)}) \in \mathbb{R}^{M \times d} \quad (14)$$

$$X_{cl,1}^{(l+1)} = A_{c1} H_{cl}^{(l)} \in \mathbb{R}^{N \times d} \quad (15)$$

$$X_{ue}^{(l+1)} = A_{ue}^T H_{cl}^{(l)} \in \mathbb{R}^{M \times d} \quad (16)$$

$$X_{cl,2}^{(l+1)} = A_{ue} H_{ue}^{(l)} \in \mathbb{R}^{N \times d} \quad (17)$$

In equations (13), (14), (15), (16), and (17), $w_k^{(0)} \in \mathbb{R}^{2 \times d}$ and $w_k^{(l)} \in \mathbb{R}^{d \times d}$ (for l>0), k=1, 2, 3, are NN weights, l is the layer index of the GNN, σ(•) is a non-linear activation function, and $H_{cl}^{(l)}$ and $H_{ue}^{(l)}$ are auxiliary matrices that represent the sum of hidden features of cell-cell and cell-UE connectivity graphs. Equations (13), (14), (15), (16), and (17) represent a spatial diffusion CNN (see e.g., Zhou et. al. "Graph Neural Networks: A Review of Methods and Applications," arXiv:1812.08434v 1 [cs.LG] (20 Dec. 2018), AI Open, vol. 1, pp. 57-81 (2020) ("[Zhou]")). The L-layer GNN essentially repeats the aforementioned calculation for each layer in the GNN (e.g., l=0, 1, ..., L−1). Through this, features of the nodes are propagated to other nodes and are aggregated at distant nodes. This way each node's feature will contain information about its L-hop neighbors, as the embedding is carried out L-times.

To evaluate the performance of graph $\mathcal{G}$, the feature vectors are combined at the last layer of GNN to get a single scalar-valued score for graph $\mathcal{G}$. The output layer of the GNN is summed over cells/NANs 231, $H_{cl}^{(L-1)}$, which makes the score calculation invariant to permutation over nodes, before passing it to a single layer fully connected NN. Finally, a network score of the graph $\mathcal{G}$ is obtained according to equation (18).

$$Q(\mathcal{G}) = \sigma(1_N^T H_{cl}^{(L-1)} W_4) w_5 \quad (18)$$

In equation (18), σ is a non-linear activation function, $1_N^T$ is an all-ones vector of size N, $W_4 \in \mathbb{R}^{d \times d}$ is fully connected NN weight matrix, and $w_5 \in \mathbb{R}^{d \times 1}$ is vector to combine the NN output, linearly.

Once the GNN computations are complete, the score of graph $\mathcal{G}$ (i.e., score $Q(\mathcal{G})$) will be used to select the best or optimal connection graph among a (sub)set of feasible graphs. Next, the score functions are used to learn the optimal weights $W_k^{(l)}$, ∀k, l, and $w_5$. The learning procedure to learn the optimal weights $W_k^{(l)}$, ∀k, l, and $w_5$ is described in section 1.5.

1.5. Deep Q-Learning Algorithm

In general, the GNN can be trained using different reinforcement learning (RL) techniques. In embodiments, a deep Q-learning approach (see e.g., [Sutton]) is used to learn a Q-function Q(•) from NAN 231 and UE 221 deployment instances and the corresponding reward is obtained from the network environment. One advantage of the GNN formulation as an NN for Q-function is that GNN is scalable to different graph sizes and can capture local network features with variable numbers of cells/NANs 231 and UEs 221. To make the best (optimal) selection for UE connectivity, the right Q-function needs to be learned. As the Q-function is captured through the GNN, this translates to learning the parameters of the GNN which is done through sequential addition of new NAN-UE connections to partially connected graph. The state, action, and reward in the deep RL (DRL) framework are defined as follows.

State $s_t$: The state is defined as the current graph $\mathcal{G}_t$ containing the cells/NANs 231 and connected UEs 221 at iteration t as well as input features of nodes ($X_{cl,1}^{(0)}$, $X_{cl,2}^{(0)}$) and $X_{ue}^{(0)}$. The start (initial) state $s_0$ can be considered as partially connected network with connected and unconnected UEs 221. The terminate state $s_T$ is achieved when all the UEs 221 in the network are connected to a NAN 231.

Action $a_t$: The action $a_t = \mathcal{G}_t \cup e_{v_i^{cl}, v_j^{ue}}$ or $a_t = \varepsilon^{ue} \cup e_{v_i^{cl}, v_j^{ue}}$ at step t is to connect a unconnected UE 221 to one of the NANs 231.

Reward $r(s_t, a_t)$: The reward at state $s_t$ after selecting action $a_t$ is shown by equation (19).

$$r(s_t, a_t) = U(\mathcal{G}_t) - U(\mathcal{G}_{t-1}) \quad (19)$$

In this example, the reward in equation (19) is defined as the change in the network utility function after connecting a new UE 221. Section 1.7.1 (infra) provides various reward functions for the performance measures given in section 1.3 (supra).

Policy $\pi(a_t|s_t)$: A deterministic greedy policy is used as shown by equation (20), with $\epsilon$-greedy exploration during training.

$$\pi(a_t|s_t) = \arg\max_{a_{t+1}} Q(s_{t+1}, a_{t+1}) \quad (20)$$

DQN-Algo is an algorithm for a deep Q-learning network (DQN) based connection management according to various embodiments.

| DQN-Algo |
| --- |
| 1  Randomly initialize weights $W_k^{(l)}$, $\forall k$, l, and $w_5$ |
|    //normally distributed with random small variance. |
| 2  Define number of network deployment scenarios I, episodes K, and GNN layers L |
| 3  for deployment i = 1 : I do |
| 4      for deployment i, get $\mathcal{G}_0$, $X_{cl,1}^{(0)}$, $X_{cl,2}^{(0)}$, and $X_{ue}^{(0)}$ |
| 5      initialize state $s_0 = \mathcal{G}_0$ //cell-cell connectivity graph defined |
| 6          //in section 1.3 and initial cell-UE pairings |
| 7      for step t = 1 : T − 1 do |
| 8          take action $a_t \sim \pi(a_t|s_t)$ |
| 9          move to the next state $\mathcal{G}_t \leftarrow s_t \cup e_{v_i^{cl}, v_j^{cl}}$ |
| 10         compute input features $X_{cl,1}^{(0)}$, $X_{cl,2}^{(0)}$, and $X_{ue}^{(0)}$ |
| 11         observe reward $r(s_t, a_t)$ |
| 12         perform L-layer GNN in (equation (18)) to compute |
| 13             $Q(s_t, a_t)$ and equation (A1a) |
| 14         update parameters: |
| 15             $W_k^{(l)} \leftarrow W_k^{(l)} + \alpha(y - Q(s_t, a_t))\nabla_{W_k^{(l)}}Q(s_t, a_t)$ |
| 16             $w_5 \leftarrow w_5 + \alpha(y - Q(s_t, a_t))\nabla_{w_5}Q(s_t, a_t)$ |
| 17         Use $\epsilon$ −greedy policy (equation (A1b)) |

$$y = \gamma \max_{a_{t+1}} Q(s_{t+1}, a_{t+1}) + r(s_t, a_t) \quad (A1a)$$

$$\pi(a_{t+1}|s_{t+1}) = \begin{cases} a_{t+1} = e_{v_i^{cl}, v_j^{cl}}, & w.p.\epsilon \\ \arg\max_{a_{t+1}} Q(s_{t+1}, a_{t+1}), & o.w. \end{cases} \quad (A1b)$$

In DQN-Algo and/or equations (A1a) and (A1b), $\gamma$ is a discount factor, $\alpha$ is the learning rate, and Q(s, a) is a quality value function (also referred to as a "Q function" or "State-Action Value function"). A quality value (or "Q value") is determined from the Q function (Q(s, a)) using states (e.g., states $s_0$ to $s_{T-1}$) and actions (e.g., actions $a_0$ to $a_{T-1}$) as inputs. The Q value is a measure of the overall expected reward r when an RL agent (e.g., CMF 136) is in state s and performs action a, and then continues until the end of the episode following some policy $\pi$ (also referred to as a "decision-making rule $\pi$" or "decision-making rules $\pi$"). Additionally or alternatively, the Q function maps a state-action pair to its Q value.

In DQN-Algo, the parameters are first initialized and defined for each deployment (e.g., a set of UEs 221 and their connections to respective NANs 231). State $s_0$ is initialized to $\mathcal{G}_0$, which is cell-cell connectivity graph discussed previously and some initial cell-UE pairings (e.g., existing UE-cell connections). In each step t, an action $a_t$ is taken, which involves connecting at least one UE 221 to at least one candidate NAN 231 following the policy $\pi(a_t|s_t)$. This action (e.g., a connection) may be mathematically represented as $a_t = e_{v_i^{cl}, v_j^{ue}}$. The policy $\pi(a_t|s_t)$ may be an $\epsilon$-greedy policy, where $\epsilon$ is an exploration rate. In some implementations, the RL-agent (e.g., CMF 136) may adjust the exploration rate $\epsilon$ by, for example, initially setting the exploration rate $\epsilon$ to be 1 and then decaying $\epsilon$ by some amount at the start of each episode k. The number of steps T is given by the termination state $s_t$. The graph $\mathcal{G}_t$ is updated, so that the next step $s_{t+1}$ is obtained. The new node input features $X_{cl}^{(0)}$ and $X_{ue}^{(0)}$ are calculated every time the graph is updated, and the reward $r(s_t, a_t)$ is calculated for each selected action. The L-layer GNN computation provides the score (e.g., Q-score) for each state-action pair. Then, to learn the NN weights $W_k^{(l)}$, $\forall k$, l, and $w_5$, the Q-learning mechanism updates parameters by performing stochastic gradient descent (SGD) to minimize the squared loss $E\{(y-Q(s_t, a_t))^2\}$, with y being defined in equation (A1a), and E is a value representing expectation or average loss value. The DQN-Algo reflects the training phase. Once training is performed, the NN weights are not further updated, and the NN weights are used to directly obtain the actions for unseen deployment instances. In one example, after the training phase, lines 14-16 in DQN-Algo may be skipped or omitted.

1.6. Example Connection Management Controller Implementations

As mentioned previously, the CMF 136 can be implemented using the O-RAN framework (see e.g., [O-RAN]), where the CMF 136 can be implemented as an xApp operated by a RIC. In O-RAN, xApps are applications designed to run on the near-RT RIC to provide one or more microservices. The microservices obtain input data through interfaces between the RIC and RAN functionality, and provide additional functionality as output data to a RAN. In various embodiments, the CMF 136 is implemented as a scalable xApp that provides connection management for network deployments. The examples discussed infra involve a GNN-RL model being used for "connection events" (sometimes referred to as "measurement events" or "mobility events") in which mobile users in a network request new connections, which may include, for example, connection establishment, connection re-establishment, connection reconfiguration, connection release (e.g., to re-direct the UE 221) to a different frequency or carrier frequency), connection suspension, connection resumption, handovers, cell selection or cell re-selection, measurement report triggering, radio link failure/recovery, WiFi associate messages, WiFi reassociate messages, WiFi disassociate messages, WiFi measurement requests and/or measurement reports, WiFi channel switch, and/or other mobility and state transitions (see e.g., [TS38300], [TS38331], [IEEE80211], [WiMAX], 3GPP TS 38.304 v 16.6.0 (2021 Sep. 27) ("[TS38304]"), and 3GPP TS 38.133 v 17.3.0 (2021 Oct. 4) ("[TS38133]"), the contents of each of which are hereby incorporated by reference in their entireties). In one example, a UE 221 performs signal/cell measurements continuously or in response to some configured trigger condition and reports the measurements to the RAN/RAN node when certain conditions are met (e.g., as defined in [TS38300], [TS38331], [TS38304], [TS38133], and/or other 3GPP standards). For signal/cell measurements, the network can configure one or more types of measurements (e.g., RSRP, RSRQ, SINR, RSCP, $E_c N_0$, etc.) as trigger quantity. The collection of measurements at a UE 221 and/or receipt of a measurement report from a UE 221 may be considered to be a "measurement event" or "connection event". When the CMF 136 detects a connection event (e.g., receipt of a measurement report, an HO request for an intra-RAT HO and/or inter-RAT HO, cell selection message, cell reselection message, radio link failure detection and recovery message(s), beam failure detection and recovery message(s), WiFi associate messages, WiFi reassociate messages, WiFi disassociate messages, WiFi measurement requests and/or measurement reports, WiFi channel switch, and the like), the CMF 136 operates the GNN-RL model to make new connection decisions to optimize the network 100 such as by balancing the load across the network 100.

Figure 3:
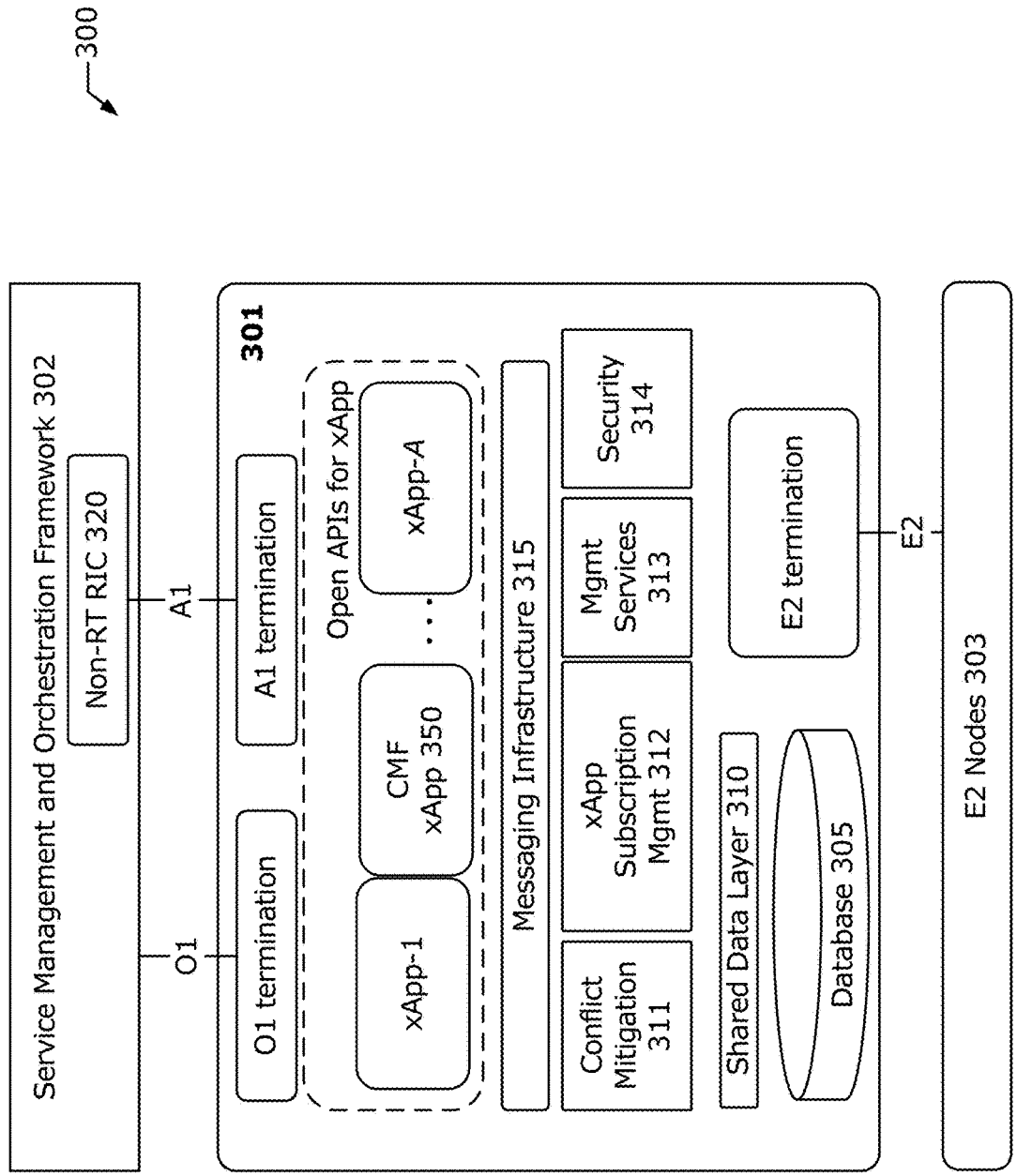
FIG. 3 depicts an O-RAN RIC internal architecture.
Figure 4:
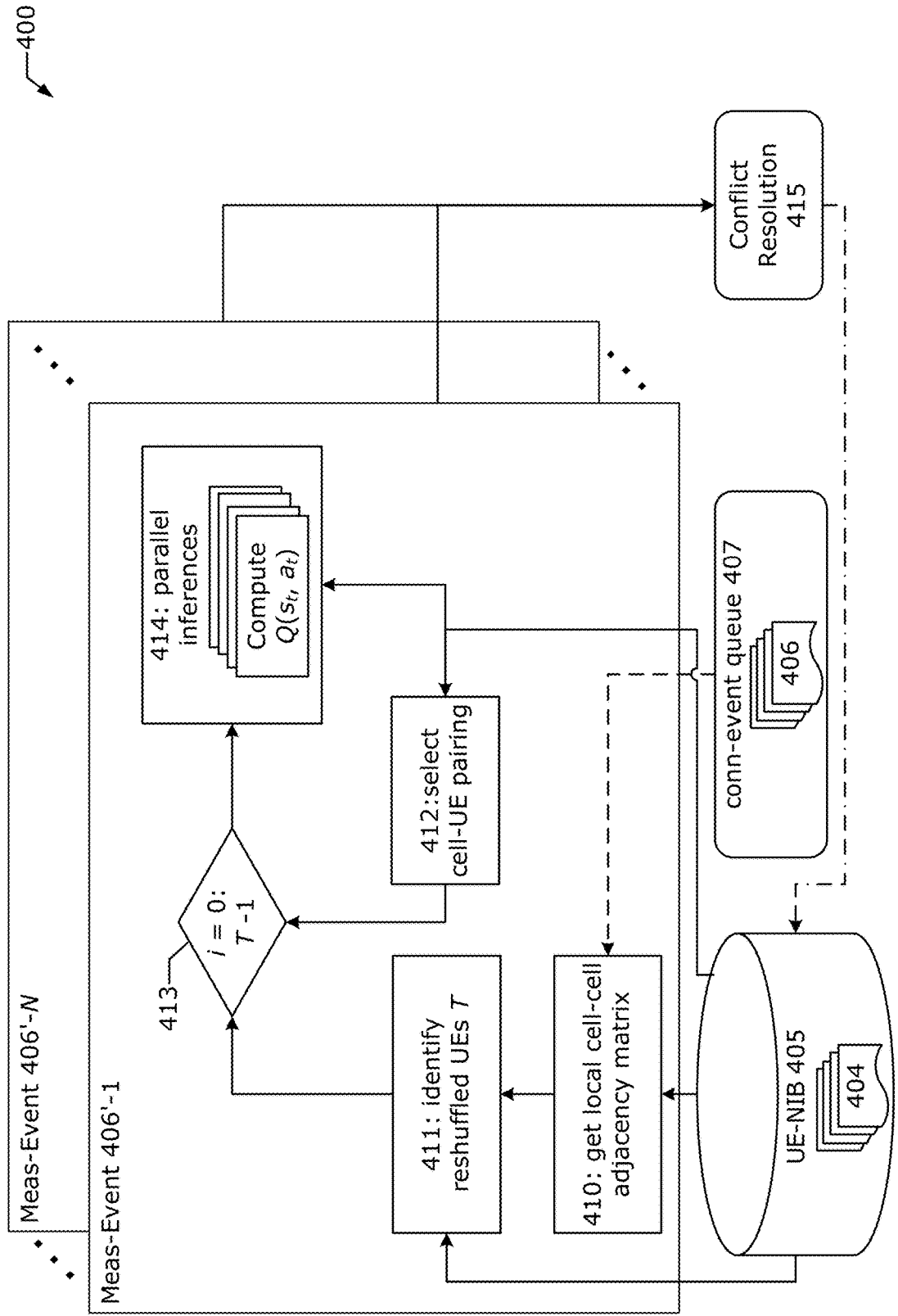
FIGS. 4 and 5 depict example connection management xApp implementations.

An example implementation of the CMF 136 deployed and realized in an O-RAN architecture is discussed infra with respect to FIGS. 3 and 4. The GNN-RL based CMF 136 is used for connection events ("conn-events") in which UEs 221 in the network request new connections and/or connection re-establishment. It should be noted that a conn-event does not require a connection to be successfully established.

For example, a NAN 231 may send a measurement configuration to a UE 221 to request a measurement report from the UE 221 when certain configured event(s) are triggered, and the UE 221 performs signal quality and/or cell power measurements for channels/links of one or more cells 230 and/or one or more beams. The UE 221 may perform measurements for cell selection and cell reselection, as well as for HO operations. When a UE 221 is camped on a cell provided by a NAN 231, the UE 221 may regularly or periodically search for a better cell or beam according to cell or beam (re)selection criteria. For cell (re)selection, if a better cell is found, that cell or beam may be selected, and the UE 221 may tune to that cell's 230 control channel(s). For beam (re)selection, if a better beam is found, the UE 221 may tune to the beam's anchor channel(s). Using the new beam or cell, the UE 221 can receive system information, registration area information (e.g., tracking area information (TAI)), other access stratum (AS) and/or non-AS (NAS) information, and/or paging and notification messages (if registered), as well as transfer to connected mode (if registered). Additionally or alternatively, based on the measurement results, some configured events may trigger the UE 221 to send a measurement report to the serving (source) NAN 231 (e.g., when a signal strength or quality of a neighboring cell or beam is stronger than a signal strength or quality of a serving cell or beam). The serving (source) NAN 231 may decide to handover the UE 221 to a target NAN 231 by initiating an HO operation. To initiate the HO operation, the source NAN 231 transmits an HO request message to the target NAN 231, and in response, the source NAN 231 receives an HO request acknowledgement (ACK) from the target NAN 231. Once the HO request ACK is received, the source NAN 231 sends an HO command to the UE 221 to begin an attachment process with the target NAN 231.

For purposes of the present disclosure, a measurement report and/or a request for new cell connection is/are referred to as a "conn-event." Conn-events are provided or otherwise indicated to the CMF 136 by one or more CUs 132. When the CMF 136 receives a conn-event, the GNN-RL model makes new connection decisions for one or more UEs 221 to balance the load across the network (or a portion of a network).

It is expected that an O-RAN RIC deployments, such as the network architecture 100 of FIG. 1, will include 100s of cells 230 and 1000s of UEs 221. The large scale O-RAN deployment will result in large network topology graph g, and hence, high processing latency and complexity GNN-RL inference. Two solutions can be used to reduce dimensionality of the GNN-RL inference.

A first solution includes a local sub-graph of the O-RAN network around a subject UE 221 that has a conn-event (e.g., a measurement report, an intra-RAT HO request, an inter-RAT HO request, cell selection message, cell reselection message, radio link failure detection and recovery message(s), beam failure detection and recovery message(s), and/or the like). The local sub-graph includes only measurements (e.g., RSRP, RSRQ, SNR, SINR, etc.) reported cell 230 by the subject UE 221 and L-hop neighbors of the these cells 230 in virtual cell-cell connection graph as discussed herein, where L is the number of layers of the GNN as discussed herein.

The second solution includes classifying each UE 221 in the network as a cell-edge UE or a cell-center UE. Cell-edge UEs are UEs 221 close to a boundary 210 of a cell's 230 coverage area. A UE 221 is marked or otherwise classified as a cell-edge UE if the difference between its strongest signal measurement and its second strongest signal measurement is less than a given threshold (e.g., measured RSRP<3 decibels (dB)). The remaining UEs 221 are marked as cell-center UEs since their strongest signal measurement (e.g., RSRP, etc.) is larger than its next largest measurement(s), and hence, such UEs 221 do not need a new cell connections. In other words, cell-edge UEs are reshuffled to have new connections while cell-center UEs keep their current/existing connections (the set of cell-edge UEs 221 are referred to in the sub-graph as reshuffled UEs 221). This means that the initial connectivity graph $\mathcal{G}_0$ includes an edge between a NAN 231 and a cell-center UE 221. This allows the total action space for the RL to be reduced by reducing the number of reshuffled UEs 221 T in the initial connectivity graph $\mathcal{G}_0$ in DQN-Algo.

FIG. 3 depicts an O-RAN Near-RT RIC architecture 300 according to various embodiments. The GNN-RL model may be trained and tested before deployment in a network (e.g., network 100 or 200). Here, the GNN-RL model implementation is for inference at the RIC 302. The RIC 302 may operate 1 to A xApps (where A is a number). O-RAN defines xApps as applications designed to run on the Near-RT RIC 302. These xApps include several microservices, which obtain input data through interfaces between the Near-RT RIC 302 and RAN functionality, and provide additional functionally as outputs to the RAN (e.g., including one or more NANs 231, CUs 132, DUs 131, and/or RUs 130). Here, the logical functions of the xApp, which optimize CU 132, DU 131, and RU 130 functions and resources, run with control loops of 10 milliseconds (ms) to 1 second (s). The Near-RT RIC 301 allows for the reading and writing of RAN and/or UE information, messaging infrastructure, and interfaces to service management and orchestration (SMO) 302 and E2 nodes 303. The E2 nodes 303 includes one or more CUs 132 and one or more cells 230 (e.g., DUs 131 and/or RUs 130). In this example, the GNN-RL model is implemented as a CMF xApp 350, which utilizes the O1, A1, and E2 interfaces in the Near-RT RIC 301 and works in conjunction with other xApps 1 to A. The CMF xApp 350 may have an internal architecture and/or functionality of the CMF xApp 400 of FIG. 4 and/or the CMF xApp 500 of FIG. 5.

The Near-RT RIC 301 is connected (at the A1 termination) to the Non-RT RIC 320 in the SMO 302 via the A1 interface/reference point. The Non-RT RIC 320 supports intelligent RAN optimization by providing policy-based guidance, ML model management and enrichment information to the Near-RT RIC 301 function so that the RAN can optimize various aspects such as Radio Resource Management (RRM) under certain conditions. The Non-RT RIC 320 can also perform intelligent RRM functionalities in non-real-time intervals (e.g., greater than 1 second). The Non-RT RIC 320 can use data analytics and AI/ML training/inference to determine the RAN optimization actions for which it can leverage SMO 302 services such as data collection and provisioning services of the O-RAN nodes.

The Near-RT RIC 301 is a logical function that enables near real-time control and optimization of E2 nodes 303, functions, and resources via fine-grained data collection and actions over an E2 interface with control loops in the order of 10 ms to 1 s. Here, the E2 nodes 303 include one or more NANs 231, CUs 132, DUs 131, and/or RUs 130. The Near-RT RIC 301 hosts one or more xApps (e.g., xApps 1-A in FIG. 3) that use E2 interface to collect near real-time information (e.g., on a UE 221 basis and/or a cell/NAN 231 basis) and provide value added services. The near real-time information may include one or more measurements/metrics such as those discussed herein. The Near-RT RIC 301 control over the E2 nodes 303 is steered via the policies and the enrichment data provided via the A1 interface from the Non-RT RIC 320. In embodiments, the Near-RT RIC 301 collects cell/NAN features, link features, and UE features from the E2 nodes via the E2 interface. The cell/NAN features may include, for example, aggregate rate of a NAN 231, resource utilization (e.g., used/unused resource blocks (RBs), physical RBs (PRBs), etc.) of the NAN 231, and/or other RAN/NAN metrics/measurements. The link features may include, for example, channel/signal quality measurements such as spectral efficiency (SE), UE measurement report data, and/or other like link-related measurements/metrics. The UE features may include, for example, UE rate (e.g., data rate, bit rate, etc.), UE resource utilization (e.g., resource blocks (RBs), physical RBs (PRBs), etc.), UE state/status (e.g., RRC protocol states or the like), and/or other like UE-related measurements/metrics. The aforementioned features may be collected based on averages and/or other statistical descriptions and the like.

The Near-RT RIC 301 hosts or otherwise provides the following functions: database functionality (e.g., database 305), which allows reading and writing of RAN/UE information; conflict mitigation 311, which resolves potentially overlapping or conflicting requests from multiple xApps (e.g., the conflict mitigation entity 311 is responsible for resolving conflicts between two or more xApps); xApp Subscription Management (Mgmt) 312, which merges subscriptions from different xApps and provides unified data distribution to xApps; mgmt services 313 including xApp life-cycle management, and fault, configuration, accounting, performance, security (FCAPS) management of the Near-RT RIC 301, as well as logging, tracing, and metrics collection which capture, monitor, and collect the status of Near-RT RIC internals and can be transferred to external system for further evaluation; security 314, which provides the security scheme for the xApps; Mgmt Services including, for example, fault management, configuration management, and performance management as a service producer to SMO; and messaging infrastructure 315, which enables message interaction amongst Near-RT RIC internal functions. The xApp subscription mgmt 312 manages subscriptions from the xApps to the E2 nodes 303, and enforces authorization of policies controlling xApp access to messages. Additionally or alternatively, the xApp subscription mgmt 312 enables merging of identical subscriptions from different xApps into a single subscription to the E2 Node 303.

The Near-RT RIC 301 also hosts or otherwise provides interface termination including E2 termination, which terminates the E2 interface from an E2 Node 303; A1 termination, which terminates the A1 interface from the Non-RT RIC 320; and O1 termination, which terminates the O1 interface from the SMO 302. The Near-RT RIC 301 also hosts or otherwise provides various functions hosted by xApps, which allow services to be executed at the Near-RT RIC 301 and the outcomes sent to the E2 Nodes 303 via E2 interface. In various embodiments, the xApp functionality hosted by the Near-RT RIC 301 includes the CMF 136 implemented as CMF xApp 400. One or more xApps may provide UE-related information to be stored in a UE-Network Information Base (UE-NIB) (see e.g., UE-NIB 405 of FIG. 4). The UE-NIB 405 maintains a list of UEs 221 and associated data. The UE-NIB 405 maintains tracking and correlation of the UE identities associated with the connected E2 nodes 303. One or more xApps may provide radio access network related information to be stored in a Radio-Network Information Base (R-NIB). The R-NIB stores the configurations and near real-time information relating to connected E2 nodes 303 and the mappings between them. The UE-NIB and the R-NIB may be stored in the database 305. Various aspects of the O-RAN architecture, including aspects of the Non-RT RIC 320 and Near-RT RIC 301, are discussed in [AD6784-Z] and [O-RAN].

FIG. 4 shows the internal logical functions of an example CMF xApp 400. An internal UE-NIB 405 contains UE connectivity information 404. The UE connectivity information 404 includes, for example, a serving cell ID, reported measurements (e.g., RSRP, RSRQ, SNR, SINR, etc.), and a unique UE ID of a corresponding UE 221. The unique UE ID may be a 3GPP-defined identifier or a reusable or non-reusable unique identifier provided by the CMF xApp 400. The reported measurements are provided by respective UE 221, where each UE 221 reports 1 to $N_{meas}$ number of measurement reports (e.g., $N_{rsrp}$ may refer to a number of RSRP measurements). This information is used to compute input features for the GNN-RL model, and report target cell-UE pairings after the GNN-RL inference.

In addition, a conn-event queue 407 is used to register new conn-events 406 from the network. The queued conn-events 406 may be conn-event processing jobs or the like, each of which correspond to conn-events 406'-1 to 406'-N. Each conn-event 406 in the conn-event queue 407 may have a unique identifier such as a timestamp of the conn-event 406, a UE ID of a UE 221 that generated the conn-event 406, a combination of timestamp and UE ID, and/or some other identifier. In some implementations, the conn-events 406 are served and/or processed in parallel in a first-in-first-out (FIFO) fashion utilizing a 36-core Intel® Ice Lake server CPU. Any suitable queuing technique (or service policy) may be used such as, for example, last in-first out (LIFO), priority queuing, shortest job first, processor sharing, round-robin, D/M/1 queuing, M/D/1 queuing, M/D/c queuing, M/M/1 queuing, M/M/c queuing, and any other queueing theory or technique. Furthermore, any suitable queue technology may be used for the queue 407 such as, for example, message-oriented middleware (MOM) or a message queuing services (e.g., Advanced Message Queuing Protocol (AMQP), Simple (or Streaming) Text Oriented Message Protocol (STOMP), MQTT (formerly MQ Telemetry Transport), Extensible Messaging and Presence Protocol (XMPP), Apache® Kafka, and/or the like), network scheduling and/or congestion control services, flow control services, and/or the like.

For each conn-event 406 a local cell-cell adjacency matrix is obtained (410). Additionally, reshuffled UE iterations T are identified based on the UE connectivity information 404 and the local cell-cell adjacency matrix (411), and cell-UE pairings are selected based on the UE connectivity information 404 (412). For each reshuffled UE iteration T (413), which is based on the identified reshuffled UE iterations T and the selected cell-UE pairings, a number of parallel inferences are computed/determined (e.g., $(T-i)N_{meas}$ parallel inferences over multi-core CPU). The inferences include a Q value based on computation of a Q function as is discussed in more detail infra. The inputs the Q function are also based on the UE connectivity information 404.

For each conn-event 406, a loop of a total number of reshuffled UE iterations T is run. In each loop iteration, parallel processing of Q function computation depends on the overall conn-event 406 load and available cores in the CPU/processor. Simulation results show that 36 conn-event 406 can be served in parallel under 6 ms latency in which each conn-event 406 has at most T=30 reshuffled UEs in their local cell network. In each conn-event 406, the total number of GNN-RL inference scales with $O(T^2 N_{meas})$. Therefore, if the number of measurement reports and reshuffled UEs is smaller, it is expected that the latency will be better than the 10 ms control loop latency target.

The processed conn-events 406 are provided to a conflict resolution engine 415, which processes the signal/connection decisions/requests and/or parameters of the processed conn-events 406 (e.g., new or different UE connections/links and/or setting of different links/connections) and decides on a resolution where a conflict between aspects of the processed conn-events 406 exists. If no conflict exists, the connection decisions may be passed to the UE-NIB 405 for storage and/or sent to the respective UE 221 to carry out the connection decision. In some implementations, the conflict resolution engine 415 and the other elements shown by FIG. 4 is within a single xApp, and as such, the conflict resolution engine 415 only resolves conflicts among conn-events 406. In other implementations, conflict resolution may be outsourced to the conflict mitigation entity 311, and as such, the conflict resolution engine 415 may correspond to the conflict mitigation entity 311 as discussed previously with respect to FIG. 3. Since parallel processing and signal/connection decisions are performed for multiple UEs 221, it is possible that some conflicts may arise between two or more signaling/connection decisions. In some implementations, to avoid conflicting connection decisions, the conflict resolution engine 415 ignores or discards connection decisions performed or determined within a certain amount of time after a previous decision (e.g., a HO decision for a particular UE 221), or favors a decision for a UE 221 that has a longest time since a previous connection decision was determined or carried out (in comparison to the decision for another UE 221 that is subject to the conflict). The conflict resolution engine 415 provides the results of the resolved conflict (if any) to the UE-NIB 405 for storage and use for future connection decisions/inferences.

After making a connection decision for a UE 221, the connection management xApp 400 sends its decision as a target cell ID to the UE 221 (e.g., for an HO or cell (re)selection procedure). The cell 230 having the target cell ID may then perform connection procedure tasks with the UE 221 (e.g., HO tasks with a source cell and the UE 221). The connection decisions are also stored in the UE-NIB 405 for future connection decisions/inferences.

Figure 5:
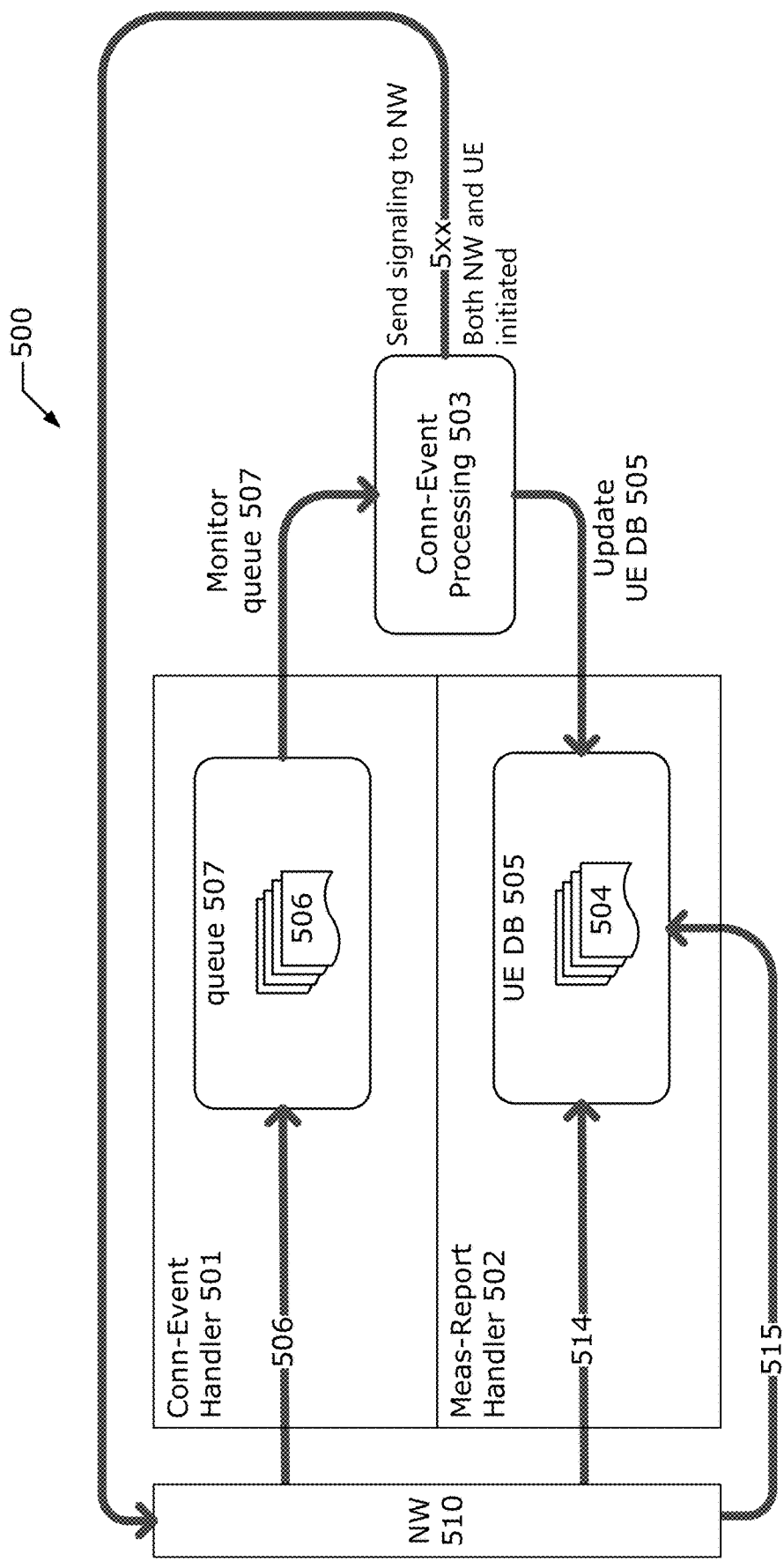

FIG. 5 shows another example implementation of a CMF xApp 500 according to various embodiments. The CMF xApp 500 may be the same or similar as the connection management xApp 400 of FIG. 4. The connection management xApp 500 includes a conn-event handler 501 (sometimes referred to as a "handover (HO) request event handler" or the like), a meas-report handler 502, and a meas-event processor 503.

At the conn-event handler 501, each conn-event 506 reported from the network (NW) 510 is placed in a queue 507. The conn-events 506 may be the same or similar as the conn-events 406, and the queue 507 may be the same or similar as the conn-event queue 407 of FIG. 4, and/or may implement any of the queueing techniques and technologies discussed herein. In the example of FIG. 5, the conn-events 506 are served or processed in a FIFO manner, although other queue methods/techniques may be used. If a user (e.g., UE 221) in the queue 507 is served by earlier conn-events 506, the corresponding user is also removed from the queue 507 to avoid ping-pong effect for connection management. The conn-events 506 can be any type of measurement and/or mobility event (e.g., HO, cell (re)selection) defined in 3GPP standards and/or other measurement/mobility events defined in other protocols/standards (e.g., WiFi standards such as [IEEE80211], [WiMAX], [IEEE16090], etc.). Each conn-event 506 can be processed in parallel using multi-core CPU to speed up processing of users in the queue 507.

At the meas-report handler 502, a UE database (DB) 505 stores input features 504 of the GNN. In particular, the UE DB 505 obtains (from the NW 510) and keeps track of UE-report related data 514 and system data 515, which are then stored in the UE DB 505 as the input features 504. The input features 504 may be the same or similar as the connectivity info 404 mentioned previously.

The UE-report related data 514 includes, for example, UE measurement reports, serving cell IDs, UE change status, and UE metrics. The UE measurement reports may be event-driven or periodic measurement reports provided by individual UEs 221. The measurement reports may include information such as, for example, a UE identifier (ueId) of the UE 221 providing the measurement report, one or more channel/signal measurements/metrics (e.g., any of the signal/channel metrics/measurements discussed herein), and a cell identifier (ID) corresponding to the channel/signal measurements/metrics. The ueId may represent a subscription identifier of a UE 221 (see e.g., 3GPP TS 29.505 v 17.4.0

(2021 Sep. 17) and 3GPP TS 29.571 v 17.3.0 (2021 Sep. 17)), which may be a Subscription Permanent Identifier (SUPI) of the UE 221 (see e.g., clause 5.9.2 of [TS23501]), a Subscription Concealed Identifier (SUCI) of the UE 221 (see e.g., [TS23501], clause 5.9.2a), a Generic Public Subscription Identifier (GPSI) of the UE 221 (see e.g., clause 5.9.8 of [TS23501]), and/or a pseudonym in SUPI format such as a global line identifier (GLI) or a global cable identifier (GCI) of the UE 221 (see e.g., clauses 4.7.3, 4.7.4, 4.7.8, and 4.7.9 of 3GPP TS 23.316 v 17.1.0 (2021 Sep. 24)). Additionally or alternatively, the ueId may a permanent equipment identifier (PEI) (see e.g., clause 5.9.3 of [TS23501]), an IMSI and/or IMSISV, 5G Globally Unique Temporary Identifier (5G-GUTI) (see e.g., clause 5.9.4 of [TS23501]), an internal-group identifier (see e.g., clause 5.9.7 of [TS23501]), one or more Application Protocol (AP) IDs (see e.g., clause 6.2.1 of [TS38401] and clause 5.9.9 of [TS23501]), a UE Radio Capability ID (see e.g., clause 5.9.10 of [TS23501]), Radio Network Temporary Identifier (RNTI) such as a cell RNTI (C-RNTI) and/or the like (see e.g., clause 8.1 of [TS38300]), and/or any network address of the UE 221 such as those discussed herein.

The serving cell IDs (servingCellId) stored by the UE DB 505 and/or the cell ID in the UE measurement reports may include an identity/identifier that uniquely identifies a cell 230 such as, for example, a global cell ID of a cell 230, an NR Cell Global Identifier (NCGI) of a cell 230 (see e.g., clause 8.2 of [TS38300]), a physical cell identity (PCI) of a cell 230, a gNB ID of a NAN 231 (see e.g., clause 8.2 of [TS38300]), a global gNB ID of a NAN 231 (see e.g., clause 8.2 of [TS38300]), an O-DU ID and/or gNB-DU ID (see e.g., clauses 6.2.2 and 6.2.3 of [TS38401]), a Public Land Mobile Network (PLMN) ID, an O-RU ID or gNB-RU ID, an O-CU ID or gNB-CU-UP ID (see e.g., clause 6.2.4 of [TS38401]), a Tracking Area identity (TAI), and/or a Closed Access Group (CAG) ID. Additionally or alternatively, the cell IDs may include a network address of the NAN 231 providing the cell 230 such as any of those discussed herein.

Figure 10:
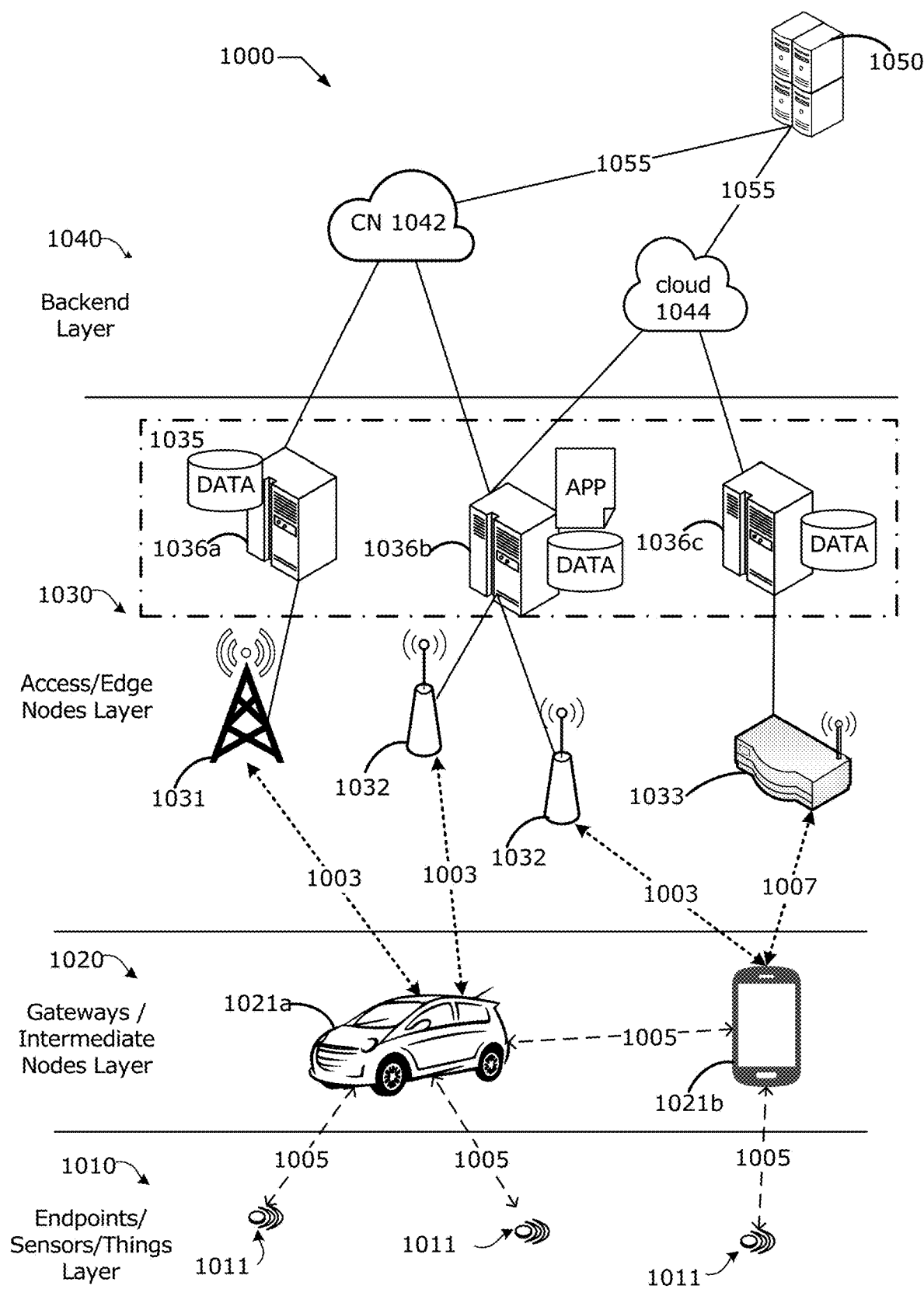
FIG. 10 illustrates an example edge computing environment.

The signal/channel measurements/metrics may include, for example, RSRP, RSRQ, SNR, SINR (e.g., SINR related to channel quality indicator (CQI)), wideband CQI, RSRQ, $E_c N_0$, and/or any other suitable signal/channel measurements/metrics such as any of those discussed herein (see e.g., discussion of FIG. 10 infra). The serving cell ID-UE change of status includes an association between a serving cell ID and a UE state or status. The UE state or status may include, for example, radio resource control (RRC) connection status (or RRC protocol state) such as an idle state (RRC_IDLE) or NR-RRC idle, an inactive state (RRC_INACTIVE) or NR-RRC Inactive, and an active or connected state (RRC_CONNECTED) or NR-RRC Connected (DRB active user).

The UE metrics include any information or data about individual UEs 221, which may be collected by the UEs 221 and/or collected by other entities/elements such as the NANs 231 or the like. The UE metrics may include, for example, a ueId of a UE 221 as discussed previously (which may be the same or different than the ueId used in the measurement reports), time average UE rate per UE (e.g., average rate per unit of time for individual UEs 221), time average spectral efficiency (SE) per UE (e.g., average SE per unit of time for individual UEs 221), time average UE resource utilization per UE (e.g., average resource utilization of individual UEs 221 per unit of time), and/or average DU resource utilization per DU over some or all UEs 221 and/or over one or more periods of time.

The system data 515 includes cell and/or network related data and/or parameters such as all of the cell IDs of all cells 230 in a given network or subnetwork and system parameters of the cells 230 in the (sub)network.

The conn-event processor 503 performs the GNN inferences based on the conn-events 506 pulled from the queue 507 (or pushed from the queue 507 to the conn-event processor 503). Since parallel processing and signal/connection decisions are performed for multiple UEs 221, it is possible that some conflicts may arise between each handover decision. To avoid this conflict, connection decisions done within a certain amount of time after the last connection decision of the UE 221 are ignored or discarded. After making a connection decision for the UE 221, the conn-event processor 503 sends its connection decision as target cell ID for the UE 221. The cell having the target cell ID may then perform connection or HO procedure tasks with the source cell and the UE 221.

1.7. Simulation Results

Simulations consider uniformly distributed RUs 132 and UEs in a hexagonal network area. The consideration of random deployment is useful to generalize inference performance to many real-world cases such as different size city blocks, rural or urban areas, hot spots at stadiums and concerts. The simulation follows 3GPP network settings and channel models. The DU transmit power is 33 dBm. The carrier frequency of channel is 30 GHz with the large-scale channel parameters and 100 MHz channel bandwidth. In the network, each UE measures the RSRP from its current serving DU and its three closest DUs 131, and reports the measurements back to the RIC.

The GNN-RL based connection management algorithm was evaluated for HO application in which cell edge users in the network request for new DU connections. The GNN-RL algorithm makes new connection decisions for the cell edge users. The cell edge users are defined as users close to boundary of DU coverage as shown in FIG. 1. The user is marked as a cell edge user if the difference between the strongest and the second strongest RSRP measurements is less than 3 dB. The remaining users are marked as cell center users since their strongest RSRP measurement is larger than its other measurement, and hence, does not need a new DU connection.

1.7.1. Training

To showcase the benefits of the GNN-RL algorithm to various use cases and applications, the GNN is trained with two different reward functions. Then, the performance is evaluated with utility metrics given previously.

For data intensive applications, in which delivery of maximum amount data is more important, the sum throughput utility function (e.g., given in equation (4)) to calculate reward may be expressed by equation (21).

$$r(s_t, a_t) = U_{th}(\mathcal{G}_t) - U_{th}(\mathcal{G}_{t-1}) \tag{21}$$

For applications that require more fairness among users, the reward function in equation (22) can be used, which is the weighted sum of improvement in total network throughput and the smallest user rate at each cell 230 in the network (captured by the second term in equation (22)).

$$r(s_t, a_t) = U_{th}(\mathcal{G}_t) - U_{th}(\mathcal{G}_{t-1}) + \frac{\lambda}{|V^{cl}|} \sum_{v_i^{cl} \in V^{cl}} \min_{v_j^{ue} : v_i^{cl}, v_j^{ue} \in \mathcal{E}^{ue}} c(v_i^{cl}, v_j^{ue}) \tag{22}$$

The last term in equation (22) tries to maximize minimum user rate in every action. Increasing the minimum user rate helps to maximize network coverage given in equation (5) and fairness given in equation (6) by closing the rate gap between users.

Uniformly distributed cells and UEs 221 in a hexagonal network area were considered. The consideration of random deployment is useful to generalize inference performance to many real world cases such as varying city block sizes, rural or urban areas, hot spots at stadiums and concerts. The simulation followed 3GPP network settings and channel models (see e.g., [TS38300]). The cell transmit power was 33 dBm, and the carrier frequency of channel is 30 GHz with the large scale channel parameters and 100 MHz channel bandwidth (see e.g., Rangan et al., "Millimeter-Wave Cellular Wireless Networks: Potentials and Challenges," Proceedings of the IEEE, vol. 102, no. 3, pp. 366-385 (March 2014)). In the network, each UE 221 measured the RSRP from its current serving cell 230 and its three closest cells 230, and reported the measurements back to the CMF 136.

For training the GNN, 1000 deployment scenarios were collected with 6 cells 230 and 50 UEs 221. For the GNN architecture, L=2 layers, and d=8 dimensions per layer. For reinforcement learning, the following parameters were defined: exploration rate $\epsilon=0.1$, learning rate $\alpha=0.1$ and discount factor $\gamma=1$. Additionally, an experience buffer of size 8 was used to reduce the impact of correlation between consecutive UE association. For testing, 50 deployment scenarios were collected for different number of cells 230 and UEs 221.

1.7.2. Results

The GNN-RL embodiments were compared with a maximum RSRP benchmark algorithm. In the benchmark algorithm, each UE is associated with a cell 230 from which it receives the strongest RSRP. As discussed previously, the benchmark algorithm is UE-centric and greedy. To show the scalability and robustness benefits of the GNN-RL approach, 50 different deployment scenarios were collected for different numbers of cells 230 and UEs 221 of various network densities.

Figure 6:
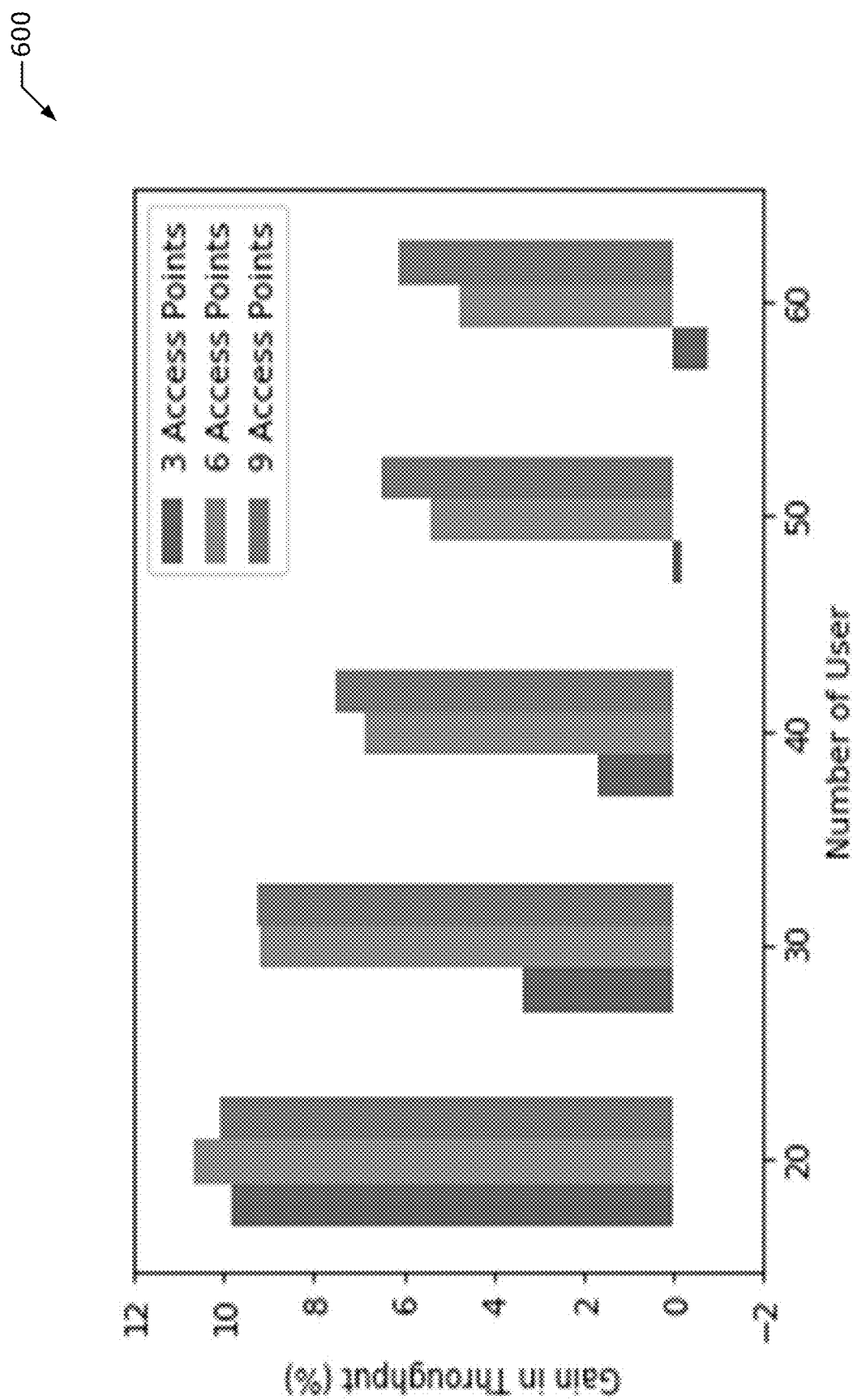
FIGS. 6, 7, 8, and 9 depict the simulation results of the GNN-RL connection management approach versus an existing connection management approach.

FIG. 6 includes a graph 600 showing the relative gain of throughput defined in equation (4) of GNN-RL approach over the maximum RSRP algorithm. In this case, the GNN weights are obtained using reward function given in (21). As shown in FIG. 6, up to 10% gain is observed when the number of UEs is small and as the number of users increases the gain drops. This is expected because when the number of users is small, each user gets larger share from the network, and a connection decision by GNN-RL has more impact on the performance. On the other hand, as the network size scales up with the number of DUs 131, more gain is also observed in performance which shows benefit of scalability of the GNN.

Figure 7:
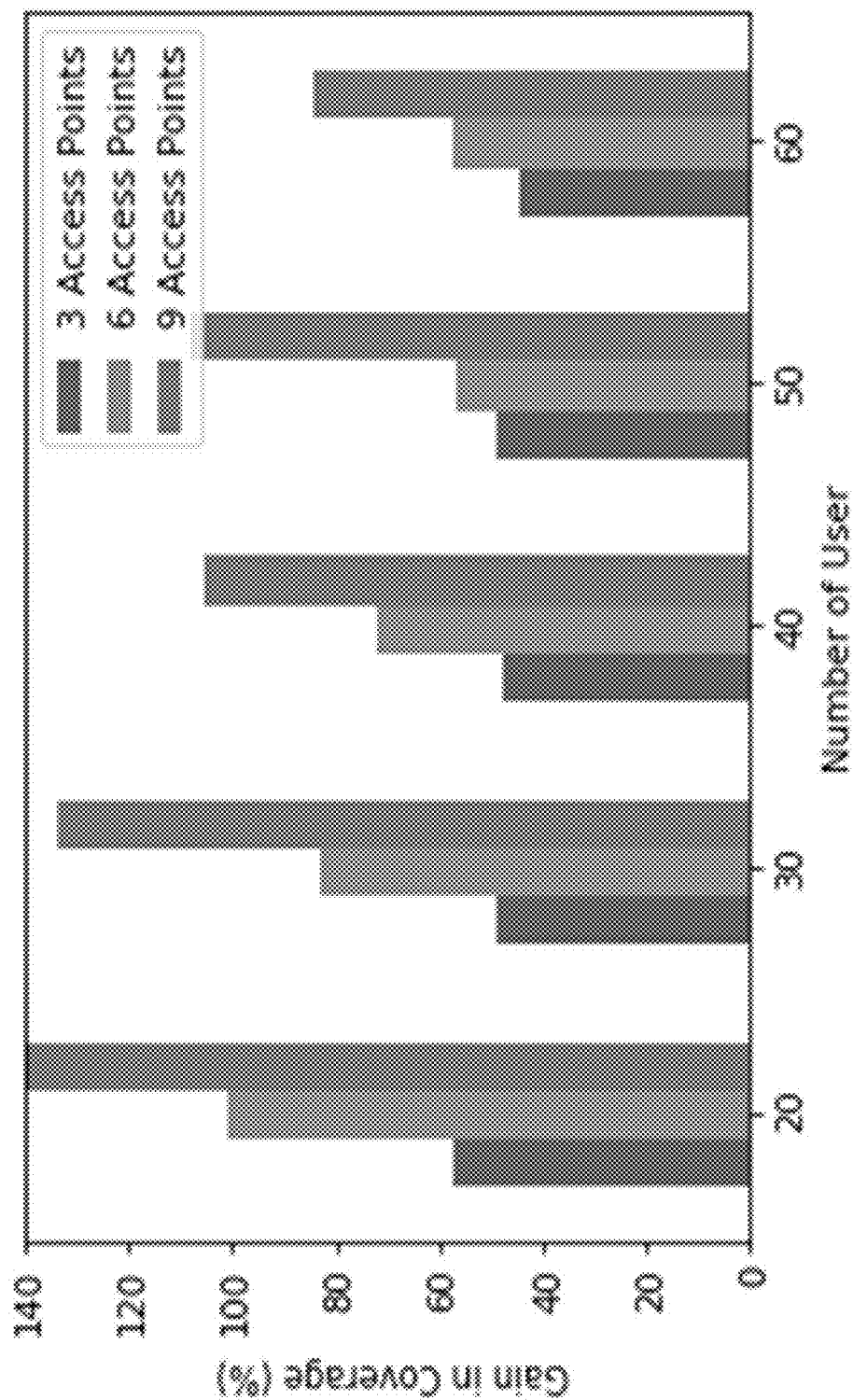
Figure 8:
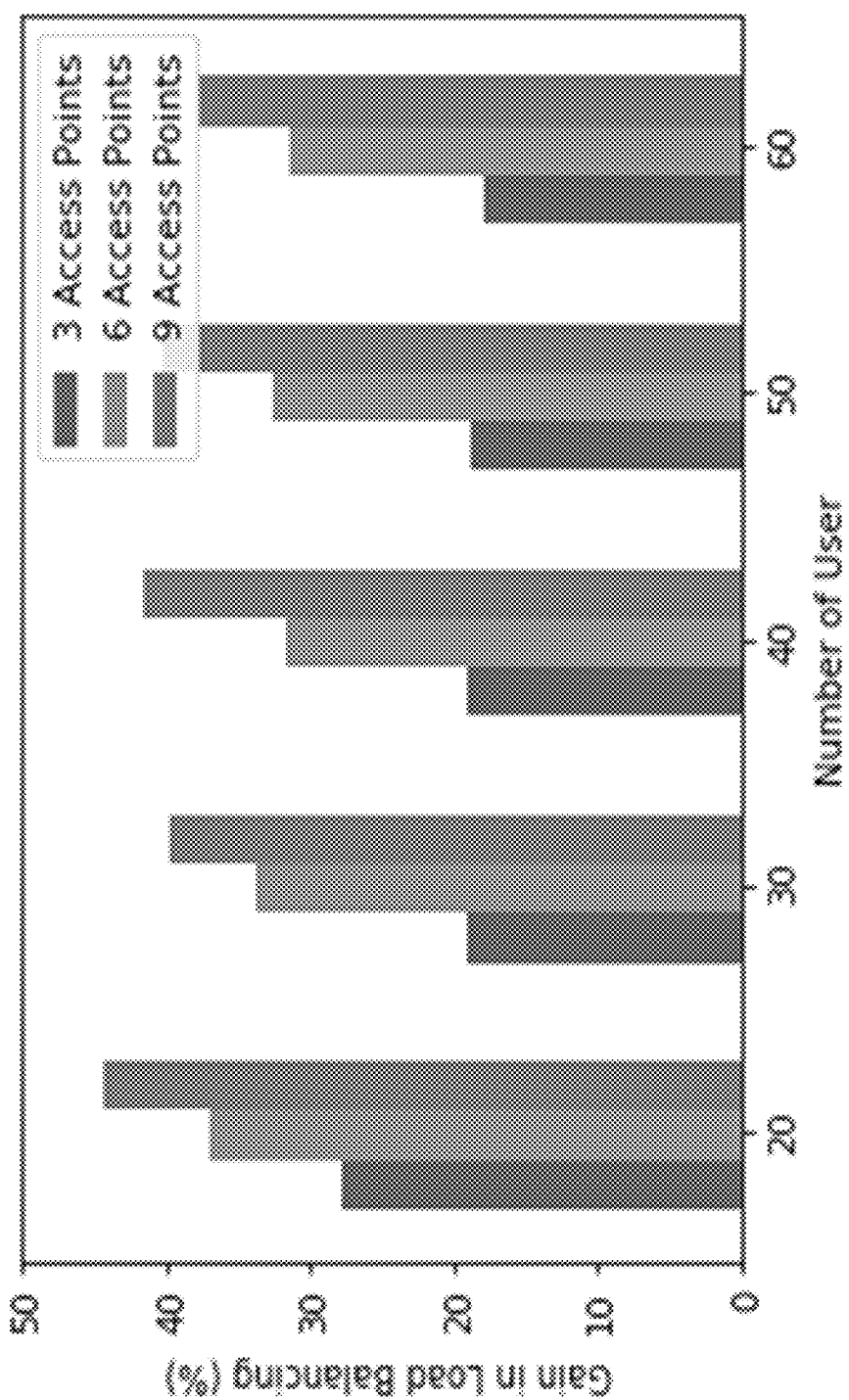

FIG. 7 includes graph 700 showing the relative gain of coverage of the GNN-RL approach over the maximum RSRP algorithm, and FIG. 8 includes graph 800 showing load balancing of the GNN-RL approach over the maximum RSRP algorithm. Here, the GNN is trained with the reward function given in (22). Similar trends are observed as in FIG. 7. However, the relative gains in coverage and load balancing is much larger than the throughput gain which shows the importance of GNN based solution for handover applications.

Figure 9:
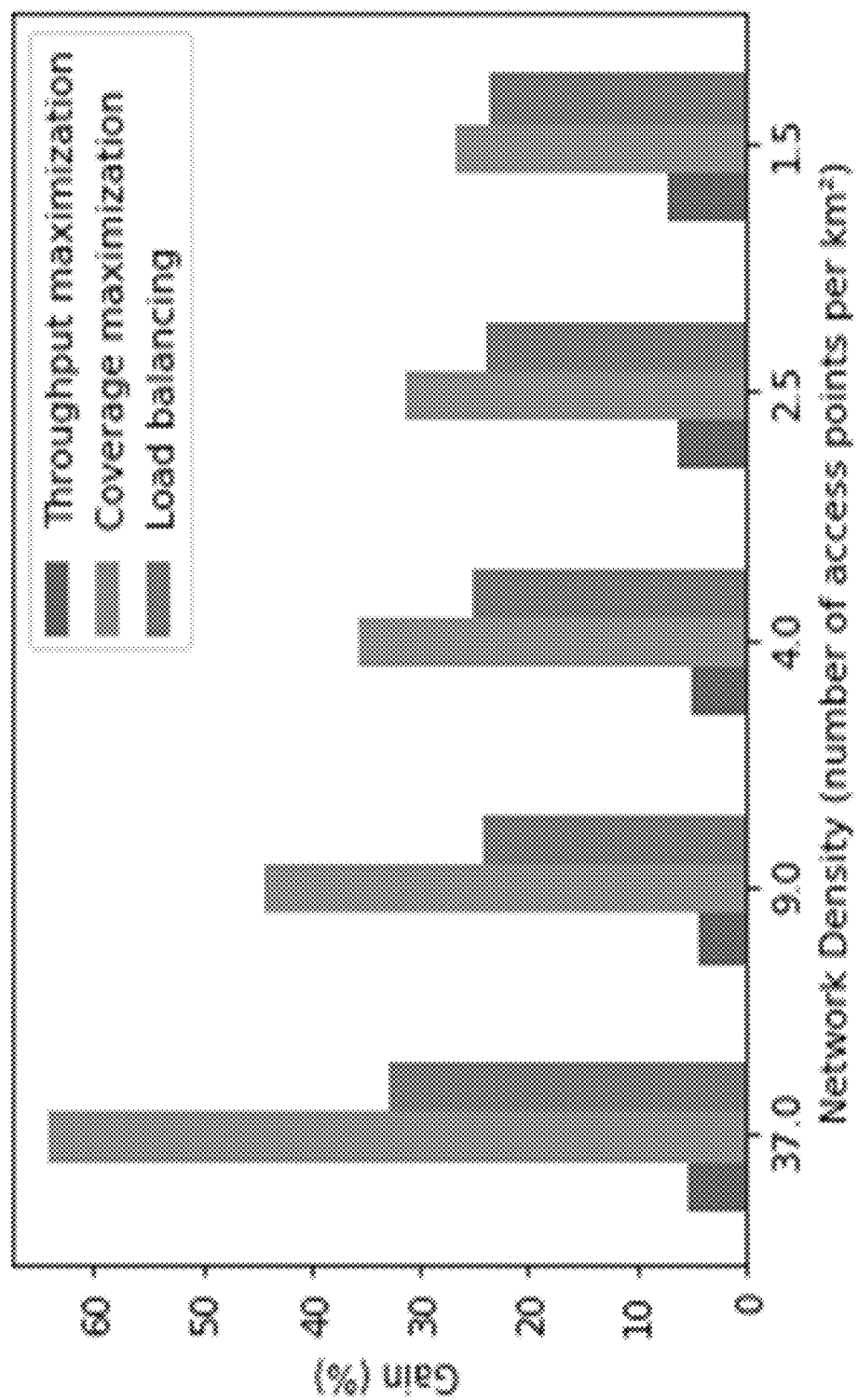

FIG. 9 shows the benefit of GNN-RL approach to varying network densities in terms of number of DU per $km^2$ while keeping the average number of UEs per cell the same. The neural network was trained only for the scenario with 37 cells per $km^2$ network density and the trained model was used to test different network densities. More gain is observed in coverage as network gets denser because when network is dense, cell edge users have multiple good cell selection options and the GNN-RL approach makes better decisions compared to greedy cell selection. Additionally, high performance gains in different network densities show that the GNN-RL approach is robust to any network deployment scenario.

2. Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include Multi-access Edge Computing (MEC); Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

FIG. 10 illustrates an example edge computing environment 1000. FIG. 10 specifically illustrates the different layers of communication occurring within the environment 1000, starting from endpoint sensors or things layer 1010 (e.g., operating in an Internet of Things (IoT) network topology) comprising one or more IoT devices 1011 (also referred to as edge endpoints 1010 or the like); increasing in sophistication to gateways or intermediate node layer 1020 comprising one or more user equipment (UEs) 1021*a* and 1021*b* (also referred to as intermediate nodes 1020 or the like), which facilitate the collection and processing of data from endpoints 1010; increasing in processing and connectivity sophistication to access node layer 1030 (or "edge node layer 1030") comprising a plurality of network access nodes (NANs) 1031, 1032, and 1033 (collectively referred to as "NANs 1031-1033" or the like) and a plurality of edge compute nodes 1036*a-c* (collectively referred to as "edge compute nodes 1036" or the like) within an edge computing system 1035; and increasing in connectivity and processing sophistication to a backend layer 1010 comprising core network (CN) 1042 and cloud 1044. The processing at the backend layer 1010 may be enhanced by network services as performed by one or more remote application (app) servers 1050 and/or other cloud services. Some or all of these elements may be equipped with or otherwise implement some or all features and/or functionality discussed herein.

The environment 1000 is shown to include end-user devices, such as intermediate nodes 1020 and endpoints 1010, which are configured to connect to (or communicatively couple with) one or more multiple communication networks (also referred to as "access networks," "radio access networks," or the like) based on different access technologies (or "radio access technologies") for accessing application services. These access networks may include one or more of NANs 1031, 1032, and/or 1033. The NANs 1031-1033 are arranged to provide network connectivity to the end-user devices via respective links 1003, 1007 between the individual NANs and the one or more UEs 1011, 1021.

As examples, the communication networks and/or access technologies may include cellular technology such as LTE, MuLTEfire, and/or NR/5G (e.g., as provided by Radio Access Network (RAN) node 1031 and/or RAN nodes 1032), WiFi or wireless local area network (WLAN) technologies (e.g., as provided by access point (AP) 1033 and/or RAN nodes 1032), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 1020 include UE 1021*a* and UE 1021*b* (collectively referred to as "UE 1021" or "UEs 1021"). In this example, the UE 1021*a* is illustrated as a vehicle UE, and UE 1021*b* is illustrated as a smartphone (e.g., handheld touchscreen mobile computing device connectable to one or more cellular networks). However, these UEs 1021 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1010 include UEs 1011, which may be IoT devices (also referred to as "IoT devices 1011"), which are uniquely identifiable embedded computing devices (e.g., within the Internet infrastructure) that comprise a network access layer designed for low-power IoT applications utilizing short-lived UE connections. The IoT devices 1011 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1011 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1011 can utilize technologies such as M2M or MTC for exchanging data with an MTC server (e.g., a server 1050), an edge server 1036 and/or edge computing system 1035, or device via a PLMN, ProSe or D2D communication, sensor networks, or IoT networks. The M2M or MTC exchange of data may be a machine-initiated exchange of data.

The IoT devices 1011 may execute background applications (e.g., keep-alive messages, status updates, etc.) to facilitate the connections of the IoT network. Where the IoT devices 1011 are, or are embedded in, sensor devices, the IoT network may be a WSN. An IoT network describes an interconnecting IoT UEs, such as the IoT devices 1011 being connected to one another over respective direct links 1005. The IoT devices may include any number of different types of devices, grouped in various combinations (referred to as an "IoT group") that may include IoT devices that provide one or more services for a particular user, customer, organizations, etc. A service provider (e.g., an owner/operator of server 1050, CN 1042, and/or cloud 1044) may deploy the IoT devices in the IoT group to a particular area (e.g., a geolocation, building, etc.) in order to provide the one or more services. In some implementations, the IoT network may be a mesh network of IoT devices 1011, which may be termed a fog device, fog system, or fog, operating at the edge of the cloud 1044. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1044 to Things (e.g., IoT devices 1011). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 1030) and/or a central cloud computing service (e.g., cloud 1044) for performing heavy computations or computationally burdensome tasks. On the other hand, edge cloud computing consolidates human-operated, voluntary resources, as a cloud. These voluntary resource may include, inter-alia, intermediate nodes 1020 and/or endpoints 1010, desktop PCs, tablets, smartphones, nano data centers, and the like. In various implementations, resources in the edge cloud may be in one to two-hop proximity to the IoT devices 1011, which may result in reducing overhead related to processing data and may reduce network delay.

Additionally or alternatively, the fog may be a consolidation of IoT devices 1011 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 1044. The fog operating at the edge of the cloud 1044 may overlap or be subsumed into an edge network 1030 of the cloud 1044. The edge network of the cloud 1044 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1036 or edge devices). The Fog layer resides on top of the edge layer and is a consolidation of networking devices such as the intermediate nodes 1020 and/or endpoints 1010 of FIG. 10.

Data may be captured, stored/recorded, and communicated among the IoT devices 1011 or, for example, among the intermediate nodes 1020 and/or endpoints 1010 that have direct links 1005 with one another as shown by FIG. 10. Analysis of the traffic flow and control schemes may be implemented by aggregators that are in communication with the IoT devices 1011 and each other through a mesh network. The aggregators may be a type of IoT device 1011 and/or network appliance. In the example of FIG. 10, the aggregators may be edge nodes 1030, or one or more designated intermediate nodes 1020 and/or endpoints 1010. Data may be uploaded to the cloud 1044 via the aggregator, and commands can be received from the cloud 1044 through gateway devices that are in communication with the IoT devices 1011 and the aggregators through the mesh network. Unlike the traditional cloud computing model, in some implementations, the cloud 1044 may have little or no computational capabilities and only serves as a repository for archiving data recorded and processed by the fog. In these implementations, the cloud 1044 centralized data storage system and provides reliability and access to data by the computing resources in the fog and/or edge devices. Being at the core of the architecture, the Data Store of the cloud 1044 is accessible by both Edge and Fog layers of the aforementioned edge-fog network.

As mentioned previously, the access networks provide network connectivity to the end-user devices 1020, 1010 via respective NANs 1031-1033. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 1031, 1032. This virtualized framework allows the freed-up processor cores of the NANs 1031, 1032 to perform other virtualized applications, such as virtualized applications for various elements discussed herein.

The UEs 1021, 1011 may utilize respective connections (or channels) 1003, each of which comprises a physical communications interface or layer. The connections 1003 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 1011, 1021 and the NANs 1031-1033 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1011, 1021 and NANs 1031-1033 may operate using LAA, enhanced LAA (eLAA), and/or further eLAA (feLAA) mechanisms. The UEs 1021, 1011 may further directly exchange communication data via respective direct links 1005, which may be LTE/NR Proximity Services (ProSe) link or PC5 interfaces/links, or WiFi based links or a personal area network (PAN) based links (e.g., IEEE 802.15.4 based protocols including ZigBee, IPv 6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 1021, 1011 provide radio information to one or more NANs 1031-1033 and/or one or more edge compute nodes 1036 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 1021, 1011 current location). As examples, the measurements collected by the UEs 1021, 1011 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/No), energy per chip to interference power density ratio ($E_c/I_0$), energy per chip to noise power density ratio ($E_c/N_0$), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the $i^{th}$ GNSS satellite signal), GNSS carrier phase measurements (e.g., the number of carrier-phase cycles (integer and fractional parts) of the $i^{th}$ GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v 16.2.0 (2021 Mar. 31) ("[TS36214]"), 3GPP TS 38.215 v 16.4.0 (2021 Jan. 8) ("[TS38215]"), 3GPP TS 38.314 v 16.4.0 (2021 Sep. 30) ("[TS38314]"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021 Feb. 26)("[IEEE80211]"), and/or the like. Additionally or alternatively, any of the aforementioned measurements (or combination of measurements) may be collected by one or more NANs 1031-1033 and provided to the edge compute node(s) 1036.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 1011, 1021, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v 17.3.1 (2021 Jun. 24)(" [TS28552]"), 3GPP TS 32.425 v 17.1.0 (2021 Jun. 24)(" [TS32425]"), and/or the like.

The radio information may be reported in response to a trigger event and/or on a periodic basis. Additionally or alternatively, individual UEs 1021, 1011 report radio information either at a low periodicity or a high periodicity depending on a data transfer that is to take place, and/or other information about the data transfer. Additionally or alternatively, the edge compute node(s) 1036 may request the measurements from the NANs 1031-1033 at low or high periodicity, or the NANs 1031-1033 may provide the measurements to the edge compute node(s) 1036 at low or high periodicity. Additionally or alternatively, the edge compute node(s) 1036 may obtain other relevant data from other edge compute node(s) 1036, core network functions (NFs), application functions (AFs), and/or other UEs 1011, 1021 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a hardware (HW) configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., MAMS [RFC8743]), IEEE/WiFi (e.g., [IEEE80211], [WiMAX], [IEEE16090], etc.), and/or any other like standards such as those discussed herein and/or as discussed in [AD6784-Z].

The UE 1021b is shown to be configured to access an access point (AP) 1033 via a connection 1007. In this example, the AP 1033 is shown to be connected to the Internet without connecting to the CN 1042 of the wireless system. The connection 1007 can comprise a local wireless connection, such as a connection consistent with any IEEE 802.11 protocol, wherein the AP 1033 would comprise a wireless fidelity (WiFi®) router. Additionally or alternatively, the UEs 1021 and IoT devices 1011 can be configured to communicate using suitable communication signals with each other or with any of the AP 1033 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1031 and 1032 that enable the connections 1003 may be referred to as "RAN nodes" or the like. The RAN nodes 1031, 1032 may comprise ground stations (e.g., terrestrial access points) or satellite stations providing coverage within a geographic area (e.g., a cell). The RAN nodes 1031, 1032 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1031 is embodied as a NodeB, evolved NodeB (eNB), or a next generation NodeB (gNB), and the RAN nodes 1032 are embodied as relay nodes, distributed units, or Road Side Unites (RSUs). Any other type of NANs can be used.

Any of the RAN nodes 1031, 1032 can terminate the air interface protocol and can be the first point of contact for the UEs 1021 and IoT devices XE111. Additionally or alternatively, any of the RAN nodes 1031, 1032 can fulfill various logical functions for the RAN including, but not limited to, RAN function(s) (e.g., radio network controller (RNC) functions and/or NG-RAN functions) for radio resource management, admission control, UL and DL dynamic resource allocation, radio bearer management, data packet scheduling, etc. Additionally or alternatively, the UEs 1011, 1021 can be configured to communicate using OFDM communication signals with each other or with any of the NANs 1031, 1032 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RAN function(s) operated by the RAN or individual NANs 1031-1032 organize DL transmissions (e.g., from any of the RAN nodes 1031, 1032 to the UEs 1011, 1021) and UL transmissions (e.g., from the UEs 1011, 1021 to RAN nodes 1031, 1032) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1011, 1021 at each transmission time interval (TTI). A TTI is the duration of a transmission on a radio link 1003, 1005, and is related to the size of the data blocks passed to the radio link layer from higher network layers.

The NANs 1031/1032 may be configured to communicate with one another via respective interfaces or links (not shown), such as an X2 interface for LTE implementations (e.g., when CN 1042 is an Evolved Packet Core (EPC)), an Xn interface for 5G or NR implementations (e.g., when CN 1042 is an Fifth Generation Core (5GC)), or the like. The NANs 1031 and 1032 are also communicatively coupled to CN 1042. Additionally or alternatively, the CN 1042 may be an evolved packet core (EPC) network, a NextGen Packet Core (NPC) network, a 5G core (5GC), or some other type of CN.

The CN 1042 is a network of network elements and/or network functions (NFs) relating to a part of a communications network that is independent of the connection technology used by a terminal or user device. The CN 1042 comprises a plurality of network elements/NFs configured to offer various data and telecommunications services to customers/subscribers (e.g., users of UEs 1021 and IoT devices 1011) who are connected to the CN 1042 via a RAN. The components of the CN 1042 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 1042 may be referred to as a network slice, and a logical instantiation of a portion of the CN 1042 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1042 components/functions.

The CN 1042 is shown to be communicatively coupled to an application server 1050 and a network 1050 via an IP communications interface 1055. the one or more server(s) 1050 comprise one or more physical and/or virtualized systems for providing functionality (or services) to one or more clients (e.g., UEs 1021 and IoT devices 1011) over a network. The server(s) 1050 may include various computer devices with rack computing architecture component(s), tower computing architecture component(s), blade computing architecture component(s), and/or the like. The server(s) 1050 may represent a cluster of servers, a server farm, a cloud computing service, or other grouping or pool of servers, which may be located in one or more datacenters. The server(s) 1050 may also be connected to, or otherwise associated with one or more data storage devices (not shown). Moreover, the server(s) 1050 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1050 offer applications or services that use IP/network resources. As examples, the server(s) 1050 may provide traffic management services, cloud analytics, content streaming services, immersive gaming experiences, social networking and/or microblogging services, and/or other like services. In addition, the various services provided by the server(s) 1050 may include initiating and controlling software and/or firmware updates for applications or individual components implemented by the UEs 1021 and IoT devices 1011. The server(s) 1050 can also be configured to support one or more communication services (e.g., Voice-over-Internet Protocol (VoIP) sessions, PTT sessions, group communication sessions, social networking services, etc.) for the UEs 1021 and IoT devices 1011 via the CN 1042.

The Radio Access Technologies (RATs) employed by the NANs 1031-1033, the UEs 1021, 1011, and the other elements in FIG. 10 may include, for example, any of the communication protocols and/or RATs discussed herein. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.). These RATs may include one or more V2X RATs, which allow these elements to communicate directly with one another, with infrastructure equipment (e.g., NANs 1031-1033), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, IEEE 1609.0-2019, "IEEE Guide for Wireless Access in Vehicular Environments (WAVE) Architecture" (2019 Apr. 10) ("[IEEE16090]"), SAE Intl "V2X Communications Message Set Dictionary" (formerly "Dedicated Short Range Communication (DSRC) Message Set Dictionary") (2020 Jul. 23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018 Mar. 2) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V 1.3.1 (2020-01) (hereinafter "[EN302663]") and describes the access layer of the ITS-S reference architecture. The ITS-G5 access layer comprises [IEEE80211] (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V 1.2.1 (2018-04) ("[TS102687]"). The access layer for 3GPP LTE-V2X based interface(s) is outlined in, inter alia, ETSI EN 303 613 V 1.1.1 (2020-01), 3GPP TS 23.285 v 16.2.0 (2019-12); and 3GPP 5G/NR- V2X is outlined in, inter alia, 3GPP TR 23.786 v 16.1.0 (2019-06) and 3GPP TS 23.287 v 16.2.0 (2020-03).

The cloud 1044 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1044 include application capabilities type, infrastructure capabilities type, and platform capabilities type. A cloud capabilities type is a classification of the functionality provided by a cloud service to a cloud service customer (e.g., a user of cloud 1044), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1044 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 1044 may represent one or more cloud servers, application servers, web servers, and/or some other remote infrastructure. The remote/cloud servers may include any one of a number of services and capabilities such as, for example, any of those discussed herein.

Additionally or alternatively, the cloud 1044 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 1044 may be a network that comprises computers, network connections among the computers, and software routines to enable communication between the computers over network connections. In this regard, the cloud 1044 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1044 may be via a wired or a wireless connection using the various communication protocols discussed infra. More than one network may be involved in a communication session between the illustrated devices. Connection to the cloud 1044 may require that the computers execute software routines which enable, for example, the seven layers of the OSI model of computer networking or equivalent in a wireless (cellular) phone network. Cloud 1044 may be used to enable relatively long-range communication such as, for example, between the one or more server(s) 1050 and one or more UEs 1021 and IoT devices 1011. Additionally or alternatively, the cloud 1044 may represent the Internet, one or more cellular networks, local area networks, or wide area networks including proprietary and/or enterprise networks, TCP/Internet Protocol (IP)-based network, or combinations thereof. In these implementations, the cloud 1044 may be associated with network operator who owns or controls equipment and other elements necessary to provide network-related services, such as one or more base stations or access points, one or more servers for routing digital data or telephone calls (e.g., a core network or backbone network), etc. The backbone links 1055 may include any number of wired or wireless technologies, and may be part of a LAN, a WAN, or the Internet. In one example, the backbone links 1055 are fiber backbone links that couple lower levels of service providers to the Internet, such as the CN 1012 and cloud 1044.

The edge compute nodes 1036 may include or be part of an edge system 1035 (or edge network 1035). The edge compute nodes 1036 may also be referred to as "edge hosts 1036" or "edge servers 1036." The edge system 1035 includes a collection of edge servers 1036 and edge management systems (not shown by FIG. 10) necessary to run edge computing applications within an operator network or a subset of an operator network. The edge servers 1036 are physical computer systems that may include an edge platform and/or virtualization infrastructure, and provide compute, storage, and network resources to edge computing applications. Each of the edge servers 1036 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1020 and/or endpoints 1010. The VI of the edge servers 1036 provide virtualized environments and virtualized resources for the edge hosts, and the edge computing applications may run as VMs and/or application containers on top of the VI.

In one example implementation, the edge system 1035 may operate according to the MEC framework, as discussed in ETSI GS MEC 003 v 2.1.1 (2019-01), ETSI GS MEC 009 V 2.1.1 (2019-01), ETSI GS MEC 010-1 v 1.1.1 (2017-10), ETSI GS MEC 010-2 v 2.1.1 (2019-11), ETSI GS MEC 011 V 1.1.1 (2017-07); ETSI GS MEC 012 V 2.1.1 (2019-12), ETSI GS MEC 013 v 2.1.1 (2019-09); ETSI GS MEC 014 V 1.1.1 (2018-02); ETSI GS MEC 015 v 2.1.1 (2020-06), ETSI GS MEC 016 V 2.2.1 (2020-04), ETSI GS MEC 021 V 2.1.1 (2020-01), ETSI GS MEC 028 v 2.1.1 (2020-06), ETSI GS MEC 029 v 2.1.1 (2019-07), ETSI MEC GS 030 v 2.1.1 (2020-04), ETSI GS NFV-MAN 001 v 1.1.1 (2014-12), U.S. Provisional App. No. 63/003,834 filed Apr. 1, 2020 ("[AC6833Z]"), and Int'l App. No. PCT/US2020/066969 filed on Dec. 23, 2020 ("[AC6833PCT]") (collectively referred to herein as "[MEC]"), the contents of each of which are hereby incorporated by reference in their entireties.

In another example implementation, the edge system 1035 operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and interoperability at every level, several key players interested in the wireless domain (e.g., carriers, device manufacturers, academic institutions, etc.) formed the Open RAN alliance ("O-RAN") in 2018. The O-RAN network architecture is a building block for designing virtualized RAN on programmable hardware with radio access control powered by AI. Various aspects of the O-RAN architecture are described in O-RAN Alliance Working Group (WG) 1, "O-RAN Architecture Description" v 04.00 (March 2021), O-RAN Alliance WG1, "O-RAN Operations and Maintenance Interface Specification" v 04.00 (November 2020), O-RAN Alliance WG1, "O-RAN Operations and Maintenance Architecture Specification" v 04.00 (November 2020), O-RAN Alliance WG1, "Near-Real-time RAN Intelligent Controller, E2 Application Protocol (E2AP)" v 01.01 (July 2020), O-RAN Alliance WG2, "O-RAN A1 interface: General Aspects and Principles 2.02" v 02.02 (March 2021), O-RAN Alliance WG3, "O-RAN Near-Real-time RAN Intelligent Controller Architecture & E2 General Aspects and Principles" v 01.01 (July 2020), O-RAN Near-Real-time RAN Intelligent Controller E2 Service Model 1.0 (February 2020), O-RAN WG3, "Near-Real-time RAN Intelligent Controller E2 Service Model (E2SM) KPM v 01.00 (February 2020), O-RAN WG3, "O-RAN Near-Real-time RAN Intelligent Controller E2 Service Model (E2SM), RAN Function Network Interface (NI)" v 1.0 (February 2020), E2SM RAN Control (E2SM-RC), O-RAN Alliance WG4, O-RAN Fronthaul Management Plane Specification, version 2.0 (July 2019), O-RAN Alliance WG4, "O-RAN Fronthaul Control, User and Synchronization Plane Specification 6.0" v 06.00 (March 2021), O-RAN Alliance WG6, "Cloud Architecture and Deployment Scenarios for O-RAN Virtualized RAN" v 02.01 (July 2020), and U.S. application Ser. No. 17/484,743 filed on 24 Sep. 2021 ("[AD2644-US]") (collectively referred to as "[O-RAN]", the contents of each of which are hereby incorporated by reference in their entireties.

In another example implementation, the edge system 1035 operates according to the 3$^{rd}$ Generation Partnership Project (3GPP) System Aspects Working Group 6 (SA6) Architecture for enabling Edge Applications (referred to as "3GPP edge computing") as discussed in 3GPP TS 23.558 v 17.1.0 (2021 Sep. 24) ("[TS23558]"), 3GPP TS 23.501 v 17.2.0 (2021 Sep. 24) ("[TS23501]"), and U.S. application Ser. No. 17/484,719 filed on 24 Sep. 2021 ("[AD4420-US]") (collectively referred to as "[SA6Edge]"), the contents of each of which is hereby incorporated by reference in their entireties.

In another example implementation, the edge system 1035 operates according to the Intel® Smart Edge Open framework (formerly known as OpenNESS) as discussed in [AD6784-Z] and/or as discussed in Intel® Smart Edge Open Developer Guide, version 21.09 (30 Sep. 2021), available at: <https://smart-edge-open.github.io/> ("[ISEO]"), the contents of which are hereby incorporated by reference in its entirety.

It should be understood that the aforementioned edge computing frameworks and services deployment examples are only one illustrative example of edge computing systems/networks 1035, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

As shown by FIG. 10, each of the NANs 1031, 1032, and 1033 are co-located with edge compute nodes (or "edge servers") 1036a, 1036b, and 1036c, respectively. These implementations may be small-cell clouds (SCCs) where an edge compute node 1036 is co-located with a small cell (e.g., pico-cell, femto-cell, etc.), or may be mobile micro clouds (MCCs) where an edge compute node 1036 is co-located with a macro-cell (e.g., an eNB, gNB, etc.). The edge compute node 1036 may be deployed in a multitude of arrangements other than as shown by FIG. 10. In a first example, multiple NANs 1031-1033 are co-located or otherwise communicatively coupled with one edge compute node 1036. In a second example, the edge servers 1036 may be co-located or operated by RNCs, which may be the case for legacy network deployments, such as 3G networks. In a third example, the edge servers 1036 may be deployed at cell aggregation sites or at multi-RAT aggregation points that can be located either within an enterprise or used in public coverage areas. In a fourth example, the edge servers 1036 may be deployed at the edge of CN 1042. These implementations may be used in follow-me clouds (FMC), where cloud services running at distributed data centers follow the UEs 1021 as they roam throughout the network.

In any of the implementations discussed herein, the edge servers 1036 provide a distributed computing environment for application and service hosting, and also provide storage and processing resources so that data and/or content can be processed in close proximity to subscribers (e.g., users of UEs 1021, 1011) for faster response times The edge servers 1036 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1036 from the UEs 1011/1021, CN 1042, cloud 1044, and/or server(s) 1050, or vice versa. For example, a device application or client application operating in a UE 1021/1011 may offload application tasks or workloads to one or more edge servers 1036. In another example, an edge server 1036 may offload application tasks or workloads to one or more UE 1021/1011 (e.g., for distributed ML computation or the like).

3. Hardware Components, Configurations, and Arrangements

The components of the various devices and/or systems discussed herein may be servers, appliances, network infrastructure, machines, robots, drones, and/or any other type of computing devices. For example, the edge cloud may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 11. The edge cloud may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 11:
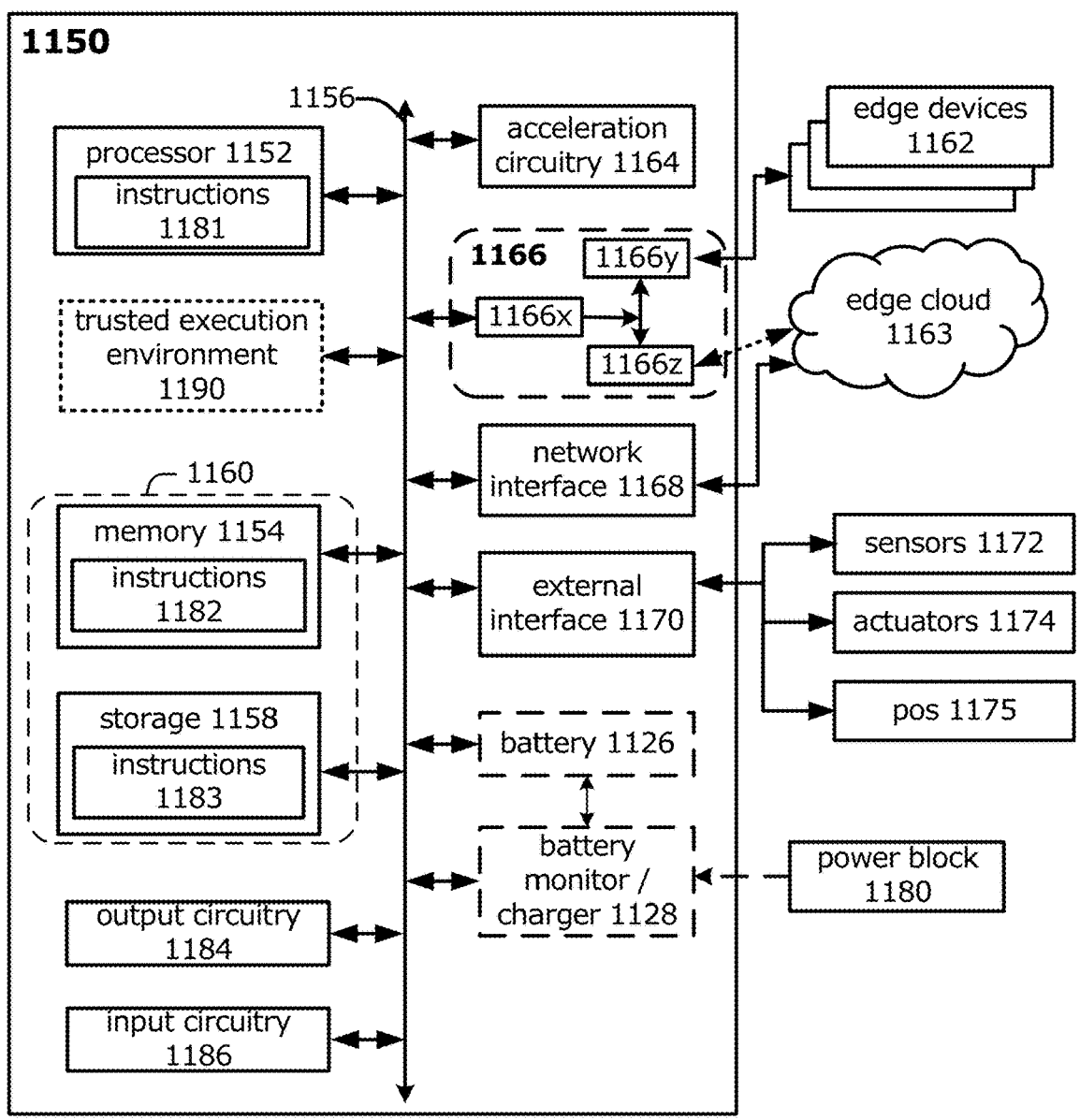
FIG. 11 depict example components of a compute node, which may be deployed in an edge computing system(s).

FIG. 11 illustrates an example of components that may be present in a computing node 1150 for implementing the techniques (e.g., operations, processes, methods, and methodologies) described herein. The compute node 1150 provides a closer view of the respective components of node 1100 when implemented as or as part of a computing device (e.g., as a mobile device, a base station, server, gateway, etc.). The compute node 1150 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 1150, or as components otherwise incorporated within a chassis of a larger system.

In some embodiments, compute node 1150 may correspond to the UEs 121, RUs 130, DUs 131, CUs 132, and/or CMF 136 of FIG. 1; UEs 221 and/or NANs 231 of FIG. 2; the Near-RT RIC 301, the SMO 302, the Non-RT RIC 320, and/or the E2 nodes 303 in FIG. 3; UEs 1011, 1021a, NANs 1031-1033, edge compute node(s) 1036, CN 1042 (or compute node(s) therein), and/or cloud 1044 (or compute node(s) therein) of FIG. 10; software distribution platform 1205 and/or processor platform(s) 1200 of FIG. 12; and/or any other component, device, and/or system discussed herein. The compute node 1150 may be embodied as a type of device, appliance, computer, or other "thing" capable of communicating with other edge, networking, or endpoint components. For example, compute node 1150 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 1150 includes processing circuitry in the form of one or more processors 1152. The processor circuitry 1152 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1152 may include one or more hardware accelerators (e.g., same or similar to acceleration circuitry 1164), which may be microprocessors, programmable processing devices (e.g., FPGA, ASIC, etc.), or the like. The one or more accelerators may include, for example, computer vision and/or deep learning accelerators. In some implementations, the processor circuitry 1152 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 1152 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 1152 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 1152 may work in coordination with each other to execute many types of operations and instructions within and on behalf of the compute node 1150.

The processors (or cores) 1152 may be coupled with or may include memory/storage and may be configured to execute instructions stored in the memory/storage to enable various applications or operating systems to run on the platform 1150. The processors (or cores) 1152 is configured to operate application software to provide a specific service to a user of the platform 1150. Additionally or alternatively, the processor(s) 1152 may be a special-purpose processor(s)/controller(s) configured (or configurable) to operate according to the elements, features, and implementations discussed herein.

As examples, the processor(s) 1152 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1152 may be a part of a system on a chip (SoC), System-in-Package (SiP), a multi-chip package (MCP), and/or the like, in which the processor(s) 1152 and other components are formed into a single integrated circuit, or a single package, such as the Edison™ or Galileo™ SoC boards from Intel® Corporation. Other examples of the processor(s) 1152 are mentioned elsewhere in the present disclosure.

The processor(s) 1152 may communicate with system memory 1154 over an interconnect (IX) 1156. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the IX 1156. In an example, the storage 1158 may be implemented via a solid-state disk drive (SSDD) and/or high-speed electrically erasable memory (commonly referred to as "flash memory"). Other devices that may be used for the storage 1158 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1154 and/or storage circuitry 1158 may also incorporate three-dimensional (3D) cross-point (XPOINT) memories from Intel® and Micron®.

In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components of edge computing device 1150 may communicate over an interconnect (IX) 1156. The IX 1156 may represent any suitable type of connection or interface such as, for example, metal or metal alloys (e.g., copper, aluminum, etc.), fiber, and/or the like. The IX 1156 may include any number of IX, fabric, and/or interface technologies, including instruction set architecture (ISA), extended ISA (eISA), Inter-Integrated Circuit ($I^2C$), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, HyperTransport IXs, NVLink provided by NVIDIA®, a Time-Trigger Protocol (TTP) system, a FlexRay system, PROFIBUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 1156 may be a proprietary bus, for example, used in a SoC based system.

The IX 1156 couples the processor 1152 to communication circuitry 1166 for communications with other devices, such as a remote server (not shown) and/or the connected edge devices 1162. The communication circuitry 1166 is a hardware element, or collection of hardware elements, used to communicate over one or more networks (e.g., cloud 1163) and/or with other devices (e.g., edge devices 1162).

The transceiver 1166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1162. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1166 (or multiple transceivers) may communicate using multiple standards or radios for communications at a different range. For example, the compute node 1150 may communicate with close devices, e.g., within about 10 meters, using a local transceiver based on BLE, or another low power radio, to save power. More distant connected edge devices 1162, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1166 (e.g., a radio transceiver) may be included to communicate with devices or services in the edge cloud 1163 via local or wide area network protocols. The wireless network transceiver 1166 may be an LPWA transceiver that follows the IEEE 802.15.4, or IEEE 802.15.4g standards, among others. The compute node 1163 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1166, as described herein. For example, the transceiver 1166 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1166 may include radios that are compatible with any number of 3GPP specifications, such as LTE and 5G/NR communication systems, discussed in further detail at the end of the present disclosure. A network interface controller (NIC) 1168 may be included to provide a wired communication to nodes of the edge cloud 1163 or to other devices, such as the connected edge devices 1162 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 1168 may be included to enable connecting to a second network, for example, a first NIC 1168 providing communications to the cloud over Ethernet, and a second NIC 1168 providing communications to other devices over another type of network.

Given the variety of types of applicable communications from the device to another component or network, applicable communications circuitry used by the device may include or be embodied by any one or more of components 1164, 1166, 1168, or 1170. Accordingly, in various examples, applicable means for communicating (e.g., receiving, transmitting, etc.) may be embodied by such communications circuitry.

The compute node 1150 may include or be coupled to acceleration circuitry 1164, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1164 may comprise logic blocks or logic fabric and other interconnected resources that may be programmed (configured) to perform various functions, such as the procedures, methods, functions, etc. discussed herein. In such implementations, the acceleration circuitry 1164 may also include memory cells (e.g., EPROM, EEPROM, flash memory, static memory (e.g., SRAM, anti-fuses, etc.) used to store logic blocks, logic fabric, data, etc. in LUTs and the like.

The IX 1156 also couples the processor 1152 to a sensor hub or external interface 1170 that is used to connect additional devices or subsystems. The additional/external devices may include sensors 1172, actuators 1174, and positioning circuitry 1175.

The sensor circuitry 1172 includes devices, modules, or subsystems whose purpose is to detect events or changes in its environment and send the information (sensor data) about the detected events to some other a device, module, subsystem, etc. Examples of such sensors 1172 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1150); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1174, allow platform 1150 to change its state, position, and/or orientation, or move or control a mechanism or system. The actuators 1174 comprise electrical and/or mechanical devices for moving or controlling a mechanism or system, and converts energy (e.g., electric current or moving air and/or liquid) into some kind of motion. The actuators 1174 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1174 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1150 may be configured to operate one or more actuators 1174 based on one or more captured events and/or instructions or control signals received from a service provider and/or various client systems.

The positioning circuitry 1175 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1175 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1175 may include a Micro-Technology for Positioning, Navigation, and Timing (Micro-PNT) IC that uses a master timing clock to perform position tracking/estimation without GNSS assistance. The positioning circuitry 1175 may also be part of, or interact with, the communication circuitry 1166 to communicate with the nodes and components of the positioning network. The positioning circuitry 1175 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1175 is, or includes an INS, which is a system or device that uses sensor circuitry 1172 (e.g., motion sensors such as accelerometers, rotation sensors such as gyroscopes, and altimimeters, magnetic sensors, and/or the like to continuously calculate (e.g., using dead by dead reckoning, triangulation, or the like) a position, orientation, and/or velocity (including direction and speed of movement) of the platform 1150 without the need for external references.

In some optional examples, various input/output (I/O) devices may be present within or connected to, the compute node 1150, which are referred to as input circuitry 1186 and output circuitry 1184 in FIG. 11. The input circuitry 1186 and output circuitry 1184 include one or more user interfaces designed to enable user interaction with the platform 1150 and/or peripheral component interfaces designed to enable peripheral component interaction with the platform 1150. Input circuitry 1186 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1184 may be included to show information or otherwise convey information, such as sensor readings, actuator position(s), or other like information. Data and/or graphics may be displayed on one or more user interface components of the output circuitry 1184. Output circuitry 1184 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1150. The output circuitry 1184 may also include speakers or other audio emitting devices, printer(s), and/or the like. Additionally or alternatively, the sensor circuitry 1172 may be used as the input circuitry 1184 (e.g., an image capture device, motion capture device, or the like) and one or more actuators 1174 may be used as the output device circuitry 1184 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1176 may power the compute node 1150, although, in examples in which the compute node 1150 is mounted in a fixed location, it may have a power supply coupled to an electrical grid, or the battery may be used as a backup or for temporary capabilities. The battery 1176 may be a lithium ion battery, or a metal-air battery, such as a zinc-air battery, an aluminum-air battery, a lithium-air battery, and the like.

A battery monitor/charger 1178 may be included in the compute node 1150 to track the state of charge (SoCh) of the battery 1176, if included. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1178 may communicate the information on the battery 1176 to the processor 1152 over the IX 1156. The battery monitor/charger 1178 may also include an analog-to-digital (ADC) converter that enables the processor 1152 to directly monitor the voltage of the battery 1176 or the current flow from the battery 1176. The battery parameters may be used to determine actions that the compute node 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the compute node 1150. A wireless battery charging circuit, such as an LTC4020 chip from Linear Technologies of Milpitas, California, among others, may be included in the battery monitor/charger 1178. The specific charging circuits may be selected based on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1183 in the form of software, firmware, or hardware commands to implement the techniques described herein. Although such instructions 1182, 1183 are shown as code blocks included in the memory 1154 and the storage 1158, any of the code blocks 1182, 1183 may be replaced with hardwired circuits, for example, built into an application specific integrated circuit (ASIC) or programmed into an FPGA, or the like.

In an example, the instructions 1181, 1182, 1183 provided via the memory 1154, the storage 1158, or the processor 1152 may be embodied as a non-transitory machine-readable medium (NTMRM) 1160 including code to direct the processor 1152 to perform electronic operations in the compute node 1150. The processor 1152 may access the NTMRM 1160 over the IX 1156. For instance, the NTMRM 1160 may be embodied by devices described for the storage 1158 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 1160 may include instructions to direct the processor 1152 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 1181, 1182, 1183) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1181, 1182, 1183 for carrying out operations of the present disclosure may also be written in any combination of the programming languages discussed herein. The program code may execute entirely on the system 1150, partly on the system 1150, as a stand-alone software package, partly on the system 1150 and partly on a remote computer or entirely on the remote computer or server. In the latter scenario, the remote computer may be connected to the system 1150 through any type of network, including a LAN or WAN, or the connection may be made to an external computer (e.g., through the Internet using an Internet Service Provider).

In an example, the instructions 1181, 1182, 1183 on the processor circuitry 1152 (separately, or in combination with the instructions 1181, 1182, 1183) may configure execution or operation of a trusted execution environment (TEE) 1190. The TEE 1190 operates as a protected area accessible to the processor circuitry 1102 to enable secure access to data and secure execution of instructions. In some embodiments, the TEE 1190 may be a physical hardware device that is separate from other components of the system 1150 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1190 may be implemented as secure enclaves, which are isolated regions of code and/or data within the processor and/or memory/storage circuitry of the system 1150. Only code executed within a secure enclave may access data within the same secure enclave, and the secure enclave may only be accessible using the secure application (which may be implemented by an application processor or a tamper-resistant microcontroller). Various implementations of the TEE 1190, and an accompanying secure area in the processor circuitry 1152 or the memory circuitry 1154 and/or storage circuitry 1158 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1100 through the TEE 1190 and the processor circuitry 1152. Additionally or alternatively, the memory circuitry 1154 and/or storage circuitry 1158 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1104 and/or storage circuitry 1108 may be divided into one or more trusted memory regions for storing applications or software modules of the TEE 1190.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

FIG. 11 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

FIG. 11 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

Figure 12:
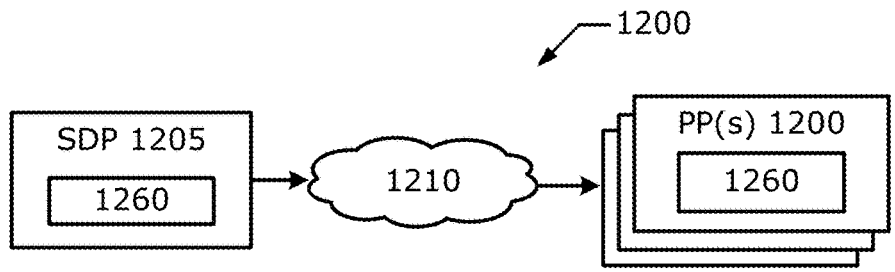
FIG. 12 illustrates an example software distribution platform.

FIG. 12 illustrates an example software (SW) distribution platform (SDP) 1205 to distribute software 1260, such as the example computer readable instructions 1181, 1182, 1183 of FIG. 11, to one or more devices, such as example processor platform(s) (pp) 1200, connected edge devices 1162 (see e.g., FIG. 11), and/or any of the other computing systems/devices discussed herein. The SDP 1205 (or components thereof) may be implemented by any computer server, data facility, cloud service, CDN, edge computing framework, etc., capable of storing and transmitting software (e.g., code, scripts, executable binaries, containers, packages, compressed files, and/or derivatives thereof) to other computing devices (e.g., third parties, the example connected edge devices 1162 of FIG. 11). The SDP 1205 (or components thereof) may be located in a cloud (e.g., data center, etc.), a local area network, an edge network, a wide area network, on the Internet, and/or any other location communicatively coupled with the pp 1200.

The pp 1200 and/or connected edge devices 1162 connected edge devices 1162 may include customers, clients, managing devices (e.g., servers), third parties (e.g., customers of an entity owning and/or operating the SDP 1205), IoT devices, and the like. The pp 1200/connected edge devices 1162 may operate in commercial and/or home automation environments. In some examples, a third party is a developer, a seller, and/or a licensor of software such as the example computer readable media 1181, 1182, 1183 of FIG. 11. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.). In some examples, the pp 1200/connected edge devices 1162 can be physically located in different geographic locations, legal jurisdictions, etc.

In FIG. 12, the SDP 1205 includes one or more servers (referred to as "servers 1205") and one or more storage devices (referred to as "storage 1205"). The storage 1205 store the computer readable instructions 1260, which may correspond to the instructions 1181, 1182, 1183 of FIG. 11. The servers 1205 are in communication with a network 1210, which may correspond to any one or more of the Internet and/or any of the example networks as described herein. The servers 1205 are responsive to requests to transmit the software to a requesting party as part of a commercial transaction. Payment for the delivery, sale and/or license of the software may be handled by the servers 1205 and/or via a third-party payment entity. The servers 1205 enable purchasers and/or licensors to download the computer readable instructions 1260 from the SDP 1205.

The servers 1205 are communicatively connected to one or more security domains and/or security devices through which requests and transmissions of the example computer readable instructions 1260 must pass. Additionally or alternatively, the servers 1205 periodically offer, transmit, and/or force updates to the software 1260 to ensure improvements, patches, updates, etc. are distributed and applied to the software at the end user devices. The computer readable instructions 1260 are stored on storage 1205 in a particular format. A format of computer readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.), and/or any other format such as those discussed herein. In some examples, the computer readable instructions 1260 stored in the SDP 1205 are in a first format when transmitted to the pp 1200. Additionally or alternatively, the first format is an executable binary in which particular types of the pp 1200 can execute. Additionally or alternatively, the first format is uncompiled code that requires one or more preparation tasks to transform the first format to a second format to enable execution on the pp 1200. For example, the receiving pp 1200 may need to compile the computer readable instructions 1260 in the first format to generate executable code in a second format that is capable of being executed on the pp 1200. Additionally or alternatively, the first format is interpreted code that, upon reaching the pp 1200, is interpreted by an interpreter to facilitate execution of instructions. Additionally or alternatively, different components of the computer readable instructions 1182 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

4. Machine Learning (ML) and Artificial Intelligence (AI)

Machine learning (ML) involves programming computing systems to optimize a performance criterion using example (training) data and/or past experience. ML refers to the use and development of computer systems that are able to learn and adapt without following explicit instructions, by using algorithms and statistical models to analyze and draw inferences from patterns in data. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions).

ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm" refers to different concepts than the term "ML model," these terms may be used interchangeably for the purposes of the present disclosure.

ML techniques generally fall into the following main types of learning problem categories: supervised learning, unsupervised learning, and reinforcement learning (RL). Supervised learning is an ML task that aims to learn a mapping function from the input to the output, given a labeled data set. Supervised learning algorithms build models from a set of data that contains both the inputs and the desired outputs. For example, supervised learning may involve learning a function (model) that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

Classification, in the context of ML, refers to an ML technique for determining the classes to which various data points belong. Here, the term "class" or "classes" may refer to categories, and are sometimes called "targets" or "labels." Classification is used when the outputs are restricted to a limited set of quantifiable properties. Classification algorithms may describe an individual (data) instance whose category is to be predicted using a feature vector. In ML classification, labels are assigned to instances, and models are trained to correctly predict the pre-assigned labels of from the training examples. A "label" may refer to a desired output for a feature and/or feature vector in an ML algorithm. ML algorithms for classification may be referred to as a "classifier." Examples of classifiers include linear classifiers, k-nearest neighbor (kNN), decision trees, random forests, support vector machines (SVMs), Bayesian classifiers, convolutional neural networks (CNNs), among many others. Some of these algorithms can be used for other ML tasks as well.

A regression algorithm and/or a regression analysis, in the context of ML, refers to a set of statistical processes for estimating the relationships between a dependent variable (often referred to as the "outcome variable") and one or more independent variables (often referred to as "predictors", "covariates", or "features"). The outcome of a regression algorithm is a continuous value and not a discrete value as in classification. In contrast to classification, regression does not have a defined range of output values. A regression prediction is, depending on the algorithm, a combination of previously seen values with similar features or a function of its features. Examples of regression algorithms/models include logistic regression, linear regression, gradient descent (GD), stochastic GD (SGD), and the like.

Instance-based learning (sometimes referred to as "memory-based learning"), in the context of ML, refers to a family of learning algorithms that, instead of performing explicit generalization, compares new problem instances with instances seen in training, which have been stored in memory. Examples of instance-based algorithms include k-nearest neighbor, and the like), decision tree Algorithms (e.g., Classification And Regression Tree (CART), Iterative Dichotomiser 3 (ID3), C4.5, chi-square automatic interaction detection (CHAID), etc.), Fuzzy Decision Tree (FDT), and the like), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest, and the like.

In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features. A set of features may be referred to as a "feature vector." A vector is a tuple of one or more values called scalars, and a feature vector may include a tuple of one or more features. The vector space associated with these vectors is often called a "vector space" or a "feature space." In order to reduce the dimensionality of the feature space, a number of dimensionality reduction techniques can be employed. Additionally or alternatively, a feature vector may be a data structure that contains known attributes of an instance.

Unsupervised learning is an ML task that aims to learn a function to describe a hidden structure from unlabeled data. Unsupervised learning algorithms build models from a set of data that contains only inputs and no desired output labels. Unsupervised learning algorithms are used to find structure in the data, like grouping or clustering of data points. Some examples of unsupervised learning are K-means clustering, principal component analysis (PCA), and topic modeling, among many others. In particular, topic modeling is an unsupervised machine learning technique scans a set of information objects (e.g., documents, webpages, files, data structures, etc.), detects word and phrase patterns within the information objects (and automatically clusters word groups and similar expressions that best characterize the set of information objects (Semi-supervised learning algorithms develop ML models from incomplete training data, where a portion of the sample input does not include labels. One example of unsupervised learning is topic modeling. Topic modeling involves counting words and grouping similar word patterns to infer topics within unstructured data. By detecting patterns such as word frequency and distance between words, a topic model clusters feedback that is similar, and words and expressions that appear most often. With this information, the topics of individual set of texts can be quickly deduced.

RL is a goal-oriented learning based on interaction with environment. RL is an ML paradigm concerned with how software agents (or AI agents) ought to take actions in an environment in order to maximize a numerical reward signal. In general, RL involves an agent taking actions in an environment that is/are interpreted into a reward and a representation of a state, which is then fed back into the agent. In RL, an agent aims to optimize a long-term objective by interacting with the environment based on a trial and error process. In many RL algorithms, the agent receives a reward in the next time step (or epoch) to evaluate its previous action. Examples of RL algorithms include Markov decision process (MDP) and Markov chains, associative RL, inverse RL, safe RL, Q-learning, multi-armed bandit learning, and deep RL.

Figure 13:
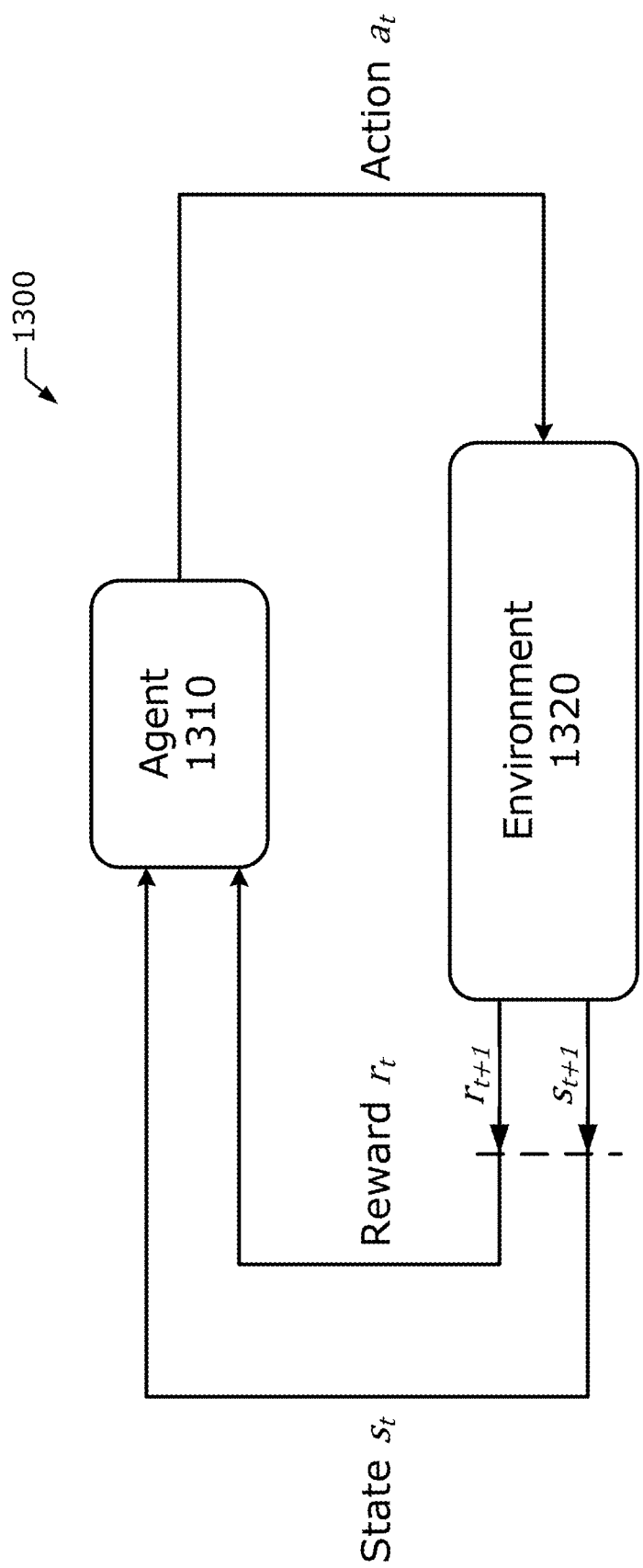
FIG. 13 depicts an example reinforcement learning architecture.

FIG. 13 shows an RL architecture 1300 comprising an agent 1310 and an environment 1320. The agent 1310 (e.g., software agent or AI agent) is the learner and decision maker, and the environment 1320 comprises everything outside the agent 1310 that the agent 1310 interacts with. In various embodiments, the CMF 136 may be the agent 1310, and the network 100, 200 is the environment 1320. The environment 1320 is typically stated in the form of a Markov decision process (MDP), which may be described using dynamic programming techniques. An MDP is a discrete-time stochastic control process that provides a mathematical framework for modeling decision making in situations where outcomes are partly random and partly under the control of a decision maker.

The agent 1310 and environment 1320 continually interact with one another, wherein the agent 1310 selects actions A to be performed and the environment 1320 responds to these Actions and presents new situations (or states S) to the agent 1310. The action A comprises all possible actions, tasks, moves, etc., that the agent 1310 can take for a particular context. The state S is a current situation such as a complete description of a system, a unique configuration of information in a program or machine, a snapshot of a measure of various conditions in a system, and/or the like. In some implementations, the agent 1310 selects an action A to take based on a policy $\pi$. The policy $\pi$ is a strategy that the agent 1310 employs to determine next action A based on the current state S. The environment 1320 also gives rise to rewards R, which are numerical values that the agent 1310 seeks to maximize over time through its choice of actions.

The environment 1320 starts by sending a state $S_t$ to the agent 1310. In some implementations, the environment 1320 also sends an initial a reward $R_t$ to the agent 1310 with the state $S_t$. The agent 1310, based on its knowledge, takes an action $A_t$ in response to that state $S_t$, (and reward $R_t$, if any). The action $A_t$ is fed back to the environment 1320, and the environment 1320 sends a state-reward pair including a next state $S_{t+1}$ and reward $R_{t+1}$ to the agent 1310 based on the action $A_t$. The agent 1310 will update its knowledge with the reward $R_{t+1}$ returned by the environment 1320 to evaluate its previous action(s). The process repeats until the environment 1320 sends a terminal state S, which ends the process or episode. Additionally or alternatively, the agent 1310 may take a particular action A to optimize a value V. The value V an expected long-term return with discount, as opposed to the short-term reward R. $V\pi(S)$ is defined as the expected long-term return of the current state S under policy $\pi$.

Q-learning is a model-free RL algorithm that learns the value of an action in a particular state. Q-learning does not require a model of an environment 1320, and can handle problems with stochastic transitions and rewards without requiring adaptations. The "Q" in Q-learning refers to the function that the algorithm computes, which is the expected reward(s) for an action A taken in a given state S. In Q-learning, a Q-value is computed using the state $S_t$ and the action $A_t$ at time t using the function $Q_\pi(S_t, A_t)$. $Q_\pi(S_t, A_t)$ is the long-term return of a current state S taking action A under policy $\pi$. For any finite MDP (FMDP), Q-learning finds an optimal policy $\pi$ in the sense of maximizing the expected value of the total reward over any and all successive steps, starting from the current state S. Additionally, examples of value-based deep RL include Deep Q-Network (DQN), Double DQN, and Dueling DQN. DQN is formed by substituting the Q-function of the Q-learning by an artificial neural network (ANN) such as a convolutional neural network (CNN).

An artificial neural network (ANN) (or simply "neural network" (NN)) encompasses a variety of ML techniques where a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), a deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), etc.), deep stacking network (DSN). Any of the aforementioned ML techniques may be utilized, in whole or in part, and variants and/or combinations thereof, for any of the example embodiments discussed herein.

ML may require, among other things, obtaining and cleaning a dataset, performing feature selection, selecting an ML algorithm, dividing the dataset into training data and testing data, training a model (e.g., using the selected ML algorithm), testing the model, optimizing or tuning the model, and determining metrics for the model. Some of these tasks may be optional or omitted depending on the use case and/or the implementation used.

ML algorithms accept model parameters (or simply "parameters") and/or hyperparameters (HPs) that can be used to control certain properties of the training process and the resulting model. Model parameters are parameter values, characteristics, and/or properties that are learnt during training. Additionally or alternatively, a model parameter is a configuration variable that is internal to the model and whose value can be estimated from the given data. Model parameters are usually required by a model when making predictions, and their values define the skill of the model on a particular problem. Usually, parameters are not set manually by the data scientist or ML practitioner. Furthermore, parameters may differ for individual experiments and may depend on the type of data and ML tasks being performed. Examples of such parameters include weights in an artificial neural network, support vectors in a support vector machine, and coefficients in a linear regression or logistic regression. Examples of parameters for topic classification and/or natural language processing (NLP) tasks may include word frequency, sentence length, noun or verb distribution per sentence, the number of specific character n-grams per word, lexical diversity, constraints, weights, and the like.

HPs are characteristics, properties, or parameters for a training process that cannot be learnt during the training process and are set before training takes place. HPs are often used in processes to help estimate model parameters. Examples of HPs may include model size (e.g., in terms of memory space or bytes), whether (and how much) to shuffle the training data, the number of evaluation instances or epochs (e.g., a number of iterations or passes over the training data), learning rate (e.g., the speed at which the algorithm reaches (converges to) the optimal weights), learning rate decay (or weight decay), the number and size of the hidden layers, weight initialization scheme, dropout and gradient clipping thresholds, the C and sigma HPs for support vector machines, the k in k-nearest neighbors, and/or the like. In some implementations, the parameters and/or HPs may additionally or alternatively include vector size and/or word vector size.

HPs can be classified as model HPs and algorithm HPs. Model HPs are parameters that cannot be inferred while fitting the ML model to the training set because they refer to the model selection task. Algorithm HPs in principle have no influence on the performance of the model but affect the speed and quality of the learning process. An example of a model HP is the topology and size of a neural network, and examples of algorithm HPs include learning rate and mini-batch-size. The term "hyperparameter" as used herein may refer to either model hyperparameters, algorithm hyperparameters, or both, even though these terms refer to different concepts. The particular values selected for the HPs affect the training speed, training resource consumption, and the quality of the learning process. Different HPs used to define an ML algorithm/model may cause the ML algorithm/model to generalize different data patterns. For example, the same kind of ML model can require different constraints, weights, or learning rates (e.g., HPs) to generalize different data patterns. Additionally, the performance of an ML algorithm/model is dependent on the choice of HPs. Selecting and/or altering the value of different HPs can cause relatively large variations in ML algorithm/model performance. Therefore, HPs may need to be optimized or "tuned" so that the model can optimally solve the ML problem in an efficient manner.

Figure 14:
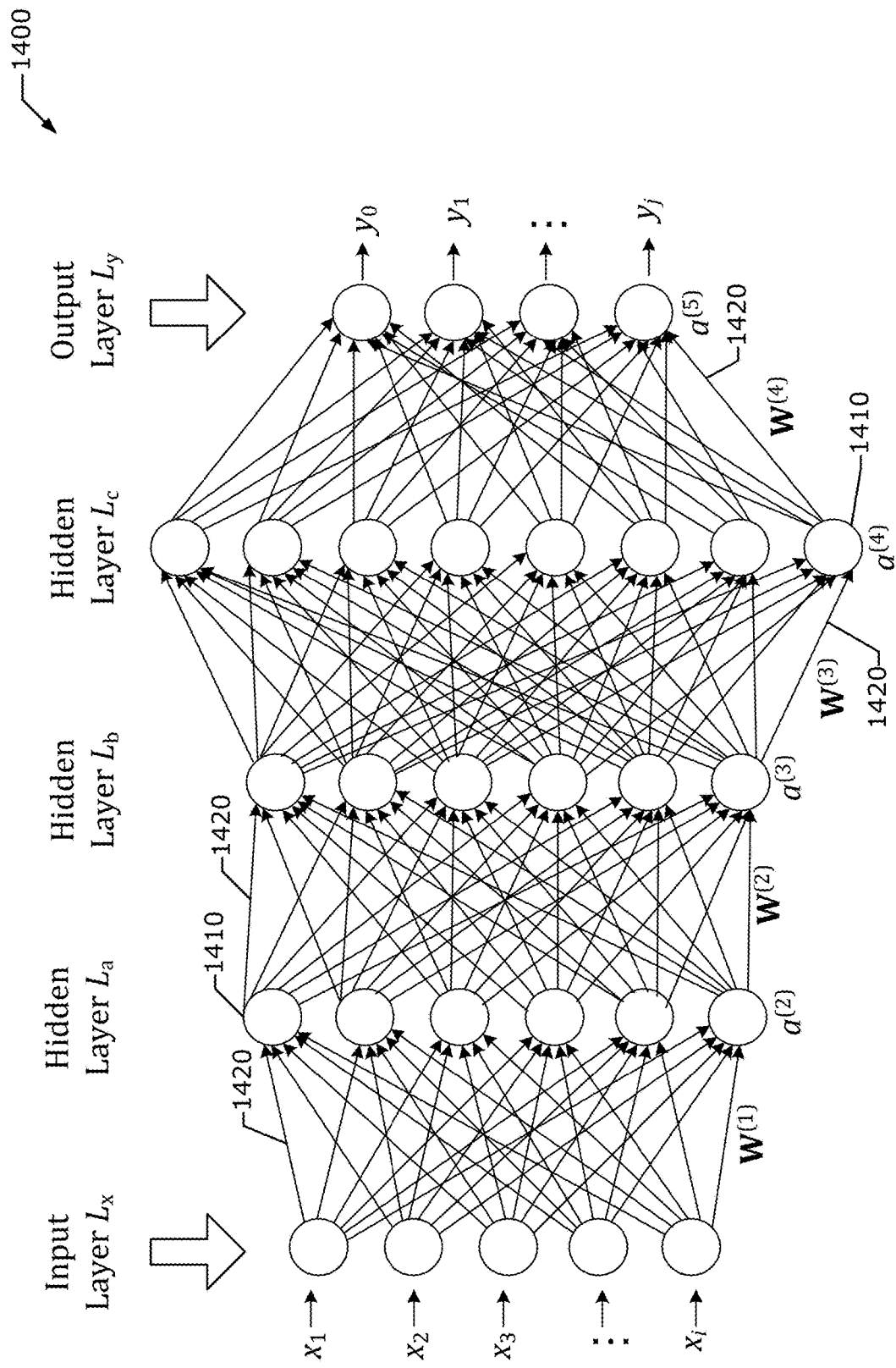
FIG. 14 illustrates an artificial neural network (NN).

FIG. 14 illustrates an example NN 1400, which may be suitable for use by one or more of the computing systems (or subsystems) of the various implementations discussed herein, implemented in part by a HW accelerator, and/or the like. The NN 1400 may be deep neural network (DNN) used as an artificial brain of a compute node or network of compute nodes to handle very large and complicated observation spaces. Additionally or alternatively, the NN 1400 can be some other type of topology (or combination of topologies), such as a convolution NN (CNN), deep CNN (DCN), recurrent NN (RNN), Long Short Term Memory (LSTM) network, a Deconvolutional NN (DNN), gated recurrent unit (GRU), deep belief NN, a feed forward NN (FFN), a deep FNN (DFF), deep stacking network, Markov chain, perception NN, Bayesian Network (BN) or Bayesian NN (BNN), Dynamic BN (DBN), Linear Dynamical System (LDS), Switching LDS (SLDS), Optical NNs (ONNs), an NN for reinforcement learning (RL) and/or deep RL (DRL), and/or the like. In embodiments, the NN 1400 may be used for the GNN-RL framework discussed herein.

The NN 1400 may encompass a variety of ML techniques where a collection of connected artificial neurons 1410 that (loosely) model neurons in a biological brain that transmit signals to other neurons/nodes 1410. The neurons 1410 may also be referred to as nodes 1410, processing elements (PEs) 1410, or the like. The connections 1420 (or edges 1420) between the nodes 1410 are (loosely) modeled on synapses of a biological brain and convey the signals between nodes 1410. Note that not all neurons 1410 and edges 1420 are labeled in FIG. 14 for the sake of clarity.

Each neuron 1410 has one or more inputs and produces an output, which can be sent to one or more other neurons 1410 (the inputs and outputs may be referred to as "signals"). Inputs to the neurons 1410 of the input layer $L_x$ can be feature values of a sample of external data (e.g., input variables $x_i$). The input variables $x_i$ can be set as a vector containing relevant data (e.g., observations, ML features, etc.). The inputs to hidden units 1410 of the hidden layers $L_a$, $L_b$, and $L_c$ may be based on the outputs of other neurons 1410. The outputs of the final output neurons 1410 of the output layer $L_y$ (e.g., output variables $y_j$) include predictions, inferences, and/or accomplish a desired/configured task. The output variables $y_j$ may be in the form of determinations, inferences, predictions, and/or assessments. Additionally or alternatively, the output variables $y_j$ can be set as a vector containing the relevant data (e.g., determinations, inferences, predictions, assessments, and/or the like).

In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

Neurons 1410 may have a threshold such that a signal is sent only if the aggregate signal crosses that threshold. A node 1410 may include an activation function, which defines the output of that node 1410 given an input or set of inputs. Additionally or alternatively, a node 1410 may include a propagation function that computes the input to a neuron 1410 from the outputs of its predecessor neurons 1410 and their connections 1420 as a weighted sum. A bias term can also be added to the result of the propagation function.

The NN 1400 also includes connections 1420, some of which provide the output of at least one neuron 1410 as an input to at least another neuron 1410. Each connection 1420 may be assigned a weight that represents its relative importance. The weights may also be adjusted as learning proceeds. The weight increases or decreases the strength of the signal at a connection 1420.

The neurons 1410 can be aggregated or grouped into one or more layers L where different layers L may perform different transformations on their inputs. In FIG. 14, the NN 1400 comprises an input layer $L_x$, one or more hidden layers $L_a$, $L_b$, and $L_c$, and an output layer $L_y$ (where a, b, c, x, and y may be numbers), where each layer L comprises one or more neurons 1410. Signals travel from the first layer (e.g., the input layer $L_1$), to the last layer (e.g., the output layer $L_y$), possibly after traversing the hidden layers $L_a$, $L_b$, and $L_c$ multiple times. In FIG. 14, the input layer $L_a$ receives data of input variables $x_i$ (where i=1, ..., p, where p is a number). Hidden layers $L_a$, $L_b$, and $L_c$ processes the inputs $x_i$, and eventually, output layer $L_y$ provides output variables $y_j$ (where j=1, ..., p', where p' is a number that is the same or different than p). In the example of FIG. 14, for simplicity of illustration, there are only three hidden layers $L_a$, $L_b$, and $L_c$ in the NN 1400, however, the NN 1400 may include many more (or fewer) hidden layers $L_a$, $L_b$, and $L_c$ than are shown.

5. Example Implementations

Figure 15:
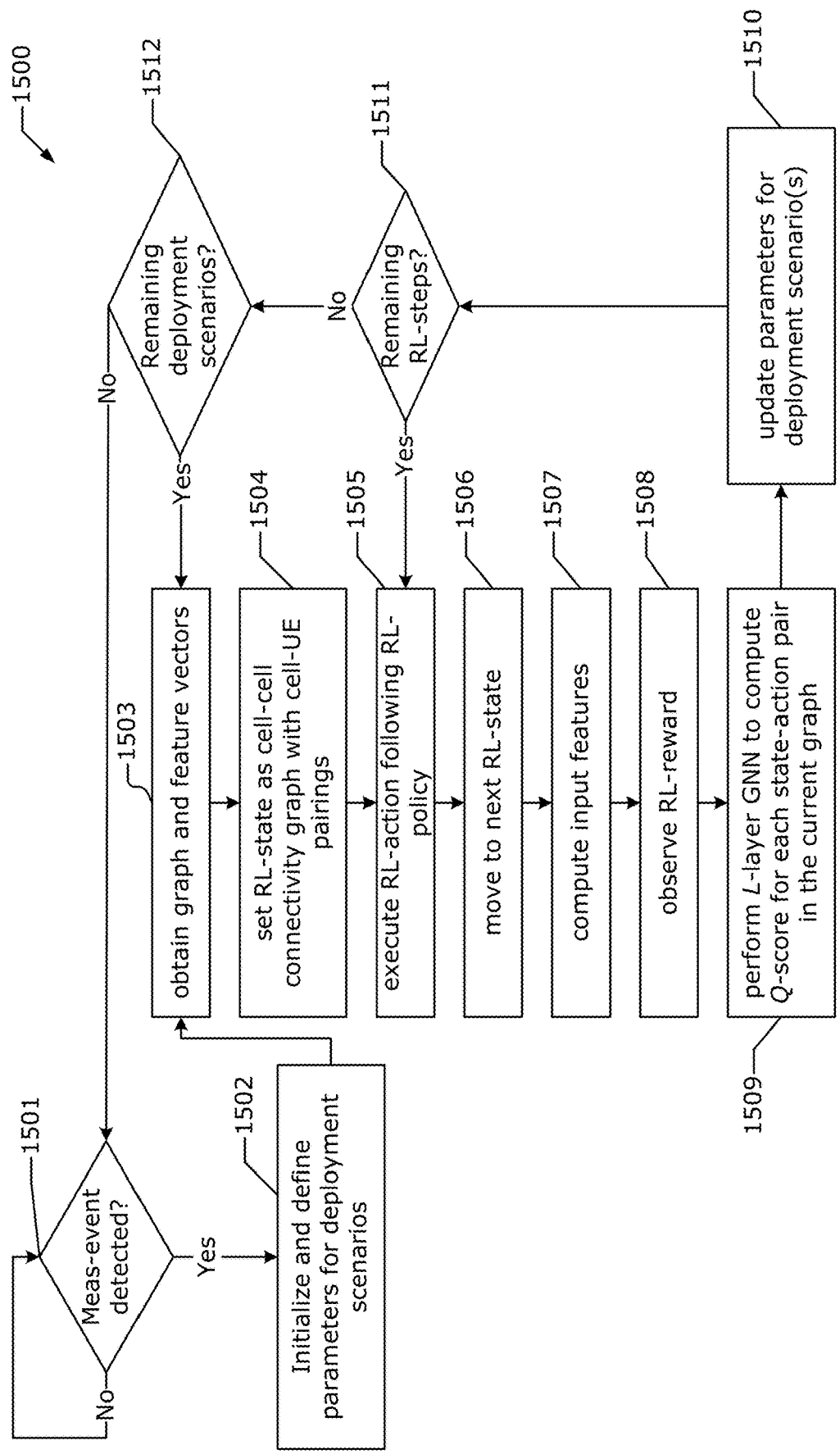
FIGS. 15 and 16 depict example processes for practicing the embodiments discussed herein.

FIG. 15 shows an example GNN-RL process 1500 according to various embodiments. Process 1500 may be performed by CMF 136. Process 1500 begins at operation 1501 where the CMF 136 determines whether a conn-event (e.g., an HO request) has been detected. If not, the CMF 136 continues to monitor for a conn-event. If a conn-event is detected, the CMF 136 proceeds to operation 1502 to initialize and define the various parameters for each deployment scenario (e.g., a set of UEs 221 and their existing and/or potential connections to respective NANs 231). In particular, the CMF 136 may initialize the weight matrices for the GNN and set a number of deployment scenarios I, episodes K (or RL time-steps T), and GNN layers L.

At operation 1503, the CMF 136 obtains a graph and a set of feature vectors, and at operation 1504, the CMF 136 sets an RL-state (or current state $s_t$) as a cell-cell connectivity graph with some cell-UE pairings. When the RL-state is the initial state $s_0$, the connectivity graph may be the initial graph $\mathcal{G}_0$. When the RL-state is another state $s_t$, the connectivity graph may be the a graph at time-step t ($\mathcal{G}_t$). At operation 1505, the CMF 136 executes an RL-action $a_t$ following the policy $\pi_t(a_t|s_t)$, and at operation 1506, the CMF 136 moves to the next RL-state ($s_{t+1}$).

At operation 1507, the CMF 136 computes the input features $X_{cl,1}^{(0)}$, $X_{cl,2}^{(0)}$, and $X_{ue}^{(0)}$, and at operation 1508, the CMF 136 observes the RL-reward $r(a_t, s_t)$. At operation 1509, the CMF 136 perform L-layer GNN computations to compute a Q-score for each state-action pair in the current graph $\mathcal{G}$ (see equation (18)). At operation 1510, the CMF 136 updates the parameters for the deployment scenario (e.g., the parameters set at operation 1502) such as the weight parameters, number of deployment scenarios I, episodes K and/or RL-steps T.

At operation 1511, the CMF 136 determines whether there are any remaining RL-steps to process (e.g., T>0?). If there are remaining RL-steps, the CMF 136 loops back to perform operation 1505 to execute a next RL-action $a_{t+1}$. If there are no remaining RL-steps for a current deployment scenario, the CMF 136 proceeds to operation 1512 to determine if there are any remaining deployment scenarios to process (e.g., I>0?). If there are remaining deployment scenarios to process, the CMF 136 loops back to perform operation 1503 to obtain a next graph and corresponding feature vectors. If there are no remaining deployment scenarios to process, the CMF 136 loops back to detect a next conn-event at operation 1501.

Figure 16:
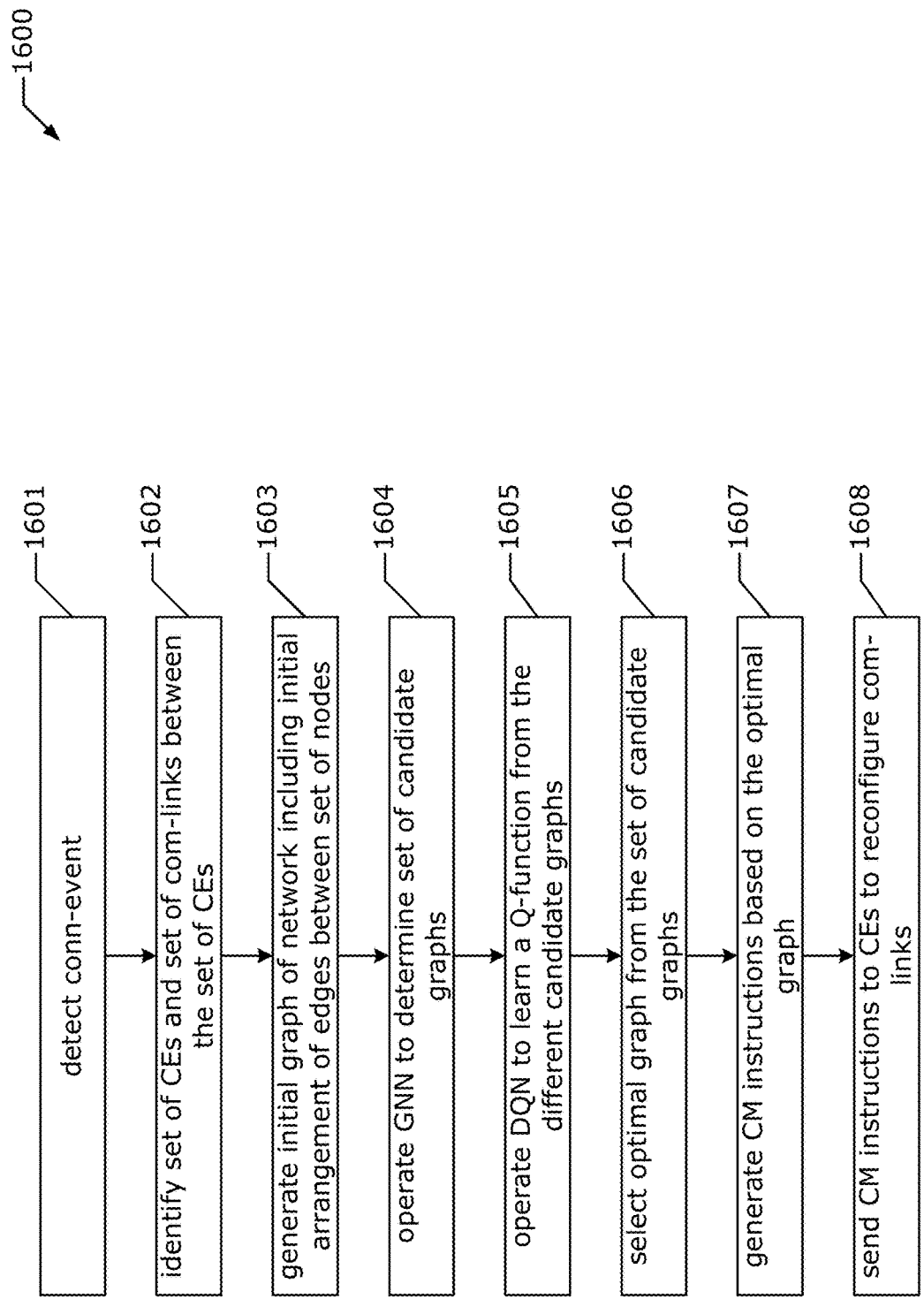

FIG. 16 shows an example CMF process 1600 according to various embodiments. Process 1600 may be performed by the CMF 136. Process 1600 begins at operation 1601 where the CMF 136 detects a conn-event 406, 506, and in response to detecting the conn-event 406, 506, at operation 1602 the CMF 136 identifies each communication equipment (CE) of a set of CEs and each communication link (com-link) of a set of com-links between each CE and at least one other CE of the set of CEs. The CEs may be individual UEs 221 and/or individual NANs 231, and the com-links may be links 105 and/or 103.

At operation 1603, the CMF 136 generates an initial graph 200. The initial graph 200 includes an initial arrangement of edges among a set of nodes. The set of nodes represent respective CEs of the set of CEs (e.g., UEs 221 and/or NANs 231), and the edges in the initial arrangement of edges represent respective com-links (e.g., links 105 and/or 103) of the set of com-links.

At operation 1604, the CMF 136 operates a GNN to determine a set of candidate graphs based on a set of node features. Each candidate graph in the set of candidate graphs includes a corresponding candidate arrangement of edges between the set of nodes that is different than the initial arrangement of edges. The candidate arrangements of edges represent difference combinations of com-links among the CEs in the set of CEs.

At operation 1605, the CMF 136 operates a DQN to learn a Q-function Q(•) from the different candidate graphs. Each candidate graph represents a NAN 231 and UE 221 deployment instance. Additionally, a reward corresponding to each candidate graph is obtained from the candidate graph (e.g., the network environment that the candidate graph represents). Furthermore, as the Q-function is learned, the parameters of the GNN is also learned through sequential addition of new CE-CE connections in each candidate graph.

At operation 1606, the CMF 136 selects, as an optimal graph, a candidate graph from among the set of candidate graphs having a highest Q value in comparison to Q values of other candidate graphs in the set of candidate graphs. The optimal graph includes an optimal arrangement of edges between the nodes. At operation 1607, the CMF 136 generates connection management (CM) instructions based on the optimal graph. The CM instructions are used to reconfigure the set of com-links between one or more CEs of the set of CEs based on the optimal arrangement of edges in the optimal graph. At operation 1608, the CMF 136 sends the CM instructions to the one or more CEs in the set of CEs to establish (or re-establish) com-links with other CEs in the set of CEs according to the optimal arrangement of edges. After operation 1608, process 1600 may end or repeat as necessary.

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example A01 includes a method of load balancing for O-RAN architecture with CU, DU, RU and UEs.

Example A02 includes the method of example A01 and/or some other example(s) herein, wherein link capacities can be obtained with received signal power, received signal power quality, channel side information feedback, etc.

Example A03 includes the method of example A02 and/or some other example(s) herein, wherein the link capacities include a UE measurement report (event-driven or periodic) including IMSI, UEID, at least one of the following channel quality metrics: RSRP, RSRQ, SINR (related to CQI), wideband CQI, along with their corresponding cell ID (O-DU ID); Serving cell IDUE change of status: RRC connection status including NR-RRC Connected (DRB active user), NR-RRC Inactive, and NR-RRC idle; and side information including IMSI, UEID, time Average UE rate or SE (per UE), time Average UE resource utilization (Per UE), and/or average (over all UEs and over time) DU resource utilization, (per DU).

Example A04 includes the method of examples A02-A03 and/or some other example(s) herein, wherein user devices can report multiple measurement for neighboring cells.

Example A05 includes the method of example A01 and/or some other example(s) herein, wherein the link capacities can be obtained from historical rates.

Example A06 includes the method of example A01 and/or some other example(s) herein, wherein handover is considered to balance user rate across network.

Example A07 includes the method of example A01 and/or some other example(s) herein, wherein equal resource sharing is considered for handover decision.

Example A08 includes the method of example A01 and/or some other example(s) herein, wherein a graph neural network (GNN) is used to solve optimization problem for connection management.

Example A09 includes the method of example A08 and/or some other example(s) herein, wherein the GNN has edge conditioning with direction of links, e.g. incoming, outgoing, self-edges.

Example A10 includes the method of example A08 and/or some other example(s) herein, wherein the GNN can have multiple layers.

Example A11 includes the method of example A08 and/or some other example(s) herein, wherein the GNN has input feature as node capacities v and link capacities.

Example A12 includes the method of example A08 and/or some other example(s) herein, wherein the GNN is used for deep Q network.

Example A13 includes the method of examples A02-A03 and/or some other example(s) herein, wherein reinforcement learning (ε-greedy Q learning) is used to learn weights of neural network.

Example A14 includes the method of example A13 and/or some other example(s) herein, wherein the reinforcement learning learns weights over multiple network drops (deployments).

Example A15 includes the method of example A13 and/or some other example(s) herein, wherein training is done in RIC for O-RAN Example A16 includes the method of example A15 and/or some other example(s) herein, wherein O-RAN-RIC collects measurements, initial topology, nodes types, nodes that needs to be connected to network.

Example A17 includes the method of example A01 and/or some other example(s) herein, wherein inference is done at O-RAN RIC for Handover decision.

Example A18 includes the method of example A11 and/or some other example(s) herein, wherein frequent handover (ping-pong effect) is limited by not serving handover event of user who request HO less than certain amount of time.

Example A19 includes the method of example A17 and/or some other example(s) herein, wherein inference can consider bandwidth utilization at DU and UE.

Example A20 includes the method of example A17 and/or some other example(s) herein, wherein inference can serve users based on RRC connection status.

Example A21 includes the method of example A01 and/or some other example(s) herein, wherein if there is a handover decision within certain amount of time after the last handover decision, the handover decision is ignored.

Example A22 includes the method of example A01 and/or some other example(s) herein, wherein handover events are served first in first out fashion in a queue.

Example A23 includes the method of example A01 and/or some other example(s) herein, wherein handover events can be served in parallel if there is multi-core CPU at O-RAN-RIC Example A24 includes the method of example A08 and/or some other example(s) herein, wherein DU-DU adjacency graph can be formed either based on the location or a score function of user measurements.

Example A25 includes the method of example A01 and/or some other example(s) herein, wherein the Handover events can be any type defined in 3GPP.

Example A26 includes the method of example A14 and/or some other example(s) herein, wherein the reward functions defined as given in above sections.

Example B01 includes a method of operating a graph neural network (GNN), comprising: determining, by the GNN, inferences for connection management in a communication network.

Example B02 includes the method of example B01 and/or some other example(s) herein, further comprising: obtaining link capacity information from one or more user devices; and determining the inferences based on the link capacity information.

Example B03 includes the method of example B02 and/or some other example(s) herein, wherein the link capacity information include one or more of received signal power, received signal power quality, channel side information feedback, and/or one or more other measurements.

Example B04 includes the method of example B03 and/or some other example(s) herein, wherein the capacity information includes UE measurement reports.

Example B05 includes the method of example B04 and/or some other example(s) herein, wherein the UE measurement reports include IMSI, UEID, one or more channel quality metrics, and corresponding cell ID (0-DU ID).

Example B06 includes the method of example B05 and/or some other example(s) herein, wherein the channel quality metrics include one or more of RSRP, RSRQ, SINR (related to CQI), and wideband CQI.

Example B07 includes the method of examples B03-B06 and/or some other example(s) herein, wherein the capacity information further includes serving cell IDUE change of status.

Example B08 includes the method of example B07 and/or some other example(s) herein, wherein the serving cell IDUE change of status indicate RRC connection state including one or more of NR-RRC Connected (DRB active user), NR-RRC Inactive, and NR-RRC idle; and Example B09 includes the method of examples B03-B08 and/or some other example(s) herein, wherein the capacity information further includes side information.

Example B10 includes the method of example B09 and/or some other example(s) herein, wherein the side information includes IMSI, UEID, time Average UE rate or SE (per UE), time Average UE resource utilization (Per UE), and/or average (over all UEs and over time) DU resource utilization, (per DU).

Example B11 includes the method of examples B02-B10 and/or some other example(s) herein, wherein user devices can report multiple measurement for neighboring cells.

Example B12 includes the method of examples B02-B11 and/or some other example(s) herein, further comprising: determining the link capacity information from historical data indicating link capacity information.

Example B13 includes the method of examples B01-B13 and/or some other example(s) herein, wherein the inferences for connection management include handover decisions among multiple radio access network (RAN) nodes and multiple UEs to balance load across the communication network including the multiple RAN nodes.

Example B14 includes the method of example B13 and/or some other example(s) herein, wherein the inferences for connection management includes determining equal resource sharing for the handover decisions.

Example B15 includes the method of example B14 and/or some other example(s) herein, wherein determining the inferences comprises: determining, by the GNN, edge conditions with direction of links, wherein the direction of the links includes one of incoming, outgoing, and self-edges.

Example B16 includes the method of examples B14-B15 and/or some other example(s) herein, wherein the GNN comprises one or multiple layers.

Example B17 includes the method of examples B14-B16 and/or some other example(s) herein, further comprising: obtaining node capacities v and link capacities as input features.

Example B18 includes the method of examples B01-B17 and/or some other example(s) herein, wherein the GNN is used for deep Q-learning network (DQN).

Example B19a includes the method of examples B01-B18 and/or some other example(s) herein, wherein the DQN includes a reinforcement learning (RL) mechanism to learn weights for the GNN.

Example B19b includes the method of examples B19a and/or some other example(s) herein, wherein the reinforcement learning mechanism is a $\epsilon$-greedy Q learning mechanism.

Example B20 includes the method of examples B19a-B19b and/or some other example(s) herein, further comprising: learning, by the GNN, weights over multiple network drops (deployments) using the RL mechanism.

Example B21 includes the method of examples B01-B20 and/or some other example(s) herein, wherein the inferences are for load balancing and the communication network comprises an O-RAN architecture comprising one or more CUs, one or more DUs, one or more RUs, and a plurality of UEs.

Example B22 includes the method of example B21 and/or some other example(s) herein, wherein training is done in RIC for O-RAN.

Example B23 includes the method of example B22 and/or some other example(s) herein, wherein the O-RAN-RIC collects measurements, initial topology, nodes types, nodes to be connected to the communication network.

Example B24 includes the method of examples B21-B23 and/or some other example(s) herein, wherein the GNN is operated by the O-RAN RIC for determining handover decisions.

Example B25 includes the method of example B24 and/or some other example(s) herein, wherein frequent handover (ping-pong effect) is limited by not serving handover event of user who request handovers less than certain amount of time.

Example B26 includes the method of examples B21-B25 and/or some other example(s) herein, further comprising: bandwidth utilization at the one or more DUs, one or more RUs, and the plurality of UEs; and determining the inferences further based on the bandwidth utilization.

Example B27 includes the method of examples B21-B26 and/or some other example(s) herein, further comprising: determining the inferences further based on RRC connection status.

Example B28 includes the method of examples B13-B27 and/or some other example(s) herein, further comprising: ignoring a handover request if the handover request is obtained within a predefined period of time from a previously received handover request.

Example B29 includes the method of examples B13-B28 and/or some other example(s) herein, further comprising: storing handover events in a queue; and serving the stored handover events in a first in first out fashion.

Example B30 includes the method of examples B13-B29 and/or some other example(s) herein, further comprising: serving handover events in parallel.

Example B31 includes the method of examples B21-B30 and/or some other example(s) herein, further comprising: generating a DU-DU adjacency graph based on locations of the one or more DUs.

Example B32 includes the method of example B31 and/or some other example(s) herein, further comprising: generating the DU-DU adjacency graph further based on a score function of user measurements.

Example B33 includes the method of examples B21-B30 and/or some other example(s) herein, further comprising: generating a DU-DU adjacency graph based on a score function of user measurements.

Example B34 includes the method of examples B13-B33 and/or some other example(s) herein, wherein the handover events can be any type of handover event defined in 3GPP standards/specification and/or IEEE/WiFi standards.

Example B35 includes the method of examples B19-B34 and/or some other example(s) herein, wherein a reward function is used for the reinforcement learning.

Example C01 includes a method of operating a connection management (CM) function, the method comprising: in response to detecting a connection event, identifying each communication equipment (CE) of a set of CEs and each communication link (com-link) of a set of com-links between each CE and at least one other CE of the set of CEs; generating an initial graph including an initial arrangement of edges among a set of nodes, the set of nodes representing respective CEs of the set of CEs and the edges in the initial arrangement of edges representing respective corn-links of the set of corn-links; determining, using a graph neural network (GNN), a set of candidate graphs based on a set of node features, wherein each candidate graph in the set of candidate graphs includes a corresponding candidate arrangement of edges between the set of nodes different than the initial arrangement; selecting, as an optimal graph, a candidate graph from among the set of candidate graphs having a highest quality (Q) value in comparison to Q values of other candidate graphs in the set of candidate graphs, wherein the optimal graph includes an optimal arrangement of edges between the nodes; and generating CM instructions to reconfigure the set of com-links between one or more CEs of the set of CEs based on the optimal arrangement of edges.

Example C02 includes the method of example C01 and/or some other example(s) herein, further comprising: sending the CM instructions to the one or more CEs in the set of CEs to establish corn-links with other CEs in the set of CEs according to the optimal arrangement.

Example C03 includes the method of examples C01-C02 and/or some other example(s) herein, further comprising: determining, using a Q function, a Q value for each candidate graph in the set of candidate graphs, wherein the Q value of each candidate graph is an expected reward value of rearranging the set of com-links according to the corresponding candidate arrangement from the initial arrangement according to a policy.

Example C04 includes the method of example C03 and/or some other example(s) herein, wherein the GNN comprises a plurality of GNN layers, wherein the plurality of GNN layers at least includes an input layer, an output layer, and at least one hidden layer disposed between the input layer and the output layer.

Example C05 includes the method of example C04 and/or some other example(s) herein, wherein an output of the output layer of the GNN is an input to the Q function.

Example C06 includes the method of examples C03-C05 and/or some other example(s) herein, wherein determining the set of candidate graphs comprises: identifying, based on the initial graph, a current state of a communication network including the set of CEs; and for each candidate graph in the set of candidate graphs: determining respective Q values for each edge connecting one node to one other node in the set of nodes in the corresponding candidate arrangement, and combining the respective Q values to obtain the Q value of the candidate graph.

Example C07 includes the method of example C06 and/or some other example(s) herein, wherein one or more weights are additional inputs to the Q function, and the method further comprises: performing, during a training phase of the GNN, stochastic gradient descent (SGD) to minimize a squared loss function to learn the one or more weights.

Example C08 includes the method of example C07 and/or some other example(s) herein, wherein the performing the SGD comprises: minimizing a squared loss of the respective Q values for each edge.

Example C09 includes the method of examples C01-C08 and/or some other example(s) herein, further comprising: operating the GNN to optimize for one or more of throughput of a communication network including the set of CEs, coverage of the communication network, and load balance among the set of CEs.

Example C10 includes the method of examples C01-C09 and/or some other example(s) herein, wherein the set of node features include data rates of the set of CEs and channel capacities of the set of CEs or the set of com-links.

Example C11 includes the method of example C10 and/or some other example(s) herein, further comprising: determining the channel capacities for each CE in the set of CEs based on one or more of received signal reference power (RSRP) measurements, reference signal received quality (RSRQ) measurements, Received Signal Code Power (RSCP) measurements, signal-to-noise ratio (SNR) measurements, signal-to-noise and interference ratio (SINR) measurements, channel quality indicator (CQI) measurements, and energy per chip to noise power density ratio (EcN0) measurements.

Example C12 includes the method of examples C10-C11 and/or some other example(s) herein, further comprising: determining the data rates for each CE in the set of CEs based on one or more of RSRP measurements, RSRQ measurements, RSCP measurements, SNR measurements, SINR measurements, CQI measurements, and EcN0 measurements.

Example C13 includes the method of examples C10-C12 and/or some other example(s) herein, further comprising: calculating one or more latent features for each layer in the GNN such that features of individual nodes of the set of nodes are propagated to one or more neighboring nodes of the set of nodes.

Example C14 includes the method of examples C10-C13 and/or some other example(s) herein, further comprising: obtaining network metrics from individual CEs of the set of CEs; and determining the channel capacities and the data rates based on the obtained network metrics.

Example C15 includes the method of example C14 and/or some other example(s) herein, wherein the network metrics include one or more measurement reports, wherein each measurement report of the one or more measurement reports includes at least one measurement, a CE identifier of a CE that performed the at least one measurement, and an identifier of a coverage area of a network element in which the CE that performed the at least one measurement.

Example C16 includes the method of example C15 and/or some other example(s) herein, wherein the at least one measurement is an RSRP measurement, an RSRQ measurement, an RSRQ measurement, an RSCP measurement, an SNR measurement, an SINR measurement, a CQI measurement, or an EcN0 measurement.

Example C17 includes the method of examples C15-C16 and/or some other example(s) herein, wherein the network metrics further include one or more of respective CE rates of the individual CEs, respective CE spectral efficiency metrics of the individual CEs, respective CE resource utilization of the individual CEs, a total resource utilization for all CEs in the set of CEs, respective bandwidth utilization at the individual CEs, and a total bandwidth utilization for all CEs in the set of CEs.

Example C18 includes the method of examples C14-C17 and/or some other example(s) herein, wherein the network metrics include CE status information of the individual CEs, wherein the CE status information is one of an active mode, an inactive mode, or an idle mode.

Example C19 includes the method of examples C14-C18 and/or some other example(s) herein, further comprising: determining the channel capacities and the data rates further based on historical network metrics.

Example C20 includes the method of examples C01-C19 and/or some other example(s) herein, further comprising: storing received connection events in a connection event queue; and processing the queued connection events in a first in first out manner.

Example C21 includes the method of example C20 and/or some other example(s) herein, wherein the processing the queued connection events comprises: processing a number of the queued connection events in parallel.

Example C22 includes the method of examples C20-C21 and/or some other example(s) herein, wherein the detecting the connection event comprises: obtaining the detected connection event from the connection event queue.

Example C23 includes the method of examples C01-C22 and/or some other example(s) herein, wherein the detected connection event is one of receipt of a measurement report, receipt of an intra-radio access technology (RAT) handover (HO) request, receipt of an inter-RAT HO request, receipt of a cell selection message, receipt of a cell reselection message, receipt of a radio link failure (RLF) detection message, receipt of an RLF recovery message(s), receipt of a beam failure detection message, or a beam recovery message.

Example C24 includes the method of examples C01-C23 and/or some other example(s) herein, wherein the set of CEs include a set of network access nodes (NANs) and a set of user equipment (UEs), wherein individual NANs of the set of NANs provide network connectivity to one or more UEs of the set of UEs.

Example C25 includes the method of examples C24 and/or some other example(s) herein, wherein each com-link in the set of com-links is between one UE of the set of UEs and one NAN of the set of NANs.

Example C26 includes the method of examples C24-C25 and/or some other example(s) herein, wherein the generating the initial graph comprises: generating, as the initial graph, a NAN-NAN adjacency graph based on locations of the individual NANs in the set of NANs.

Example C27 includes the method of example C26 and/or some other example(s) herein, wherein the generating the NAN-NAN adjacency graph comprises: generating the NAN-NAN adjacency graph to include a first NAN in the set of NANs serving a UE that is a subject of the detected connection event and a subset of second NANs in the set of NANs within a predetermined distance from the first NAN.

Example C28 includes the method of example C27 and/or some other example(s) herein, wherein the generating the NAN-NAN adjacency graph further comprises: generating the NAN-NAN adjacency graph further based on a score calculated using network metrics collected from individual UEs of the set of UEs.

Example C29 includes the method of examples C27-C28 and/or some other example(s) herein, further comprising: ignoring a connection event if the connection event is obtained within a predefined period of time from a previously received connection event.

Example C30 includes the method of examples C20-C29 and/or some other example(s) herein, wherein the CM function is an xApp operated by a Radio Access Network (RAN) Intelligent Controller (RIC) in an Open RAN (O-RAN) framework, and the individual NANs are O-RAN distributed units (DUs) or O-RAN remote units (RUs).

Example Z01 includes one or more computer readable media comprising instructions, wherein execution of the instructions by processor circuitry is to cause the processor circuitry to perform the method of any one of examples A01-A26, B01-B35, C01-C30, and/or any other aspect discussed herein.

Example Z02 includes a computer program comprising the instructions of example Z01 and/or some other example(s) herein.

Example Z03 includes an Application Programming Interface defining functions, methods, variables, data structures, and/or protocols for the computer program of example Z02 and/or some other example(s) herein.

Example Z04 includes an apparatus comprising circuitry loaded with the instructions of example Z01 and/or some other example(s) herein.

Example Z05 includes an apparatus comprising circuitry operable to run the instructions of example Z01 and/or some other example(s) herein.

Example Z06 includes an integrated circuit comprising one or more of the processor circuitry of example Z01 and the one or more computer readable media of example Z01.

Example Z07 includes a computing system comprising the one or more computer readable media and the processor circuitry of example Z01 and/or some other example(s) herein.

Example Z08 includes an apparatus comprising means for executing the instructions of example Z01 and/or some other example(s) herein.

Example Z09 includes a signal generated as a result of executing the instructions of example Z01 and/or some other example(s) herein.

Example Z10 includes a data unit generated as a result of executing the instructions of example Z01 and/or some other example(s) herein.

Example Z11 includes the data unit of example Z10 and/or some other example(s) herein, the data unit is a datagram, network packet, data frame, data segment, a Protocol Data Unit (PDU), a Service Data Unit (SDU), a message, or a database object.

Example Z12 includes a signal encoded with the data unit of example Z10 or Z11 and/or some other example(s) herein.

Example Z13 includes an electromagnetic signal carrying the instructions of example Z01 and/or some other example(s) herein.

Example Z14 includes an apparatus comprising means for performing the method of any one of examples A01-A26, B01-B35, C01-C30, and/or any other aspect discussed herein.

6. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

The term "receipt" at least in some embodiments refers to any action (or set of actions) involved with receiving or obtaining an object, data, data unit, etc., and/or the fact of the object, data, data unit, etc. being received. The term "receipt" at least in some embodiments refers to an object, data, data unit, etc., being pushed to a device, system, element, etc. (e.g., often referred to as a push model), pulled by a device, system, element, etc. (e.g., often referred to as a pull model), and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The terms "ego" (as in, e.g., "ego device") and "subject" (as in, e.g., "data subject") at least in some embodiments refers to an entity, element, device, system, etc., that is under consideration or being considered. The terms "neighbor" and "proximate" (as in, e.g., "proximate device") at least in some embodiments refers to an entity, element, device, system, etc., other than an ego device or subject device.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "terminal" at least in some embodiments refers to point at which a conductor from a component, device, or network comes to an end. Additionally or alternatively, the term "terminal" at least in some embodiments refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "base station" at least in some embodiments refers to a network element in a radio access network (RAN) responsible for the transmission and reception of radio signals in one or more cells to or from a UE. A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved Node B (eNB) or a next generation Node B (gNB). In some examples, the base station may operate or include compute hardware to operate as a compute node. However, in many of the scenarios discussed herein, a RAN node may be substituted with an access point (e.g., wireless network access point) or other network access hardware.

The term "cell" at least in some embodiments refers to a radio network object that can be uniquely identified by a UE from an identifier (e.g., cell ID) that is broadcasted over a geographical area from a network access node (NAN). Additionally or alternatively, the term "cell" at least in some embodiments refers to a geographic area covered by a NAN.

The term "serving cell" at least in some embodiments refers to a primary cell (PCell) for a UE in a connected mode or state (e.g., RRC_CONNECTED) and not configured with carrier aggregation (CA) and/or dual connectivity (DC). Additionally or alternatively, the term "serving cell" at least in some embodiments refers to a set of cells comprising zero or more special cells and one or more secondary cells for a UE in a connected mode or state (e.g., RRC_CONNECTED) and configured with CA.

The term "primary cell" or "PCell" at least in some embodiments refers to a Master Cell Group (MCG) cell, operating on a primary frequency, in which a UE either performs an initial connection establishment procedure or initiates a connection re-establishment procedure. The term "Secondary Cell" or "SCell" at least in some embodiments refers to a cell providing additional radio resources on top of a special cell (SpCell) for a UE configured with CA. The term "special cell" or "SpCell" at least in some embodiments refers to a PCell for non-DC operation or refers to a PCell of an MCG or a PSCell of an SCG for DC operation.

The term "Master Cell Group" or "MCG" at least in some embodiments refers to a group of serving cells associated with a "Master Node" comprising a SpCell (PCell) and optionally one or more SCells. The term "Secondary Cell Group" or "SCG" at least in some embodiments refers to a subset of serving cells comprising a Primary SCell (PSCell) and zero or more SCells for a UE configured with DC. The term "Primary SCG Cell" refers to the SCG cell in which a UE performs random access when performing a reconfiguration with sync procedure for DC operation.

The term "Master Node" or "MN" at least in some embodiments refers to a NAN that provides control plane connection to a core network. The term "Secondary Node" or "SN" at least in some embodiments refers to a NAN providing resources to the UE in addition to the resources provided by an MN and/or a NAN with no control plane connection to a core network.

The term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations to a UE, and acting as a Secondary Node in E-UTRA-NR Dual Connectivity (EN-DC) scenarios (see e.g., 3GPP TS 37.340 v 16.6.0 (2021 Jul. 9)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "IAB-node" at least in some embodiments refers to a RAN node that supports new radio (NR) access links to user equipment (UEs) and NR backhaul links to parent nodes and child nodes. The term "IAB-donor" at least in some embodiments refers to a RAN node (e.g., a gNB) that provides network access to UEs via a network of backhaul and access links.

The term "Central Unit" or "CU" at least in some embodiments refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some embodiments refers to a logical node hosting radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" at least in some embodiments refers to compute, storage, and/or network resources provided by physical hardware element(s). A "virtualized resource" at least in some embodiments refers to compute, storage, and/or network resources provided by virtualization infrastructure to an application, device, system, etc. The term "network resource" or "communication resource" at least in some embodiments refers to resources that are accessible by computer devices/systems via a communications network. The term "system resources" at least in some embodiments refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "access edge layer" indicates the sub-layer of infrastructure edge closest to the end user or device. For example, such layer may be fulfilled by an edge data center deployed at a cellular network site. The access edge layer functions as the front line of the infrastructure Edge and may connect to an aggregation Edge layer higher in the hierarchy.

The term "aggregation edge layer" indicates the layer of infrastructure edge one hop away from the access edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

The term "virtualized NF" (or VNF) indicates a software-based NF operating on multi-function, multi-purpose compute resources (e.g., x86, ARM processing architecture) which are used by NFV in place of dedicated physical equipment. Additionally or alternatively, several VNFs will operate on an Edge data center at the infrastructure Edge.

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. The term "Edge IoT devices" at least in some embodiments refers to any kind of IoT devices deployed at a network's edge.

The term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network.

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "RAT type" at least in some embodiments may identify a transmission technology and/or communication protocol used in an access network, for example, new radio (NR), Long Term Evolution (LTE), narrowband IoT (NB-IOT), untrusted non-3GPP, trusted non-3GPP, trusted IEEE 802.11, non-3GPP access, MuLTEfire, WiMAX, wireline, wireline-cable, wireline broadband forum (wireline-BBF), etc. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), etc.); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), etc.), Generic Access Network (GAN)/Unlicensed Mobile Access (UMA), High Speed Packet Access (HSPA) (and variants thereof such as HSPA Plus (HSPA+), etc.), Long Term Evolution (LTE) (and variants thereof such as LTE-Advanced (LTE-A), Evolved UTRA (E-UTRA), LTE Extra, LTE-A Pro, LTE LAA, MuLTEfire, etc.), Fifth Generation (5G) or New Radio (NR), etc.; ETSI technologies such as High Performance Radio Metropolitan Area Network (HiperMAN) and the like; IEEE technologies such as WiFi (IEEE 802.11 and variants thereof), Worldwide Interoperability for Microwave Access (WiMAX) (IEEE 802.16 and variants thereof), Mobile Broadband Wireless Access (MBWA)/iBurst (IEEE 802.20 and variants thereof), etc.; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (IEEE 802.11ad, IEEE 802.11ay, etc.), etc.); short-range and/or wireless personal area network (WPAN) technologies/standards such as Bluetooth (and variants thereof such as Bluetooth 5.3, Bluetooth Low Energy (BLE), etc.), IEEE 802.15 technologies/standards (e.g., IEEE 802.15.4 (low rate WPAN), ZigBee, Thread, IPv 6 over Low power WPAN (6LoWPAN), WirelessHART, MiWi, ISA100.11a, IEEE 802.15.6 (Body Area Networks (BANs), etc.), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as IEEE 802.15.7 and the like; V2X communication including 3GPP cellular V2X (C-V2X), Wireless Access in Vehicular Environments (WAVE) (IEEE 802.11p), IEEE 802.11bd, Dedicated Short Range Communications (DSRC), Intelligent-Transport-Systems (ITS) (including the European ITS-G5, ITS-GSB, ITS-GSC, etc.); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), etc.); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, etc.); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "subframe" at least in some embodiments at least in some embodiments refers to a time interval during which a signal is signaled. In some implementations, a subframe is equal to 1 millisecond (ms). The term "time slot" at least in some embodiments at least in some embodiments refers to an integer multiple of consecutive subframes. The term "superframe" at least in some embodiments at least in some embodiments refers to a time interval comprising two time slots.

The term "interoperability" at least in some embodiments refers to the ability of STAs utilizing one communication system or RAT to communicate with other STAs utilizing another communication system or RAT. The term "Coexistence" at least in some embodiments refers to sharing or allocating radiofrequency resources among STAs using either communication system or RAT.

The term "reliability" at least in some embodiments refers to the ability of a computer-related component (e.g., software, hardware, or network element/entity) to consistently perform a desired function and/or operate according to a specification. Additionally or alternatively, the term "reliability" at least in some embodiments refers to the probability that a product, system, or service will perform its intended function adequately for a specified period of time, or will operate in a defined environment with a low probability of failure. Additionally or alternatively, the term "reliability" in the context of network communications (e.g., "network reliability") at least in some embodiments refers to the ability of a network to carry out communication. The term "network reliability" at least in some embodiments refers to a probability or measure of delivering a specified amount of data from a source to a destination (or sink).

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link. Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some embodiments refer to a set of data and/or data units (e.g., datagrams, packets, or the like) passing an observation point in a network during a certain time interval. Additionally or alternatively, the term "flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms at least in some embodiments refers to different concepts.

The term "stream" at least in some embodiments refers to a sequence of data elements made available over time. At least in some embodiments, functions that operate on a stream, which may produce another stream, are referred to as "filters," and can be connected in pipelines, analogously to function composition. Filters may operate on one item of a stream at a time, or may base an item of output on multiple items of input, such as a moving average.

The term "distributed computing" at least in some embodiments refers to computation resources that are geographically distributed within the vicinity of one or more localized networks' terminations.

The term "distributed computations" at least in some embodiments refers to a model in which components located on networked computers communicate and coordinate their actions by passing messages interacting with each other in order to achieve a common goal.

The term "service" at least in some embodiments refers to the provision of a discrete function within a system and/or environment. Additionally or alternatively, the term "service" at least in some embodiments refers to a functionality or a set of functionalities that can be reused.

The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. Additionally or alternatively, the term "microservice architecture" at least in some embodiments refers to a variant of the service-oriented architecture (SOA) structural style wherein applications are arranged as a collection of loosely-coupled services (e.g., fine-grained services) and may use lightweight protocols.

The term "session" at least in some embodiments refers to a temporary and interactive information interchange between two or more communicating devices, two or more application instances, between a computer and user, and/or between any two or more entities or elements. Additionally or alternatively, the term "session" at least in some embodiments refers to a connectivity service or other service that provides or enables the exchange of data between two entities or elements. The term "network session" at least in some embodiments refers to a session between two or more communicating devices over a network. The term "web session" at least in some embodiments refers to session between two or more communicating devices over the Internet or some other network. The term "session identifier," "session ID," or "session token" at least in some embodiments refers to a piece of data that is used in network communications to identify a session and/or a series of message exchanges.

The term "quality" at least in some embodiments refers to a property, character, attribute, or feature of something as being affirmative or negative, and/or a degree of excellence of something. Additionally or alternatively, the term "quality" at least in some embodiments, in the context of data processing, refers to a state of qualitative and/or quantitative aspects of data, processes, and/or some other aspects of data processing systems.

The term "Quality of Service" or "QoS' at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS' at least in some embodiments refers to mechanisms that provide traffic-forwarding treatment based on flow-specific traffic classification. In some implementations, the term "Quality of Service" or "QoS" can be used interchangeably with the term "Class of Service" or "CoS".

The term "Class of Service" or "CoS' at least in some embodiments refers to mechanisms that provide traffic-forwarding treatment based on non-flow-specific traffic classification. In some implementations, the term "Class of Service" or "CoS" can be used interchangeably with the term "Quality of Service" or "QoS".

The term "QoS flow" at least in some embodiments refers to the finest granularity for QoS forwarding treatment in a network. The term "5G QoS flow' at least in some embodiments refers to the finest granularity for QoS forwarding treatment in a 5G System (5GS). Traffic mapped to the same QoS flow (or 5G QoS flow) receive the same forwarding treatment.

The term "reliability flow" at least in some embodiments refers to the finest granularity for reliability forwarding treatment in a network, where traffic mapped to the same reliability flow receive the same reliability treatment. Additionally or alternatively, the term "reliability flow" at least in some embodiments refers to the a reliability treatment assigned to packets of a data flow.

The term "reliability forwarding treatment" or "reliability treatment" refers to the manner in which packets belonging to a data flow are handled to provide a certain level of reliability to that data flow including, for example, a probability of success of packet delivery, QoS or Quality of Experience (QoE) over a period of time (or unit of time), admission control capabilities, a particular coding scheme, and/or coding rate for arrival data bursts.

The term "forwarding treatment" at least in some embodiments refers to the precedence, preferences, and/or prioritization a packet belonging to a particular data flow receives in relation to other traffic of other data flows. Additionally or alternatively, the term "forwarding treatment" at least in some embodiments refers to one or more parameters, characteristics, and/or configurations to be applied to packets belonging to a data flow when processing the packets for forwarding. Examples of such characteristics may include resource type (e.g., non-guaranteed bit rate (GBR), GBR, delay-critical GBR, etc.); priority level; class or classification; packet delay budget; packet error rate; averaging window; maximum data burst volume; minimum data burst volume; scheduling policy/weights; queue management policy; rate shaping policy; link layer protocol and/or RLC configuration; admission thresholds; etc. In some implementations, the term "forwarding treatment" may be referred to as "Per-Hop Behavior" or "PHB".

The term "admission control" at least in some embodiments refers to a function or process that decides if new packets, messages, work, tasks, etc., entering a system should be admitted to enter the system or not. Additionally or alternatively, the term "admission control" at least in some embodiments refers to a validation process where a check is performed before a connection is established to see if current resources are sufficient for the proposed connection.

The term "QoS Identifier" at least in some embodiments refers to a scalar that is used as a reference to a specific QoS forwarding behavior (e.g., packet loss rate, packet delay budget, etc.) to be provided to a QoS flow. This may be implemented in an access network by referencing node specific parameters that control the QoS forwarding treatment (e.g., scheduling weights, admission thresholds, queue management thresholds, link layer protocol configuration, etc.).

The term "time to live" (or "TTL") or "hop limit" at least in some embodiments refers to a mechanism which limits the lifespan or lifetime of data in a computer or network. TTL may be implemented as a counter or timestamp attached to or embedded in the data. Once the prescribed event count or timespan has elapsed, data is discarded or revalidated.

The term "queue" at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue. The term "dequeue" at least in some embodiments refers to one or more operations of removing an element from the front of a queue.

The term "channel coding" at least in some embodiments refers to processes and/or techniques to add redundancy to messages or packets in order to make those messages or packets more robust against noise, channel interference, limited channel bandwidth, and/or other errors. For purposes of the present disclosure, the term "channel coding" can be used interchangeably with the terms "forward error correction" or "FEC"; "error correction coding", "error correction code", or "ECC"; and/or "network coding" or "NC".

The term "network coding" at least in some embodiments refers to processes and/or techniques in which transmitted data is encoded and decoded to improve network performance.

The term "code rate" at least in some embodiments refers to the proportion of a data stream or flow that is useful or non-redundant (e.g., for a code rate of k/n, for every k bits of useful information, the (en)coder generates a total of n bits of data, of which n−k are redundant).

The term "systematic code" at least in some embodiments refers to any error correction code in which the input data is embedded in the encoded output. The term "non-systematic code" at least in some embodiments refers to any error correction code in which the input data is not embedded in the encoded output.

The term "interleaving" at least in some embodiments refers to a process to rearrange code symbols so as to spread bursts of errors over multiple codewords that can be corrected by ECCs.

The term "code word" or "codeword" at least in some embodiments refers to an element of a code or protocol, which is assembled in accordance with specific rules of the code or protocol.

The term "PDU Connectivity Service" at least in some embodiments refers to a service that provides exchange of protocol data units (PDUs) between a UE and a data network (DN). The term "PDU Session" at least in some embodiments refers to an association between a UE and a DN that provides a PDU connectivity service. A PDU Session type can be IPv 4, IPv 6, IPv 4v 6, Ethernet, Unstructured, or any other network/connection type, such as those discussed herein. The term "MA PDU Session" at least in some embodiments refers to a PDU Session that provides a PDU connectivity service, which can use one access network at a time or multiple access networks simultaneously.

The term "traffic shaping" at least in some embodiments refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some embodiments refers to the regulation of flows into or out of a network, or into or out of a specific device or element.

The term "access traffic steering" or "traffic steering" at least in some embodiments refers to a procedure that selects an access network for a new data flow and transfers the traffic of one or more data flows over the selected access network. Access traffic steering is applicable between one 3GPP access and one non-3GPP access.

The term "access traffic switching" or "traffic switching" at least in some embodiments refers to a procedure that moves some or all traffic of an ongoing data flow from at least one access network to at least one other access network in a way that maintains the continuity of the data flow.

The term "access traffic splitting" or "traffic splitting" at least in some embodiments refers to a procedure that splits the traffic of at least one data flow across multiple access networks. When traffic splitting is applied to a data flow, some traffic of the data flow is transferred via at least one access channel, link, or path, and some other traffic of the same data flow is transferred via another access channel, link, or path.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI) (including any RNTI discussed in clause 8.1 of [TS38300]), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv 4), IP version 6 (IPv 6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof.

The term "application identifier", "application ID", or "app ID" at least in some embodiments refers to an identifier that can be mapped to a specific application or application instance; in the context of 3GPP 5G/NR systems, an "application identifier" at least in some embodiments refers to an identifier that can be mapped to a specific application traffic detection rule.

The term "endpoint address" at least in some embodiments refers to an address used to determine the host/authority part of a target URI, where the target URI is used to access an NF service (e.g., to invoke service operations) of an NF service producer or for notifications to an NF service consumer.

The term "closed access group" or "CAG" at least in some embodiments refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term "CAG-ID" at least in some embodiments refers to an identifier of a CAG.

The term "port" in the context of computer networks, at least in some embodiments refers to a communication endpoint, a virtual data connection between two or more entities, and/or a virtual point where network connections start and end. Additionally or alternatively, a "port" at least in some embodiments is associated with a specific process or service.

The term "subnetwork" or "subnet" at least in some embodiments refers to a logical subdivision of a network, such as an IP network. The practice of dividing a network into two or more networks is called "subnetting."

The term "netmask" or "subnet mask" at least in some embodiments refers to a bitmask applied by bitwise AND operations to a network address (e.g., an IP address in an IP network) to yield a routing prefix, and/or is a 32-bit "mask" used to divide an IP address into subnets and specify the network's available hosts.

The term "localized network" at least in some embodiments refers to a local network that covers a limited number of connected vehicles in a certain area or region.

The term "local data integration platform" at least in some embodiments refers to a platform, device, system, network, or element(s) that integrate local data by utilizing a combination of localized network(s) and distributed computation.

The term "data rate" at least in some embodiments refers to a transmission speed of a network. Additionally or alternatively, the term "data rate" at least in some embodiments refers to the amount of data transmitted during a specified time period and/or the speed at which data is transferred from one entity or element to another entity or element. Additionally or alternatively, the term "data rate" at least in some embodiments can be used interchangeably with the "bit rate", "data signaling rate", "symbol rate", "throughput", and/or "data transfer rate".

The term "bit rate" at least in some embodiments refers to the number of bits that are conveyed or processed per unit of time.

The term "physical rate" or "PHY rate" at least in some embodiments refers to a speed at which one or more bits are actually sent over a transmission medium. Additionally or alternatively, the term "physical rate" or "PHY rate" at least in some embodiments refers to a speed at which data can move across a wired or wireless link between a transmitter and a receiver.

The term "throughput" or "network throughput" at least in some embodiments refers to a rate of production or the rate at which something is processed. Additionally or alternatively, the term "throughput" or "network throughput" at least in some embodiments refers to a rate of successful data delivery over a communication channel.

The term "goodput" at least in some embodiments refers to a number of useful information bits delivered by the network to a certain destination per unit of time.

The term "channel capacity" at least in some embodiments refers to an upper bound on the rate at which data can be reliably transmitted over a communication channel and/or given noise on a channel.

The term "bandwidth" at least in some embodiments refers to the maximum rate of data transfer across a given path. Additionally or alternatively, the term "bandwidth" at least in some embodiments refers to data carrying capacity of a network or transmission medium.

The term "delay" at least in some embodiments refers to a time interval between two events. Additionally or alternatively, the term "delay" at least in some embodiments refers to a time interval between the propagation of a signal and its reception.

The term "packet delay" at least in some embodiments refers to the time it takes to transfer any packet from one point to another. Additionally or alternatively, the term "packet delay" or "per packet delay" at least in some embodiments refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized.

The term "processing delay" at least in some embodiments refers to an amount of time taken to process a packet in a network node.

The term "transmission delay" at least in some embodiments refers to an amount of time needed (or necessary) to push a packet (or all bits of a packet) into a transmission medium.

The term "propagation delay" at least in some embodiments refers to amount of time it takes a signal's header to travel from a sender to a receiver.

The term "network delay" at least in some embodiments refers to the delay of an a data unit within a network (e.g., an IP packet within an IP network).

The term "queuing delay" at least in some embodiments refers to an amount of time a job waits in a queue until that job can be executed. Additionally or alternatively, the term "queuing delay" at least in some embodiments refers to an amount of time a packet waits in a queue until it can be processed and/or transmitted.

The term "delay bound" at least in some embodiments refers to a predetermined or configured amount of acceptable delay. The term "per-packet delay bound" at least in some embodiments refers to a predetermined or configured amount of acceptable packet delay where packets that are not processed and/or transmitted within the delay bound are considered to be delivery failures and are discarded or dropped.

The term "packet drop rate" at least in some embodiments refers to a share of packets that were not sent to the target due to high traffic load or traffic management and should be seen as a part of the packet loss rate.

The term "packet loss rate" at least in some embodiments refers to a share of packets that could not be received by the target, including packets dropped, packets lost in transmission and packets received in wrong format.

The term "latency" at least in some embodiments refers to the amount of time it takes to transfer a first/initial data unit in a data burst from one point to another.

The term "performance indicator" at least in some embodiments refers to performance data aggregated over a group of network functions (NFs), which is derived from performance measurements collected at the NFs that belong to the group, according to the aggregation method identified in a Performance Indicator definition.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "algorithm" at least in some embodiments refers to an unambiguous specification of how to solve a problem or a class of problems by performing calculations, input/output operations, data processing, automated reasoning tasks, and/or the like.

The terms "instantiate," "instantiation," and the like at least in some embodiments refers to the creation of an instance. An "instance" also at least in some embodiments refers to a concrete occurrence of an object, which may occur, for example, during execution of program code.

The term "data processing" or "processing" at least in some embodiments refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "software agent" at least in some embodiments refers to a computer program that acts for a user or other program in a relationship of agency.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "analytics" at least in some embodiments refers to the discovery, interpretation, and communication of meaningful patterns in data.

The term "application programming interface" or "API" at least in some embodiments refers to a set of subroutine definitions, communication protocols, and tools for building software. Additionally or alternatively, the term "application programming interface" or "API" at least in some embodiments refers to a set of clearly defined methods of communication among various components. An API may be for a web-based system, operating system, database system, computer hardware, or software library.

The term "datagram" at least in some embodiments at least in some embodiments refers to a basic transfer unit associated with a packet-switched network; a datagram may be structured to have header and payload sections. The term "datagram" at least in some embodiments may be referred to as a "data unit", a "protocol data unit" or "PDU", a "service data unit" or "SDU", a frame, a packet, and/or the like.

The term "information element" at least in some embodiments refers to a structural element containing one or more fields.

The term "field" at least in some embodiments refers to individual contents of an information element, or a data element that contains content.

The term "data element" or "DE" at least in some embodiments refers to a data type that contains one single data.

The term "data frame" or "DF" at least in some embodiments refers to a data type that contains more than one data element in a predefined order.

The term "data element" at least in some embodiments refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some embodiments refers to a data type that contains one single data. Data elements may store data, which may be referred to as the data element's content (or "content items"). Content items may include text content, attributes, properties, and/or other elements referred to as "child elements." Additionally or alternatively, data elements may include zero or more properties and/or zero or more attributes, each of which may be defined as database objects (e.g., fields, records, etc.), object instances, and/or other data elements. An "attribute" at least in some embodiments refers to a markup construct including a name-value pair that exists within a start tag or empty element tag. Attributes contain data related to its element and/or control the element's behavior.

The term "reference" at least in some embodiments refers to data useable to locate other data and may be implemented a variety of ways (e.g., a pointer, an index, a handle, a key, an identifier, a hyperlink, etc.).

The term "translation" at least in some embodiments refers to the process of converting or otherwise changing data from a first form, shape, configuration, structure, arrangement, embodiment, description, etc. into a second form, shape, configuration, structure, arrangement, embodiment, description, etc.; at least in some embodiments there may be two different types of translation: transcoding and transformation.

The term "transcoding" at least in some embodiments refers to taking information/data in one format (e.g., a packed binary format) and translating the same information/data into another format in the same sequence. Additionally or alternatively, the term "transcoding" at least in some embodiments refers to taking the same information, in the same sequence, and packaging the information (e.g., bits or bytes) differently.

The term "transformation" at least in some embodiments refers to changing data from one format and writing it in another format, keeping the same order, sequence, and/or nesting of data items. Additionally or alternatively, the term "transformation" at least in some embodiments involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some embodiments refers to changing the schema of a data object to another schema.

The term "stream" or "streaming" refers to a manner of processing in which an object is not represented by a complete logical data structure of nodes occupying memory proportional to a size of that object, but are processed "on the fly" as a sequence of events.

The term "cryptographic hash function", "hash function", or "hash") at least in some embodiments refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "accuracy" at least in some embodiments refers to the closeness of one or more measurements to a specific value.

The term "artificial intelligence" or "AI" at least in some embodiments refers to any intelligence demonstrated by machines, in contrast to the natural intelligence displayed by humans and other animals. Additionally or alternatively, the term "artificial intelligence" or "AI" at least in some embodiments refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), etc.), spiking NN (SNN), deep stacking network (DSN), Markov chain, perception NN, generative adversarial network (GAN), transformers, graph neural network (GNN), message passing neural network (MPNN), stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), etc.), Linear Dynamical System (LDS), Switching LDS (SLDS), Optical NNs (ONNs), an NN for reinforcement learning (RL) and/or deep RL (DRL), and/or the like.

The term "Bayesian optimization" at least in some embodiments refers to a sequential design strategy for global optimization of black-box functions that does not assume any functional forms.

The term "embedding" at least in some embodiments refers to an instance of some structure or element contained within another instance of another structure or element. Additionally or alternatively, the term "embedding" at least in some embodiments refers to a translation of a high-dimensional vector into a low-dimensional space. Additionally or alternatively, the term "embedding" at least in some embodiments refers to a categorical feature represented as a continuous-valued feature.

The term "epoch" at least in some embodiments refers to one cycle through a full training dataset. Additionally or alternatively, the term "epoch" at least in some embodiments refers to a full training pass over an entire training dataset such that each training example has been seen once; here, an epoch represents N/batch size training iterations, where N is the total number of examples.

The term "event", in probability theory, at least in some embodiments refers to a set of outcomes of an experiment (e.g., a subset of a sample space) to which a probability is assigned. Additionally or alternatively, the term "event" at least in some embodiments refers to a software message indicating that something has happened. Additionally or alternatively, the term "event" at least in some embodiments refers to an object in time, or an instantiation of a property in an object. Additionally or alternatively, the term "event" at least in some embodiments refers to a point in space at an instant in time (e.g., a location in space-time). Additionally or alternatively, the term "event" at least in some embodiments refers to a notable occurrence at a particular point in time.

The term "experiment" in probability theory, at least in some embodiments refers to any procedure that can be repeated and has a well-defined set of outcomes, known as a sample space.

The term "feature" at least in some embodiments refers to an individual measureable property, quantifiable property, or characteristic of a phenomenon being observed. Additionally or alternatively, the term "feature" at least in some embodiments refers to an input variable used in making predictions. At least in some embodiments, features may be represented using numbers/numerals (e.g., integers), strings, variables, ordinals, real-values, categories, and/or the like.

The term "feature extraction" at least in some embodiments refers to a process of dimensionality reduction by which an initial set of raw data is reduced to more manageable groups for processing. Additionally or alternatively, the term "feature extraction" at least in some embodiments refers to retrieving intermediate feature representations calculated by an unsupervised model or a pretrained model for use in another model as an input. Feature extraction is sometimes used as a synonym of "feature engineering."

The term "feature map" at least in some embodiments refers to a function that takes feature vectors (or feature tensors) in one space and transforms them into feature vectors (or feature tensors) in another space. Additionally or alternatively, the term "feature map" at least in some embodiments refers to a function that maps a data vector (or tensor) to feature space. Additionally or alternatively, the term "feature map" at least in some embodiments refers to a function that applies the output of one filter applied to a previous layer. In some embodiments, the term "feature map" may also be referred to as an "activation map".

The term "feature vector" at least in some embodiments, in the context of ML, refers to a set of features and/or a list of feature values representing an example passed into a model. Additionally or alternatively, the term "feature vector" at least in some embodiments, in the context of ML, refers to a vector that includes a tuple of one or more features.

The term "graph neural network" or "GNN" at least in some embodiments refers to a class of ANNs for processing data represented by graph data structures. Additionally or alternatively, the term "graph neural network" or "GNN" at least in some embodiments refers to an optimizable transformation on one or more attributes of a graph data structure (e.g., nodes, edges, global-context) that preserves graph symmetries (e.g., permutation invariances). Aspects of graph neural networks are discussed in Sanchez-Lengeling et al., "A Gentle Introduction to Graph Neural Networks", Distill, vol. 6, DOI: 10.23915/distill.00033 (2 Sep. 2021) and Scarselli et al., "The Graph Neural Network Model", IEEE Transactions on Neural Networks, vol. 20, no. 1, pp. 61-80 (January 2009), the contents of each of which are hereby incorporated by reference in their entireties.

The term "graph data structure", "network diagram", or "graph" at least in some embodiments refers to an abstract data type that implements a directed or undirected graph. A graph data structure includes a finite (and possibly mutable) set of vertices (also referred to as nodes or points), together with a set of pairs of these vertices where these pairs are referred to as edges (also referred to as links or lines).

The term "graph drawing" at least in some embodiments refers to any method, process, technique, algorithm, tool, or mechanism capable of producing a graph data structure or a pictorial representation of a graph data structure, usually based on a set of data. Examples of graph drawing techniques, algorithms, tools, etc. are discussed in Roberto Tamassia, Ed., "Handbook of Graph Drawing and Visualization", CRC Press (24 Jun. 2013) ("[Tamassia]"), the contents of which is hereby incorporated by reference in its entirety.

The term "inference engine" at least in some embodiments refers to a component of a computing system that applies logical rules to a knowledge base to deduce new information.

The term "intelligent agent" at least in some embodiments refers to an a software agent or other autonomous entity which acts, directing its activity towards achieving goals upon an environment using observation through sensors and consequent actuators (i.e. it is intelligent). Intelligent agents may also learn or use knowledge to achieve their goals.

The term "iteration" at least in some embodiments refers to the repetition of a process in order to generate a sequence of outcomes, wherein each repetition of the process is a single iteration, and the outcome of each iteration is the starting point of the next iteration. Additionally or alternatively, the term "iteration" at least in some embodiments refers to a single update of a model's weights during training.

The term "loss function" or "cost function" at least in some embodiments refers to an event or values of one or more variables onto a real number that represents some "cost" associated with the event. A value calculated by a loss function may be referred to as a "loss" or "error". Additionally or alternatively, the term "loss function" or "cost function" at least in some embodiments refers to a function used to determine the error or loss between the output of an algorithm and a target value. Additionally or alternatively, the term "loss function" or "cost function" at least in some embodiments refers to a function are used in optimization problems with the goal of minimizing a loss or error. The term "squared loss" or "L2 loss" at least in some embodiments refers to a loss function based on a squared difference between a true value and a predicted value.

The term "mathematical model" at least in some embodiments refer to a system of postulates, data, and inferences presented as a mathematical description of an entity or state of affairs including governing equations, assumptions, and constraints.

The term "machine learning" or "ML" at least in some embodiments refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm at least in some embodiments refers to different concepts than the term "ML model," these terms may be used interchangeably for the purposes of the present disclosure. Furthermore, the term "AI/ML application" or the like at least in some embodiments refers to an application that contains some AI/ML models and application-level descriptions. ML techniques generally fall into the following main types of learning problem categories: supervised learning, unsupervised learning, and reinforcement learning.

The term "matrix" at least in some embodiments refers to a rectangular array of numbers, symbols, or expressions, arranged in rows and columns, which may be used to represent an object or a property of such an object.

The term "nondeterministic polynomial time" or "NP" at least in some embodiments refers to a class of computational decision problems for which any given yes-solution can be verified as a solution in polynomial time by a deterministic Turing machine (or solvable by a nondeterministic Turing machine in polynomial time). The term "NP-hard" at least in some embodiments refers to a class of problems which are at least as hard as the hardest problems in NP; problems that are NP-hard do not have to be elements of NP and may not even be decidable. The term "NP-complete" at least in some embodiments refers to a class of decision problems that contains the hardest problems in NP; each NP-complete problem is in NP.

The term "objective function" at least in some embodiments refers to a function to be maximized or minimized for a specific optimization problem. In some cases, an objective function is defined by its decision variables and an objective. The objective is the value, target, or goal to be optimized, such as maximizing profit or minimizing usage of a particular resource. The specific objective function chosen depends on the specific problem to be solved and the objectives to be optimized. Constraints may also be defined to restrict the values the decision variables can assume thereby influencing the objective value (output) that can be achieved. During an optimization process, an objective function's decision variables are often changed or manipulated within the bounds of the constraints to improve the objective function's values. In general, the difficulty in solving an objective function increases as the number of decision variables included in that objective function increases. The term "decision variable" refers to a variable that represents a decision to be made.

The term "optimization" at least in some embodiments refers to an act, process, or methodology of making something (e.g., a design, system, or decision) as fully perfect, functional, or effective as possible. Optimization usually includes mathematical procedures such as finding the maximum or minimum of a function. The term "optimal" at least in some embodiments refers to a most desirable or satisfactory end, outcome, or output. The term "optimum" at least in some embodiments refers to an amount or degree of something that is most favorable to some end. The term "optima" at least in some embodiments refers to a condition, degree, amount, or compromise that produces a best possible result. Additionally or alternatively, the term "optima" at least in some embodiments refers to a most favorable or advantageous outcome or result.

The term "probability" at least in some embodiments refers to a numerical description of how likely an event is to occur and/or how likely it is that a proposition is true. The term "probability distribution" at least in some embodiments refers to a mathematical function that gives the probabilities of occurrence of different possible outcomes for an experiment or event.

The term "probability distribution" at least in some embodiments refers to a function that gives the probabilities of occurrence of different possible outcomes for an experiment or event. Additionally or alternatively, the term "probability distribution" at least in some embodiments refers to a statistical function that describes all possible values and likelihoods that a random variable can take within a given range (e.g., a bound between minimum and maximum possible values). A probability distribution may have one or more factors or attributes such as, for example, a mean or average, mode, support, tail, head, median, variance, standard deviation, quantile, symmetry, skewness, kurtosis, etc. A probability distribution may be a description of a random phenomenon in terms of a sample space and the probabilities of events (subsets of the sample space). Example probability distributions include discrete distributions (e.g., Bernoulli distribution, discrete uniform, binomial, Dirac measure, Gauss-Kuzmin distribution, geometric, hypergeometric, negative binomial, negative hypergeometric, Poisson, Poisson binomial, Rademacher distribution, Yule-Simon distribution, zeta distribution, Zipf distribution, etc.), continuous distributions (e.g., Bates distribution, beta, continuous uniform, normal distribution, Gaussian distribution, bell curve, joint normal, gamma, chi-squared, non-central chi-squared, exponential, Cauchy, lognormal, logit-normal, F distribution, t distribution, Dirac delta function, Pareto distribution, Lomax distribution, Wishart distribution, Weibull distribution, Gumbel distribution, Irwin-Hall distribution, Gompertz distribution, inverse Gaussian distribution (or Wald distribution), Chernoff's distribution, Laplace distribution, Polya-Gamma distribution, etc.), and/or joint distributions (e.g., Dirichlet distribution, Ewens's sampling formula, multinomial distribution, multivariate normal distribution, multivariate t-distribution, Wishart distribution, matrix normal distribution, matrix t distribution, etc.).

The term "probability density function" or "PDF" at least in some embodiments refers to a function whose value at any given sample (or point) in a sample space can be interpreted as providing a relative likelihood that the value of the random variable would be close to that sample. Additionally or alternatively, the term "probability density function" or "PDF" at least in some embodiments refers to a probability of a random variable falling within a particular range of values. Additionally or alternatively, the term "probability density function" or "PDF" at least in some embodiments refers to a value at two different samples can be used to infer, in any particular draw of the random variable, how much more likely it is that the random variable would be close to one sample compared to the other sample.

The term "precision" at least in some embodiments refers to the closeness of the two or more measurements to each other. The term "precision" may also be referred to as "positive predictive value".

The term "reinforcement learning" or "RL" at least in some embodiments refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, temporal difference learning, and deep RL. The term "multi-armed bandit problem", "K-armed bandit problem", "N-armed bandit problem", or "contextual bandit" at least in some embodiments refers to a problem in which a fixed limited set of resources must be allocated between competing (alternative) choices in a way that maximizes their expected gain, when each choice's properties are only partially known at the time of allocation, and may become better understood as time passes or by allocating resources to the choice. The term "contextual multi-armed bandit problem" or "contextual bandit" at least in some embodiments refers to a version of multi-armed bandit where, in each iteration, an agent has to choose between arms; before making the choice, the agent sees a d-dimensional feature vector (context vector) associated with a current iteration, the learner uses these context vectors along with the rewards of the arms played in the past to make the choice of the arm to play in the current iteration, and over time the learner's aim is to collect enough information about how the context vectors and rewards relate to each other, so that it can predict the next best arm to play by looking at the feature vectors. Additional aspects of RL and multi-armed bandit problems are discussed in Sutton et al., "Reinforcement Learning: An Introduction", 2nd Ed., MIT press (2018) ("[Sutton]").

The term "reward function", in the context of RL, at least in some embodiments refers to a function that outputs a reward value based on one or more reward variables; the reward value provides feedback for an RL policy so that an RL agent can learn a desirable behavior. The term "reward shaping", in the context of RL, at least in some embodiments refers to a adjusting or altering a reward function to output a positive reward for desirable behavior and a negative reward for undesirable behavior.

The term "sample space" in probability theory (also referred to as a "sample description space" or "possibility space") of an experiment or random trial at least in some embodiments refers to a set of all possible outcomes or results of that experiment.

The term "search space", in the context of optimization, at least in some embodiments refers to an a domain of a function to be optimized. Additionally or alternatively, the term "search space", in the context of search algorithms, at least in some embodiments refers to a feasible region defining a set of all possible solutions. Additionally or alternatively, the term "search space" at least in some embodiments refers to a subset of all hypotheses that are consistent with the observed training examples. Additionally or alternatively, the term "search space" at least in some embodiments refers to a version space, which may be developed via machine learning.

The term "stochastic" at least in some embodiments refers to a property of being described by a random probability distribution. Although the terms "stochasticity" and "randomness" are distinct in that the former refers to a modeling approach and the latter refers to phenomena themselves, for purposes of the present disclosure these two terms may be used synonymously unless the context indicates otherwise.

The term "vector" at least in some embodiments refers to a one-dimensional array data structure. Additionally or alternatively, the term "vector" at least in some embodiments refers to a tuple of one or more values called scalars.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus comprising:
memory circuitry;
computer-readable instructions;
at least one programmable circuit to be programmed based on the computer-readable instructions to:
identify, after detection of a connection event, communication equipment instances (CEs) of a set of CEs and communication links of a set of communication links, the communication links between at least pairs of CEs in the set of CEs;
generate an initial graph including an initial arrangement of edges among a set of nodes, the set of nodes representative of respective CEs of the set of CEs, the edges in the initial arrangement of edges representative of respective communication links of the set of communication links;
cause a graph neural network (GNN) to determine a set of candidate graphs based on a set of node features, respective ones of the candidate graphs including corresponding candidate arrangements of edges between corresponding ones of the set of nodes, the candidate arrangements different than the initial arrangement;
determine respective quality (Q) values of the candidate graphs based on a Q function, the Q function based on a reinforcement learning model;
select at least one of the candidate graphs from among the set of candidate graphs based on the Q values, the selected at least one of the candidate graphs including an output arrangement of edges between corresponding ones of the nodes; and
generate connection management (CM) instructions to reconfigure the set of communication links between one or more CEs of the set of CEs based on the output arrangement of edges; and
interface circuitry to send the CM instructions to the one or more CEs in the set of CEs, the CM instructions to cause the one or more CEs to establish one or more communication links with other CEs in the set of CEs.

2. The apparatus of claim 1, wherein a first Q value for a first candidate graph in the set of candidate graphs is an expected reward value associated with rearrangement of the set of communication links according to a first one of the candidate arrangements corresponding to the first candidate graph.

3. The apparatus of claim 2, wherein the GNN includes a plurality of GNN layers, the plurality of GNN layers including at least an input layer, an output layer, and at least one hidden layer disposed between the input layer and the output layer, and the output layer of the GNN is an input to the Q function.

4. The apparatus of claim 1, wherein, to determine the set of candidate graphs, one or more of the at least one programmable circuit is to:
identify, based on the initial graph, a current state of a communication network including the set of CEs; and
for a first candidate graph in the set of candidate graphs:
determine respective Q values for the edges in a first one of the candidate arrangements, the first one of the candidate arrangements corresponding to the first candidate graph; and
combine the respective Q values to obtain the Q value of the first candidate graph.

5. The apparatus of claim 1, wherein one or more of the at least one programmable circuit is to:
operate the GNN based on at least one of throughput of a communication network including the set of CEs, coverage of the communication network, or load balance among the set of CEs.

6. The apparatus of claim 1, wherein the set of node features includes data rates of the set of CEs and channel capacities of the set of CEs, and wherein:
the interface circuitry is to obtain network metrics from individual CEs of the set of CEs; and
one or more of the at least one programmable circuit is to determine the channel capacities and the data rates based on the obtained network metrics.

7. The apparatus of claim 6, wherein the network metrics include one or more measurement reports, wherein a measurement report of the one or more measurement reports includes at least one signal or channel measurement, a CE identifier of a CE that performed the at least one signal or channel measurement, and an identifier of a coverage area in which the CE performed the at least one signal or channel measurement.

8. The apparatus of claim 7, wherein the network metrics include at least one of respective CE rates of the individual CEs, respective CE spectral efficiency metrics of the individual CEs, respective CE resource utilization of the individual CEs, a total resource utilization associated with the set of CEs, respective bandwidth utilization at the individual CEs, a total bandwidth utilization associated with the set of CEs, or CE status information that indicated whether ones of the individual CEs are in an active mode, an inactive mode, or an idle mode.

9. The apparatus of claim 1, wherein one or more of the at least one programmable circuit is to:
cause storage of connection events in a connection event queue; and
process the queued connection events in a first in first out manner.

10. The apparatus of claim 9, wherein one or more of the at least one programmable circuit is to process a number of the queued connection events in parallel.

11. The apparatus of claim 1, wherein the set of CEs includes a set of network access nodes (NANs) and a set of user equipment (UEs), individual NANs of the set of NANs provide network connectivity to one or more UEs of the set of UEs, and the communication links in the set of communication links are between ones of the UEs and ones of the NANs.

12. The apparatus of claim 11, wherein one or more of the at least one programmable circuit is to generate, as the initial graph, a NAN-NAN adjacency graph based on locations of the individual NANs in the set of NANs.

13. The apparatus of claim 12, wherein to one or more of the at least one programmable circuit is to generate the NAN-NAN adjacency graph to include a first NAN in the set of NANs serving a UE that is a subject of the detected connection event and a subset of second NANs in the set of NANs within a predetermined distance from the first NAN.

14. The apparatus of claim 13, wherein one or more of the at least one programmable circuit is to generate the NAN-NAN adjacency graph based on a score calculated based on network metrics collected from individual UEs of the set of UEs.

15. The apparatus of claim 11, wherein the apparatus corresponds to a Radio Access Network (RAN) Intelligent Controller (RIC) in an Open RAN (O-RAN) framework, the computer-readable instructions correspond to an xApp operated by the RIC, and the individual NANs are at least one of O-RAN distributed units (DUs) or O-RAN remote units (RUs).

16. At least one computer-readable medium comprising instructions to cause at least one programmable circuit to at least:
  identify, after detection of a connection event, communication equipment instances (CEs) of a set of CEs and communication links of a set of communication links, the communication links between at least pairs of CEs in the set of CEs;
  generate an initial graph including an initial arrangement of edges among a set of nodes, the set of nodes representative of respective CEs of the set of CEs, the edges in the initial arrangement of edges representative of respective communication links of the set of communication links;
  cause a graph neural network (GNN) to determine a set of candidate graphs based on a set of node features, respective ones of the candidate graphs including corresponding candidate arrangements of edges between corresponding ones of the set of nodes, the candidate arrangements different than the initial arrangement;
  determine respective quality (Q) values of the candidate graphs based on a reinforcement learning model;
  select at least one of the candidate graphs from among the set of candidate graphs based on the Q values, the selected at least one of the candidate graphs including an output arrangement of edges between corresponding ones of the nodes;
  generate connection management (CM) instructions to reconfigure the set of communication links between one or more CEs of the set of CEs based on the output arrangement of edges; and
  send the CM instructions to the one or more CEs in the set of CEs, the CM instructions to cause the one or more CEs to establish one or more communication links with other CEs in the set of CEs.

17. The at least one non-transitory computer-readable medium of claim 16, wherein a Q function, a first Q value for a first candidate graph in the set of candidate graphs is an expected reward value associated with rearrangement of the set of communication links according to a first one of the candidate arrangements corresponding to the first candidate graph.

18. The at least one non-transitory computer-readable medium of claim 17, wherein the instructions are to cause one or more of the at least one programmable circuit to:
  identify, based on the initial graph, a current state of a communication network including the set of CEs; and
  for a first candidate graph in the set of candidate graphs:
    determine respective Q values for the edges in a first one of the candidate arrangements, the first one of the candidate arrangements corresponding to the first candidate graph; and
    combine the respective Q values to obtain the Q value of the first candidate graph.

19. The at least one non-transitory computer-readable medium of claim 18, wherein the instructions are to cause one or more of the at least one programmable circuit to perform, during a training phase of the GNN, stochastic gradient descent (SGD) to minimize a squared loss function to learn one or more weights of the GNN.

20. The at least one non-transitory computer-readable medium of claim 16, wherein the instructions are to cause one or more of the at least one programmable circuit to operate the GNN based on at least one of throughput of a communication network including the set of CEs, coverage of the communication network, or load balance among the set of CEs.

21. The at least one non-transitory computer-readable medium of claim 16, wherein the set of node features includes data rates of the set of CEs and channel capacities of the set of CEs, and the instructions are to cause one or more of the at least one programmable circuit to:
  obtain network metrics from individual CEs of the set of CEs; and
  determine the channel capacities and the data rates based on the obtained network metrics.

22. The at least one non-transitory computer-readable medium of claim 21, wherein the network metrics include one or more measurement reports, wherein a measurement report of the one or more measurement reports includes at least one signal or channel measurement, a CE identifier of a CE that performed the at least one signal or channel measurement, and an identifier of a coverage area in which the CE performed the at least one signal or channel measurement.

23. The at least one non-transitory computer-readable medium of claim 22, wherein the at least one signal or channel measurement includes at least one of a received signal reference power (RSRP) measurement, a reference signal received quality (RSRQ) measurement, a Received Signal Code Power (RSCP) measurement, a signal-to-noise ratio (SNR) measurement, a signal-to-noise and interference ratio (SINR) measurement, a channel quality indicator (CQI) measurement, or an energy per chip to noise power density ratio (EcN0) measurement.

24. The at least one non-transitory computer-readable medium of claim 21, wherein the network metrics include at least one of respective CE rates of the individual CEs, respective CE spectral efficiency metrics of the individual CEs, respective CE resource utilization of the individual CEs, a total resource utilization associated with the set of CEs, respective bandwidth utilization at the individual CEs, a total bandwidth utilization associated with the set of CEs, or CE status information that indicated whether ones of the individual CEs are in an active mode, an inactive mode, or an idle mode.

25. The at least one non-transitory computer-readable medium of claim 21, wherein the instructions are to cause one or more of the at least one programmable circuit to determine the channel capacities and the data rates based on historical network metrics.

26. The at least one non-transitory computer-readable medium of claim 21, wherein the instructions are to cause one or more of the at least one programmable circuit to determine the set of node features for a layer in the GNN such that features of individual nodes of the set of nodes are propagated to one or more neighboring nodes of the set of nodes.

27. The at least one non-transitory computer-readable medium of claim 16, wherein the detected connection event is one of receipt of a measurement report, receipt of an intra-radio access technology (RAT) handover (HO) request, receipt of an inter-RAT HO request, receipt of a cell selection message, receipt of a cell reselection message, receipt of a radio link failure (RLF) detection message, receipt of an RLF recovery message(s), receipt of a beam failure detection message, or a beam recovery message.

* * * * *